(12) United States Patent
Meschenmoser et al.

(10) Patent No.: US 10,663,764 B2
(45) Date of Patent: May 26, 2020

(54) SPECTACLE LENS AND METHOD FOR MAKING THE SAME

(71) Applicants: Carl Zeiss Vision International GmbH, Aalen (DE); Carl Zeiss Vision Ireland Ltd., Wexford (IE)

(72) Inventors: Ralf Meschenmoser, Essingen (DE); Timo Kratzer, Aalen (DE); Paraic Begley, Waterford (IE); Stephen Brown, Adelaide (AU)

(73) Assignees: Carl Zeiss Vision International GmbH, Aalen (DE); Carl Zeiss Vision Ireland Ltd., Wexford (IE)

( * ) Notice: Subject to any disclaimer, the term of this patent is extended or adjusted under 35 U.S.C. 154(b) by 0 days.

(21) Appl. No.: 14/557,252

(22) Filed: Dec. 1, 2014

(65) Prior Publication Data
US 2015/0153589 A1    Jun. 4, 2015

(30) Foreign Application Priority Data

Nov. 29, 2013    (EP) .................................... 13195130

(51) Int. Cl.
*G02C 7/06* (2006.01)
*B29D 11/00* (2006.01)
(Continued)

(52) U.S. Cl.
CPC ........ *G02C 7/068* (2013.01); *B29D 11/00028* (2013.01); *B29D 11/00432* (2013.01);
(Continued)

(58) Field of Classification Search
CPC .......... G02C 7/068; G02C 7/021; G02C 7/06; B29D 11/00028; G02B 1/041
See application file for complete search history.

(56) References Cited

U.S. PATENT DOCUMENTS

| | | | | |
|---|---|---|---|---|
| 1,911,154 A | * | 5/1933 | Hill ......................... | G02C 7/06 |
| | | | | 351/159.48 |
| 2,025,893 A | | 12/1935 | Polackoff | |
| | | | (Continued) | |

FOREIGN PATENT DOCUMENTS

| | | |
|---|---|---|
| CN | 201255792 Y | 6/2009 |
| CN | 201917729 U | 8/2011 |
| | (Continued) | |

OTHER PUBLICATIONS

DIN EN ISO 13666: Nov. 1998 of the DIN Deutschen Institut fuer Normung, e.V., pp. 1 to 51.

(Continued)

*Primary Examiner* — Mathieu D Vargot
(74) *Attorney, Agent, or Firm* — Walter Ottesen, P.A.

(57) ABSTRACT

A method for manufacturing a spectacle lens includes the steps of providing an integral main lens. The integral main lens has a front surface and a back surface and is at least one selected from a group consisting of a spherical power lens, an astigmatic power lens, and a lens having a main curvature of the front surface in a first meridian and a main curvature of the back surface in the first meridian which are different so as to provide for a spherical power different from zero; and applying at least one additional lens element to at least a part of the front surface and/or at least a part of the back surface, wherein the at least one additional lens element includes at least one layer having a multitude of layer elements, in particular printed layer elements. Further, the invention is directed to a corresponding spectacle lens.

1 Claim, 38 Drawing Sheets

(51) Int. Cl.
  *G02C 7/02* (2006.01)
  *G02B 1/04* (2006.01)
  *B33Y 10/00* (2015.01)
  *B33Y 80/00* (2015.01)

(52) U.S. Cl.
  CPC .............. *G02B 1/041* (2013.01); *G02C 7/021* (2013.01); *G02C 7/022* (2013.01); *G02C 7/06* (2013.01); *B33Y 10/00* (2014.12); *B33Y 80/00* (2014.12); *G02C 2202/12* (2013.01); *G02C 2202/16* (2013.01); *Y10T 156/10* (2015.01); *Y10T 156/1089* (2015.01)

(56) References Cited

U.S. PATENT DOCUMENTS

| | | | | |
|---|---|---|---|---|
| 3,405,995 | A | 10/1968 | Mignen | |
| 6,814,896 | B2 * | 11/2004 | Bhalakia | B29D 11/00028 264/1.32 |
| 7,420,743 | B2 * | 9/2008 | Lai | B29D 11/00355 351/159.35 |
| 7,472,993 | B2 * | 1/2009 | Matsui | G02C 7/06 351/159.41 |
| 2001/0035935 | A1 | 11/2001 | Bhalakia et al. | |
| 2002/0114577 | A1 * | 8/2002 | Kondo | G02B 6/423 385/51 |
| 2004/0084790 | A1 | 5/2004 | Blum et al. | |
| 2007/0195263 | A1 | 8/2007 | Shimizu et al. | |
| 2009/0250828 | A1 | 10/2009 | Rosen et al. | |
| 2011/0298877 | A1 | 12/2011 | Blessing | |
| 2012/0019936 | A1 | 1/2012 | Blessing et al. | |
| 2013/0258273 | A1 | 10/2013 | Kelch | |

FOREIGN PATENT DOCUMENTS

| | | | |
|---|---|---|---|
| DE | 10 2006 003 310 A1 | | 3/2007 |
| DE | 10 2009 004 377 A1 | | 7/2010 |
| DE | 10 2009 004 379 A1 | | 7/2010 |
| DE | 10 2009 004 380 A1 | | 7/2010 |
| EP | 2 412 767 A1 | | 2/2012 |
| GB | 221415 | * | 9/1924 |
| JP | 58-120 | * | 7/1983 |
| WO | 2006/029268 A2 | | 3/2006 |
| WO | 2013/149891 A1 | | 10/2013 |

OTHER PUBLICATIONS

Partial Search Report of the European Patent Office dated Apr. 16, 2014 of European application 13195130.3 on which this application is based.

Extended Search Report of the European Patent Office dated Jul. 18, 2014 of European application 13195130.3 on which this application is based.

Translation and first Office action of the Chinese Patent Office dated May 23, 2016 in corresponding Chinese application 201410858148.9.

Result of consultation of the European Patent Office dated Oct. 30, 2019 of European application 13195130.3 on which this application is based.

* cited by examiner

SPECTACLE LENS AND METHOD FOR MAKING THE SAME

CROSS-REFERENCE TO RELATED APPLICATIONS

This application claims the priority of European patent application EP13195130.3, filed Nov. 29, 2013, the entire content of which is incorporated herein by reference.

BACKGROUND OF THE INVENTION

The current invention is related to a method for manufacturing a spectacle lens and a spectacle lens.

It is well known in the art that spectacle lenses can be used for the correction of visual impairment. Ideally, a spectacle lens is not only manufactured to fit the individual needs of a spectacle wearer best possible but also at minimum cost. Spectacle lenses are described by the shapes of their back surface and their front surface. Typically, the visual impairment of a spectacle wearer is described by the so-called prescription that provides parameters for spherical power, astigmatic power and prismatic power to correct for the aberrations of the wearer's eye.

Different processes for manufacturing such spectacle lenses are known. For example, casting or molding processes are known and usually considered as the most cost-effective manufacturing processes. In a typical molding process, two mold halves are placed adjacently to create cavity having a desired geometry for the spectacle lens. Into that so-formed cavity, a polymerisable material, a thermosetting material or a thermoplastic material may be inserted to form the spectacle lens. Further, a granulate or pellets may be heated and processed via die casting or injection molding. In particular, such molding processes are advantageous in case no further surface processing steps are required afterwards, for example for polishing or grinding.

Further, typical surface machining methods are known which start off with lens blanks having neither their front surface nor their back surface in a desired geometrical shape. Alternatively, starting off with so-called semi-finished lens blanks is also known wherein either the front or the back surface already has a desired geometric shape and only the other unfinished surface is to be grinded and polished as required. During surfacing, i.e. grinding and polishing, not only rotationally symmetric shapes but also asymmetric and freeform surfaces can be formed. Hence, such processes are usually used when it is required to manufacture spectacle lenses for an individual wearer taking into account his/her individual parameters and desired usage of the spectacle lens. Hence, progressive lenses are usually manufactured in that way.

However, these processes also have certain drawbacks. For example, in particular when using semi-finished lens blanks, the manufacturer always has to keep a stock of a multitude of prototype lens blanks distinct in spherical power, astigmatic power, prismatic power and/or addition, wherein "addition" means the difference between a spherical power in the far or distance portion and the near portion of a progressive lens.

Further, such manufacturing processes usually require a relatively long time period since adequate manufacturing facilities are not present at every eyecare provider or spectacle shop. Hence, spectacle lenses are usually ordered directly at the manufacturer's sides or a large scale production unit. Spectacle lens manufacturing facilities produce the spectacle lenses with geometric shapes as desired and deliver them to the eyecare provider in a standard circular or elliptical shape. Then, in the spectacle shop or at the eyecare provider, this spectacle lens merely has to be adapted and fit to a specific frame.

Therefore, in the art, there was always a tendency to look for new manufacturing methods for spectacle lenses.

For example, document US 2011/0298877 A1 shows a print head for printing optical structures in a substrate comprising an injection device for ejecting at least one droplet of a printing ink towards the substrate and a curing device for curing the at least one deposited droplet, wherein the curing device comprises at least one UV-LED (Ultra Violet Light Emitting Diode).

Further, document EP 2 412 767 A1 shows a printing ink, a use of printing ink, an article and a method for manufacturing an article. The document relates to a printing ink for printing optical structures on a substrate by means of an ink jet printer, wherein the printing ink is at least partially transparent for optical light in a range between 380 and 780 nm, wherein the printing ink comprises a dynamic viscosity between 500 and 100 mPa/sec substantially at 25° C. and wherein the printing ink comprises a surface tension of at least 30 mN/m substantially at 25° C.

Further, for example document US 2009/0250828 A1 shows a method for manufacturing an ophthalmic lens comprising introducing a volume of photocurable lens material into a container, wherein said container comprises a mold surface. The method further comprises creating a digital 3D mathematical model defining corrective needs of an eye and projecting program patterns of UV light through said mold via a pattern generator, or in said program patterns of UV light cure set photocurable lens material into a lens shape defined by said mold surface and said digital model.

Further, document US 2012/0019936 A1 shows a device for directing light beams comprising a translucent substrate and a light directing structure in at least a portion of the substrate, wherein the light directing structure comprises a substantially transparent material which is arranged in a pattern on the substrate in such a way that the light directing structure comprises at least one optical prism. Further, for example document DE 10 2006 003 310 A1 shows a method for manufacturing a lenticular image and a method for producing braille or embossed printing. The method includes generating lenses by applying material in layers or by generating lenses via a multitude of subsequently applied material layers or portions.

Further, the document DE 10 2009 004 377 A1 shows a method for manufacturing a spectacle lens, a computer program product and the use of a spectacle lens manufacturing device. In particular, the method comprises the steps of providing a material processing device, providing build data of the spectacle lens at manufacturing the spectacle lens according to the provided build data by unit-wise positioning of at least one material via the material processing device.

Document DE 10 2009 004 380 A1 shows a similar approach for manufacturing an individual spectacle frame. Further, document DE 10 2009 004 379 A1 shows a similar method for manufacturing a spectacle lens blank mount.

Last, document WO 2013/149891 A1 shows an invention related to a device for producing customer-made spectacles comprising a scanning unit and producing unit, wherein the scanning unit is configured for scanning at least a part of customer's face and wherein the producing unit comprises at least a printing device for printing a spectacle lens and/or a spectacle frame, wherein the printing device is configured for printing the spectacle lens and/or the spectacle frame in dependency of scanning data of the scanning unit.

However, all these provided methods still consume a significant amount of time since the spectacle lenses are produced completely via a three-dimensional printing process. Further, currently, the raw material costs for three-dimensional printing processes amount up to 800 times the costs of conventional manufacturing techniques. Depending on the resolution of such printing processes, the time for producing two spectacle lenses for an individual wearer and the costs involved still hinder the application of such methods in the market.

SUMMARY OF THE INVENTION

Therefore, it is an object of the current invention to provide a method for manufacturing a spectacle lens and a spectacle lens that significantly accelerate the manufacturing process of spectacle lenses for individual wearers while also remaining cost-effective.

Therefore, according to a first aspect of the current invention there is provided a method for manufacturing a spectacle lens, a method being characterized by the steps of providing an integral main lens, wherein the integral main lens has a front surface and a back surface, and wherein the integral main lens is at least one selected from a group consisting of a spherical power lens, an astigmatic power lens, and a lens having a main curvature of the front surface in a first meridian and a main curvature of the back surface in the first meridian which are different from each other so as to provide for a, in particular single, spherical power different from zero, and applying at least one additional lens element to at least one part of the front surface and/or at least one part of the back sur-face, in particular to only a part of the front surface and/or only a part of the back surface, wherein the at least one additional lens element is comprised of at least one layer having a multitude of layer elements, in particular printed layer elements.

Hence, the current invention has the basic idea not to try to produce a complete spectacle lens directly or completely via an additive process such as 3D printing. Such three-dimensional printing methods are widely known in the art. However, even with current resolutions, such printing methods are time-consuming and lead to lenses wherein the step-like arrangement of the edges of the different printed layers are potentially recognizable and considered disturbing by a spectacle wearer.

Therefore, the current invention uses a completely different approach. In general, spectacle blanks comprising widely used standard prescriptions can be already manufactured in large numbers at minimum costs. In particular, so-called FSV (Finished Single Vision) lenses which fit to standard prescriptions, for example those prescriptions comprising a spherical power, can be manufactured at minimum costs. By starting off with such fully finished lens blanks of spherical power lens or astigmatic power lenses, adding an additional lens element via 3D printing requires only a minimum amount of material to be applied to one or both of these surfaces of the lens blank to adapt the optical powers to individual needs, in particular to add an addition or a new part to provide an individually adapted progressive lens.

According to a further second aspect of the current invention, there is provided a spectacle lens comprising an integral main lens, wherein the integral main lens has a front surface and a back surface, and wherein the integral main lens is at least one selected from a group consisting of a spherical power lens, an astigmatic power lens, and a lens having a main curvature of the front surface in a first meridian and a main curvature of the back surface in the first meridian which are different from each other so as to provide for a, in particular single, spherical power different from zero, and characterized by at least one additional lens element applied, in particular adhered via an adhesive, to at least a part of the front surface and/or at least a part of the back surface, in particular to only a part of the front surface and/or only a part of the back surface, wherein the at least one lens element is comprised of at least one layer having a multitude of layer elements, in particular printed layer elements.

Hence, this aspect of the invention describes a spectacle lens manufactured in accordance with the method according to the first aspect.

Unless otherwise indicated, the terminology used in the context of the present application corresponds to the definitions in the standard DIN EN ISO 13666: 1998-11 of the DIN Deutschen Institut für Normung e.V., the entire content of which is incorporated herein by reference.

The term "integral" as used in the context of the current application means that the integral main lens is a single, one-pieced part. In particular, the integral main lens has been manufactured according to known methods in the art or for example casting or injection molding a lens blank and finishing the surfaces via grinding and polishing as required.

The term "main lens" used in the current context means the basic lens onto which further material is supplied via an additive process. It can also be called a "basic lens". According to the invention, the main lens may already be a spherical power lens or astigmatic power lens.

The term "additional lens element" in the current context means an element additionally applied onto one or both of the surfaces of the main lens via an additive process. The additional lens element itself does not necessarily need to have an optical power. It could also have the form of a layer of a coating for the covering one or both of the surfaces of the main lens.

The term "main curvature" of the front surface or the back surface, in the current context, describes the essential single curvature or nominal curvature of the front surface or the back surface to provide for a spherical power, in particular a prescribed spherical power, in a certain plane. Hence, the "main curvature" may also be referred to as "nominal curvature". However, as laid out in more detail below, the front surface and/or the back surface may comprise at least one recess and/or at least one flattened section, in particular to which the additional element is applied. These recesses and/or flattened sections do not form part of the "main curvature". In case the spectacle lens comprises an optical axis, cf. section 4.8 of DIN EN ISO 13666, the "main curvature" is in a meridian of the spectacle lens. A "meridian" is each plane that contains the optical axis, cf. section 5.7.2 of DIN EN ISO 13666. In that case, the essential curvature in a meridian is the "main curvature". In case the spectacle lens does not comprise an optical axis, the "main curvature" may also be defined as being in and is in a plane of the spectacle lens that contains a center line which in turn runs through the geometrical center, cf. section 5.5 of DIN EN ISO 13666, of the front surface and the back surface.

The term "near portion", according to section 14.1.3 of the standard DIN EN ISO 13666 defines the portion of a multifocal or progressive power lens having the dioptric power for near vision. It may also be called reading portion. Similarly, the term "distance portion" or "far portion" according to section 14.1.1 of the standard DIN EN ISO 13666 defines that portion of a multifocal or progressive power lens having the dioptric power for distance vision.

A "multifocal lens" according to section 8.3.2 of the standard DIN EN ISO 13666 defines lens design to provide two or more visibly divided portions of different focal powers. Further, the term "progressive lens" or "progressive power lens", according to section 8.3.5 defines a lens for this surface which is not rotationally symmetrical with continuous change of focal power over a part or the whole of the lens. Therefore, the current invention can particularly be used for providing multifocal or progressive power lenses, depending on whether the different parts of the resulting lens can be visibly divided into certain portions having different focal powers or whether there is a continuous pro-gression of the focal power.

A "layer element" is a unit of material. The material is for forming the at least one additional lens element. The unit of material is applied via a corresponding unit application device, in particular a three dimensional printing device, stereo lithography device or laser sintering device. Hence, a "layer element" may be the minimum dose of material applicable by the unit application device.

The term "printed layer elements" defines layer elements that have been printed with a three-dimensional printing device as laid out in the prior art identified in the introductory part of the description. In particular, such printed layer elements can be provided by an ink jet printer applying a specific printing ink that may be UV-cured or thermally cured or otherwise cured to build up the additional element layer wise and each layer element wise via the three-dimensional printing unit. Hence, a printed layer element would be a drop of material provided via the three-dimensional printing device. However, there are also different methods possible to produce the multitude of layer elements, in particular stereo lithography or laser sintering. However, applying a three-dimensional printer using printing ink is preferred.

A "layer" comprises a multitude of layer elements. The layer elements of a layer are applied next to another. The additional lens element comprises at least one layer. It may also comprise a multitude of layers so that layers are applied one upon another to provide the additional lens element. For example, these layers can each be applied via commonly known three-dimensional printing techniques unit by unit. For example, via a three-dimensional ink jet printer, droplets can be applied wherein each droplet may form a single layer element or unit. Further, a three-dimensional printing device may apply a continuous row forming a single element or unit with adjacent rows then forming a single layer. Then, each continuous row of material would, for example, form a layer element. A layer may be oriented "flat" or two-dimensional. Such an arrangement could be the result of a three-dimensional printing device moving the respective printing head merely two-dimensionally. However, it could also be the case that a three-dimensional printing device would be able to follow, for example, the curvature of a surface of the integral main lens. Then, each layer would extend three-dimensionally and parallel to the surface it is applied to, i.e. the front surface or back surface of the integral main lens, respectively.

The term "at least a part" in the context of the current application means that the additional lens element is provided on at least a part of the front surface or at least a part of the back surface. Hence, the front surface and/or the back surface can be covered by an additional lens element partially or completely. Further, it may be the case the more than one additional lens element is provided to the front surface and/or the back surface so that, for example, two separate parts of the front surface may be covered by two additional lens elements and/or more than one part of the back surface is covered by further additional lens elements.

Accordingly, a "spectacle lens" refers to an ophthalmic lens which is worn in front of the eye but not in contact with the eye, cf. Chapter 8.1.2 of the standard DIN EN ISO 13666.

In the context of the present application, a finished spectacle lens according to No 8.4.6 of standard DIN EN ISO 13666 is a spectacle lens having two fully processed optical surfaces. It may be a spectacle lens before or after the edging. In principle, the spectacle lenses are delivered as so-called uncut spectacle lenses, or spectacle lenses finished with raw edges, for example from a large-scale laboratory to dispensing opticians. The uncut spectacle lens in most cases has a circular or elliptical edge shape. However, free form contour lines do also occur. The uncut spectacle lenses are only adapted to a particular frame and brought into the final size and shape by edging.

The terms "front surface" and "back surface" in the context of the pre-sent application correspond to those of the standard DIN EN ISO 13666. According to No 5.8 of the standard DIN EN ISO 13666, the term "front surface" is intended to mean the surface of the spectacle lens which is intended to face away from the eye in the spectacles. According to No 5.9 of the standard DIN EN ISO 13666, the term "back surface" is intended to mean the surface of a spectacle lens which is intended to face towards the eye in the spectacles. The terms of the application thus correspond to those of the standard DIN EN ISO 13666. However, it goes without saying that—in case a spectacle lens is simply turned around—the "front surface" in the context of the application would then be the back surface in the sense of the standard DIN EN ISO 13666 and the "back surface" in the context of the application would be the front surface in the sense of the standard DIN EN ISO 13666.

The term "prismatic power" is intended according to No 10.9 of the standard DIN EN ISO 13666 to mean both the prismatic deviation and the base setting of the prismatic deviation. According to No 10.8, "prismatic deviation" is intended to mean the change in direction of a ray of light as a result of refraction.

The term "dioptric power" is intended to mean both the focal power and the prismatic power of a spectacle lens, cf. No 9.3 of the standard DIN EN ISO 13666.

The term "focal power" describes both the spherical and astigmatic powers of a spectacle lens at a particular point, cf. No 9.2 in the standard DIN EN ISO 13666. The terms "spherical power" and "astigmatic power" in this case refer to the definitions given in sections 11.2 and 12 in the standard DIN EN ISO 13666.

In general, the phrase "different from zero" concerning a specific power can be defined as providing for the respective power of a magnitude of at least 0.125, for example a spherical power of a magnitude of at least 0.25 diopters, i.e. equal or larger than +0.25 diopters and equal or lower than −0.25 diopters.

The term "spherical power lens" refers to the definition according to section 11.1 of the standard DIN EN ISO 13666, according to which a spherical-power lens is a lens which brings a paraxial pencil or bundle of parallel light to a single focus. A spherical power lens may have spherical surfaces or at least one aspherical surface. The terms "prismatic power lens" and "astigmatic power lens" refer to sections 10.12 and 12.1, respectively, of the standard DIN EN ISO 13666. Accordingly an "astigmatic power lens" is a lens bringing a paraxial pencil or bundle of parallel light to two separate line foci mutually at right angles and hence having vertex power in only the two principal meridians. One of these powers may be zero, with the corresponding line focus at infinity. Lenses referred to as cylindrical lenses, spherocylindrical lenses and toric lenses are all astigmatic power lenses.

Unless otherwise indicated, given powers are to be present in the design reference point, cf. section 5.12 the standard DIN EN ISO 13666, or, if present, in the distance design reference point, cf. section 5.13 the standard DIN EN ISO 13666.

The term "for a user" is intended to mean the effect of the spectacle lens for the user for whom the spectacle lens is designed. Such a calculation "for a user" is therefore carried out on the basis of user data. In particular, these user data relate to a position of the assumed eye rotation point relative to the spectacle lens. In particular, the position of the eye rotation point is indicated as a distance from the back surface of the spectacle lens. In the case of a rotationally symmetrical spectacle lens, for example, the eye rotation point lies at a certain distance from the back surface of the spectacle lens on its optical axis.

"User data" comprises individual user data, for example, recorded by an optician to calculate a design of the final spectacle lens. Such "user data" may comprise parameters like pupillary distance, monocular pupil distance, cornea vertex distance, corneal vertex distance according to reference point requirement and/or according to eye rotation point requirement, monocular centration distance, centration point coordinates, lens distance or boxed lens distance, decentration of the centration point, lens height and width or boxed lens height and width, lens center distance or boxed lens center distance, spectacle lens pantoscopic angle, bow angle and grinding height. Dimensioning in the boxing system is understood in the meaning of the present invention as the measurement system as is described in the relevant standards, for example, in DIN EN ISO 13666. The pupillary distance essentially corresponds to the distance of the pupil centers.

Therefore, the user data comprise especially preferred physiological and anatomical parameters of a spectacle wearer, frame-specific properties, and features of a system of spectacles-eye of the user. The features of the system spectacles-eye of the user may be used for calculating spectacle lenses and for precise centration of spectacle lenses, for example.

In general, in order to determine an eyeglass prescription for visual aids, an eye care professional determines several parameters. In the case of spectacle lenses, for example, the most relevant ones are: refractive values according to the prescription, usually given in form of sphere, cylinder and axis; and general fitting parameters, such as pupil distance, fitting height, pantoscopic angle and others; and near vision addition, the powers in the near reference point and the far reference point, progression length, for example, in case of progressive lenses.

According to a third aspect, the current invention comprises a method for manufacturing a spectacle lens, in particular a multi-focal lens or a progressive power lens, the method comprising the steps of providing a measurement indicative of the refractive properties of the eye; determining an eyeglass prescription, in particular to correct for aberrations of the eye; providing an integral main lens, wherein the integral main lens has a front surface and a back surface, and wherein the integral main lens is at least one selected from a group consisting of a spherical power lens, an astigmatic power lens, and a lens having a main curvature of the front surface in a first meridian and a main curvature of the back surface in the first meridian which are different from each other so as to provide for a, in particular single, spherical power different from zero; and applying at least one additional lens element to at least a part of the front surface and/or at least one part of the back surface, wherein the at least one additional lens element is comprised of at least one layer having a multitude of layer elements. In particular, the integral main lens is provided corresponding to the determined eyeglass prescription. In particular, the spherical power which is different from zero corresponds to that of the prescription. This aspect may further comprise determining an addition power of the spectacle in a near portion of the spectacle lens and determining a shape of the at least one additional element to provide for the addition power. Alternatively, this aspect may further comprise determining a design of a near portion of the spectacle lens based on individual user data and a corresponding shape of the at least one additional element. In both alternatives, the at least one additional element may then be applied corresponding to the determined shape.

In particular, the step of determining an eyeglass prescription may comprise establishing an optimization space corresponding to a plurality of possible eyeglass prescriptions for the eye, determining a merit function, wherein a value of the merit function corresponds to a visual function of the eye when corrected using one of the plurality of possible eyeglass prescriptions within the optimization space, and determining the eyeglass prescription by optimizing the value of the merit function.

According to a further, fourth aspect, there may be provided an apparatus for carrying out the method according to the third aspect.

The refractive errors or imaging errors of the human eye can be mathematically described by means of so-called Zernike polynomials, for example. The errors of the eye close to a development point of the polynomial series, for example the center of the pupil, in regard to sphere, cylinder and axis can be described, for example, through second-order Zernike polynomials as a good approximation. However, in case a larger area around the development point is to be described, for example a wavefront over an aperture of a fully opened pupil, a second-order approximation might not be sufficient any more. In such cases the errors far from the development point or the center of the pupil can be better approximated by taking into account further higher-order Zernike polynomials.

In general, in order to determine an eyeglass prescription for visual aids, an eye care professional determines several parameters. In the case of spectacle lenses, for example, the most relevant ones are: refractive values, usually given in form of sphere, cylinder and axis; fitting parameters, such as pupil distance, fitting height, pantoscopic angle and others; and near vision addition, for example, in case of progressive lenses.

In a further refinement, the one or more parameters characterizing the eyeglass prescription, comprise one or more parameters selected from the group consisting of sphere, cylinder, axis, M, $J_0$ and $J_{45}$. In particular, the parameters may be either sphere, cylinder and axis or may be M, $J_0$ and $J_{45}$ Of course, further parameters might be possible, for example second-order Zernike polynomials. For example, establishing the optimization space can include defining ranges for one or more parameters characterizing the prescription.

The optimization space can be a single space, such as, for example, a space having three or more dimensions. The three or more dimensions can include sphere, cylinder, and axis or M, $J_0$, and $J_{45}$. In some embodiments, the optimization space comprises two or more sub-spaces. One of the subspaces can include a dimension for sphere. Another one of the subspaces can include a dimension for cylinder and a dimension for axis. In certain embodiments, one of the subspaces can include a dimension for M and another one of the subspaces includes a dimension for $J_0$ and a dimension for $J_{45}$.

Whether the parameters may be set to sphere, cylinder and axis or M, $J_0$, $J_{45}$ or may be even set to the second-order Zernike coefficients, may depend on the visual function used to determine the merit function or any other preference. All parameters or combinations of parameters may be equally used. As a person skilled in the art is readily aware of, a set of parameters comprising sphere, cylinder and axis may be recalculated to provide a set of parameters comprising of M, $J_0$ and $J_{45}$ by the following equations:

$$M = sph + \frac{1}{2}cyl$$

$$J_0 = -\frac{1}{2}cyl\cos(2\alpha)$$

$$J_{45} = -\frac{1}{2}cyl\sin(2\alpha)$$

wherein α designates the axis, cyl the astigmatism power in diopters and sph the spherical power in diopters. Just the other way around, following equations may be used to determine the cylinder and axis components out of $J_0$ and $J_{45}$:

$$C = -2\sqrt{J_0^2 + J_{45}^2}$$

$$\alpha = \frac{1}{2}\arctan\left(\frac{J_{45}}{J_0}\right)$$

Further, with the following equations, the second-order Zernike coefficients $C_2^0$, $C_2^{+2}$ and $C_2^{-2}$ can be used as the set of parameters. However, even these Zernike coefficients may be derived from a set of parameters M, $J_0$ and $J_{45}$ with the following equations, wherein $r_p$ is the radius of the pupil:

$$M <dpt> = \frac{-4\sqrt{3}}{r_p^2}c_2^0 <\mu m>$$

$$J_0 <dpt> = \frac{-2\sqrt{6}}{r_p^2}c_2^{+2} <\mu m>$$

$$J_{45} <dpt> = \frac{-2\sqrt{6}}{r_p^2}c_2^{-2} <\mu m>$$

According to a further aspect, there may be provided a method for manufacturing a spectacle lens, the method comprising the steps of providing an integral main lens, wherein the integral main lens has a front surface and a back surface, and wherein the integral main lens is a lens having a main curvature of the front surface in a first meridian and a main curvature of the back surface in the first meridian which are different from each other so as to provide for a spherical power different from zero, wherein the integral main lens comprises at least one recess or flattened section in the front surface and/or in the back surface; and applying at least one additional lens element to at least a part of the front surface and/or at least a part of the back surface, wherein the at least one additional lens element is comprised of at least one layer having a multitude of printed layer elements, and wherein one of the at least one additional lens element is applied to each recess or flattened section.

According to a further aspect, there may be provided a spectacle lens comprising an integral main lens, wherein the integral main lens has a front surface and a back surface, and wherein the integral main lens is a lens having a main curvature of the front surface in a first meridian and a main curvature of the back surface in the first meridian which are different from each other so as to provide for a spherical power different from zero, and characterized by at least one additional lens element applied to at least a part of the front surface and/or at least a part of the back surface, wherein the at least one lens element is comprised of at least one layer having a multitude of printed layer elements, wherein the integral main lens comprises at least one recess or flattened section in the front surface and/or in the back surface, and wherein one of the at least one additional lens element is applied to each recess or flattened section.

In general, the at least one additional lens element may be applied to only a part of the front surface and/or the back surface. Alternatively or cumulative, at least one additional lens element may be applied to the complete front surface and/or the complete back surface. For example, by applying the additional lens element to only a part of the front surface and/or the back surface, a near portion could be provided. For example, by applying the additional lens element to the complete front surface and/or the complete back surface, anti-reflective properties, tinting and/or a polarization may be provided.

Further, in general, the integral main lens may be rotationally symmetric, in particular about an optical axis thereof. Further, in general, the main curvature of the front surface and/or the main curvature of the back surface may be spherical curvatures. Furthermore, the front surface or the back surface may be a spherical surface with at least one coating selected from a group consisting of hardcoat, an anti-reflective coating and a topcoat being applied to the front surface. The anti-reflective coating may be a single-layer or multi-layer coating. The topcoat may be a hydrophobic, oleophobic and/or dust-repellent coating. By this, a manufacturing may be started with a lens blank having the front surface or the back surface already fully coated so that only a treatment of the respective other of the front and back surfaces to which the additional lens element is applied is required.

According to a refinement of the method according to an aspect, the step of providing an integral main lens comprises a step of casting or injection molding the integral main lens. Alternative or cumulative, the step of providing an integral main lens may comprise a step of surfacing the front surface and/or the back surface of the integral main lens, in particular wherein the step of surfacing includes grinding and/or polishing.

By this, a quick and cost-effective manner to providing the integral main lens can be provided. Hence, such integral main lens can be provided as fully finished single vision lenses. These lenses can be provided in large numbers for different standard spherical powers, e.g. ±0.125, ±0.25, ±0.375, ±0.5 etc. in the steps of ±0.125 diopters or 0.25 diopters.

In a further refinement, the step of providing the integral main lens comprises providing the integral main lens as a fully-finished lens blank, wherein the front surface and the back surface are surfaced according to a prescription, in particular wherein the spherical power is a magnitude of at least 0.125 diopters.

In a further refinement, the step of providing the integral main lens comprises providing the integral main lens edged to its final shape. In particular, the final shape is non-circular and non-elliptical.

In a further refinement, the step of providing the integral main lens comprises providing the integral main lens together with a frame, wherein the integral main lens is already edged to fit into the frame. Further, the integral main lens may be provided fitted into the frame and the method may comprise the further step of removing the integral main lens from the frame before the step of applying the integral main lens is conducted.

By this, there may be provided the advantage that no additional edging may be necessary at the spectacle shop selling the spectacles to the wearer or the ophthalmologist.

Hence, no further grinding and/or polishing of the integral main lens is necessary at the manufacturing side. The additional lens element can be applied to the integral main lens simply adapting its optical powers to the individual needs of the individual spectacle wearer.

In a further refinement of the method, the step of applying the at least one additional lens element comprises supplying the multitude of layer elements via an additive process, in particular when the additive process is a three-dimensional printing process.

Such three-dimensional printing processes are widely known in the art. In particular, a so-called "printing ink" is provided onto a substrate and this printing ink is then cured, in particular via radiation, for example UV curing. By this, each drop of such printing ink can form a unit or layer element enabling the three-dimensional printer to build a layer out of a multitude of layer elements and the additional lens element out of at least one layer.

According to a further refinement of the method, the step of applying the at least one additional lens element comprises supplying the at least one additional lens element directly onto the at least one part of the print surface and/or the at least one part of the back surface of the integral main lens.

Hence, it is possible to directly print onto the integral main lens. In other words, the integral main lens being a spherical power lens or astigmatic power lens forms a substrate for an additive process by the additional lens element and, thus, building it up directly onto the integral main lens.

In a further refinement of the method, the method further comprises the step of generating the additional lens element separately from the integral main lens, and wherein the step of applying the at least one additional lens element comprises adhering via an adhesive the at least one additional lens element on the at least one part of the front surface and/or the at least one part of the back surface of the integral main lens.

According to a further refinement of the method, the integral main lens is comprised of at least one selected of a group consisting of crown glass, flint glass, polymer plastics, polycarbonate based plastics, polyamide based plastics, acrylate base plastics, polythiourethane based plastics, allyl diglycol carbonate (ADC) and any combination of these materials.

By these commonly known materials, proper integral main lenses may be provided to which additional lens elements may properly adhere. In particular, proper integral main lens materials are available on the market with examples provided in the following table, with $n_e$ as the refractive index and $v_e$ with the Abbe number of the green mercury e-line (wavelength: 546.07 nm):

TABLE 1

| Glass Type | Material (Trade name) | $n_e$ | $v_e$ | $\rho$ (g/cm³) |
|---|---|---|---|---|
| organic | CR 630 | 1.501 | 57.0 | 1.29 |
| organic | CR 39 | 1.501 | 58.0 | 1.32 |
| organic | Polycarbonate | 1.588 | approx. 30 | approx. 1.2 |
| organic | MR 8 | 1.598 | 42.0 | 1.34 |
| organic | MR 7 | 1.665 | 32.0 | 1.36 |
| organic | MR 10 | 1.67 | 32.0 | 1.37 |
| organic | MR 174 | 1.74 | 32.0 | 1.47 |
| organic | PPG Trivex | 1.527 | 45.0 | 1.11 |
| organic | PPG Tribrid | 1.59 | 41.0 | 1.22 |
| organic | HIE-1 | 1.738 | 33.0 | 1.30 |
| spectacle crown | UV-W 0891 | 1.5251 | 58.3 | 2.55 |
| borosilicate | Photosolar Superbraun | 1.525 | 56.5 | 2.41 |
| titan crown | HC-Braun 6183 | 1.604 | 41.7 | 2.67 |
| titan crown | HC-Weiß 0290 (Hi-Crown) | 1.604 | 43.8 | 2.67 |
| borosilicate | HC-Photosolar Dunkelbraun | 1.604 | 42.8 | 2.75 |
| heavy flint | BASF 64 | 1.706 | 39.3 | 3.19 |
| heavy flint | LaSF 36 A | 1.800 | 35.4 | 3.62 |
| heavy flint | LaSF 39 | 1.893 | 30.4 | 4.02 |

However, the materials above are merely an excerpt of possible materials. Other materials, for example those frequently used in the field of sun lenses are not included.

Further, to the above materials like MR 10, Trivex or Tribrid may also be used. MR 7, MR 8, MR 10 and MR 174 are sold by Mitsui Chemicals, Tokyo, Japan. MR 7 is a polymerization of a polyisocyanate compound and a polythiol compound. MR 8 is a polymerization of a polyisocyanate compound and two polythiol compounds. CR 39 is a widely sold allyl diglycol carbonate monomer. Trivex and Tribrid are sold by PPG Industries, One PPG Place, Pittsburgh, Pa. 15272 USA.

According to a further refinement of a method, the additional lens element is comprised of at least one selected from a group consisting of a polypropylene based polymer, an acrylonitrile butadiene styrene (ABS) based polymer, a polyethylene terephthalate glycol (PET-G) based polymer, a polycarbonate (PC) based polymer, a poly methyl methacrylate (PMMA) based polymer and any combination of these materials.

Such materials provide not only for good optical properties but also facilitate application, for example via a three-dimensional printing device. A further proper material may, for example, be purchased on the market under the trade name VisiJet SL clear from 3D Systems, 333 Three D Systems Circle Rock Hill, S.C. 29730, USA.

By selecting one or more of these materials for the additional lens element, proper optical properties can be provided while enabling fast three-dimensional printing and good adherence to the integral main lens. However, the provided examples of materials are not exclusive. Other materials, in particular plastics, having sufficient translucent properties available and to come may be used as the material or one of the materials of an additional lens element.

According to a further refinement, the adhesive is at least one selected from a group consisting of a photo initiated curing adhesive, for example an epoxy based adhesive or acrylate based adhesive, a cyanoacrylate based adhesive and any combination of these materials.

By this, the quick attachment of an additional lens element to the integral main lens may be provided without impairing the visual qualities of the spectacle lens. The photo initiated curing adhesives like epoxy based adhesives or acrylate based adhesives provide good adherence and can compensate for tensions. Further, their curing may be initiated by UV light almost invisible for human eyes, and may last only seconds. Cyanoacrylate based adhesives may be particularly useful for adhering plastic materials together.

In a further refinement, the at least one additional lens element is supplied to form a near portion of the spectacle lens.

By this, a progressive lens can be formed according to the method set out initially in a quick manner with the near portion adapted to the individual spectacle wearer. In particular, the near portion extends over an "axial position angle" of less than 175°, preferably less than 90°. For the illustration and explanation of the "axial position angle", reference is made to FIG. 3.

According to a further refinement, the step of applying the at least one additional lens element comprises supplying more than one additional lens element to form a multifocal spectacle lens.

In particular, at least one additional lens element can be applied to the front surface and at least one additional lens element can be applied to the back surface acting together to form a so-called magnifying spectacle.

By this, also multifocal spectacle lenses can be provided in a quick manner with the segment to be provided onto the integral main lens individually adapted and placed onto the integral main lens according to individual needs.

According to a further refinement, the multitude of layer elements are formed of at least two different materials, wherein the at least two different materials have different refractive index and/or Abbe numbers.

By this, the refractive and chromatic properties of the additional element can be individually designed. In particular, mixing different materials of different refractive powers, desired refractive properties of the additional lens element can be provided enabling, on the other hand, the surface to be more flush or smooth and requiring less curvature. By this, chromatic errors can be minimized.

The term "Abbe number" is intended to mean the Abbe number according to No 4.7 of the standard DIN EN ISO 13666. This may, for example, be described by the expression $$V = \frac{n_e - 1}{n_{F'} - n_{C'}},$$

with $n_e$ as the refractive index of the green mercury e-line (wavelength: 546.07 nm), $n_{F'}$ the refractive index of the blue cadmium F'-line (wavelength: 479.99 nm) and $n_{C'}$ the refractive index of the red cadmium C'-line (wavelength: 643.85 nm).

According to a further refinement, the step of applying the at least one additional lens element comprises applying at least the first additional lens element and at least a second additional lens element, wherein the first additional lens element is applied to a part of the back surface or the front surface, and wherein the second additional lens element completely covers a respective one of the front and the back surface of the integral main lens and the first additional lens element.

Hence, for example the additional lens element can provide for a near portion of the spectacle lens to provide progressive power. Then, the second additional lens element may have hard coat properties to enclose the whole spectacle lens and avoid scratches on the additional lens element. Further, providing a flush surface via the second additional lens element may make cleaning of the spectacle lens easier since no stepwise edge formation of the additional lens element is positioned outside.

Further, the step of applying the at least one additional lens element may comprise applying at least a first additional lens element and a second additional lens element, wherein the first additional lens element completely covers a respective one of the front and the back surface of the integral main lens, and wherein the second additional lens element is applied onto the first additional lens element.

Hence, for example, the first additional lens element may completely cover the front or back surface of the integral main lens to form, for example an antireflective coating or a primer coating to enhance adherence. Then, the second additional lens element may be applied onto the first additional lens element.

Such application of the second additional lens element is still regarded as "application" of the second additional lens element towards a respective surface of the integral main lens as it is still indirectly attached thereto and influences the respective optical powers of the spectacle lens.

In a further refinement of the spectacle lens, it may be provided that the integral main lens comprises at least one recess or flattened section in the front surface and/or on the back surface, and wherein the one of the at least one additional lens element is applied to each recess or flattened section, in particular wherein each of the at least one additional lens element has a refractive index and/or an Abbe number which is different from that of the integral main lens.

That is, flush and/or smooth surfaces of the spectacle lens may be provided while adapting the optical powers by choosing proper materials. The term "flattened section" is intended to define a surface portion having no curvature and being plane. Hence, a "flattened section" is a surface area having a curvature radius which is infinite.

Further, the refinements laid out above for the methods do also apply correspondingly to the spectacle lenses according to the current invention.

It will be understood that the features of the invention mentioned above and those yet to be explained below can be used not only in the respective combination indicated, but also in other combinations or in isolation, without leaving the scope of the present invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
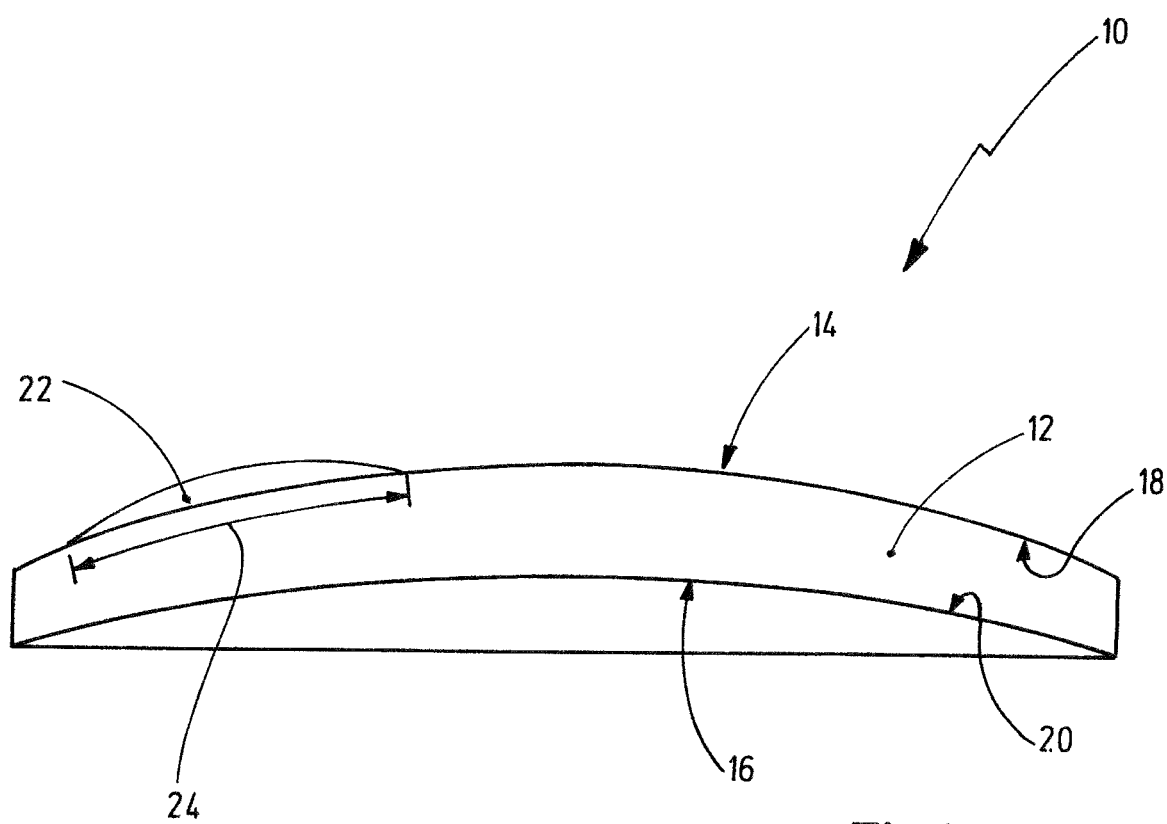
FIG. 1 shows an embodiment of a spectacle lens.

FIG. 1 shows a spectacle lens 10 in a first embodiment. The spectacle lens 10 comprises an integral main lens 12. The integral main lens 12 may have been cast with subsequent grinding and polishing. Alternatively, the integral main lens 12 may also be ground and polished out of a raw blank or provided via injection molding. In particular, the integral main lens is made of plastic, in particular CR39 or MR7. In particular, the integral main lens 12 is a spherical power lens or astigmatic power lens. That means the integral main lens 12 has a spherical power in at least one meridian focusing a collimated light beam into a single focus. The integral main lens 12 has a front surface 14 having a main curvature 18 and a back surface 16 having a main curvature 20.

In the example of FIG. 1, the integral main lens 12 is rotationally symmetric and, hence, has an optical axis through which meridian planes run. Hence, the cross section as shown in FIG. 1 is such a meridian plane. Hence, the main curvature 18 and the main curvature 20 lie in this meridian plane. The main curvature 18 of the front surface 14 and the main curvature 20 of back surface 16 are different from each other. Hence, a single spherical power of the integral main lens is achieved. In the example shown in FIG. 1, the integral main lens 12 can be considered as a fully finished single vision lens providing for a spherical power in order to fit the corresponding prescription of a wearer of that spectacle lens 10. In particular, the spherical power should have a magnitude of at least 0.125 diopters.

An additional lens element 22 is applied to a part 24 of the front surface 14. Hence, the additional lens element 22 covers merely a part of the front surface 14 as will be shown in further examples below. An additional lens element 22 may also cover the front surface 14 and/or the back surface 16 completely. In the example shown in FIG. 1, the additional lens element 22 is for providing a near portion. The specific design of the geometry shown in FIG. 1 is only of illustrative nature. Hence, depending on whether the additional lens element 22 is visibly identifiable in the spectacle lens 10, such an arrangement may be used to provide for a multifocal spectacle lens or a progressive power spectacle lens.

In particular, the additional lens element 22 comprises at least one layer with each layer having a multitude of layer elements, in particular printed layer elements. This enables to apply the additional lens element 22 onto the front surface via a three-dimensional printing device.

Figure 2A:
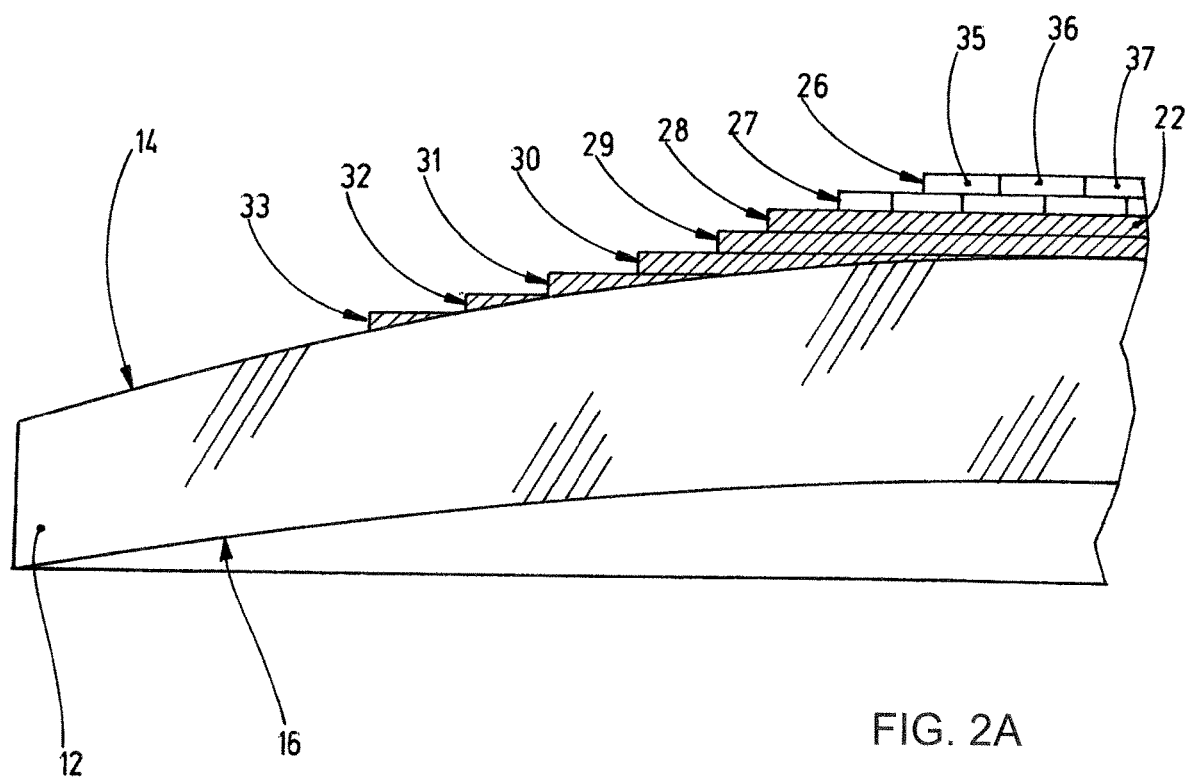
FIG. 2A shows a magnified detailed portion of the spectacle lens in FIG. 1.
Figure 2B:
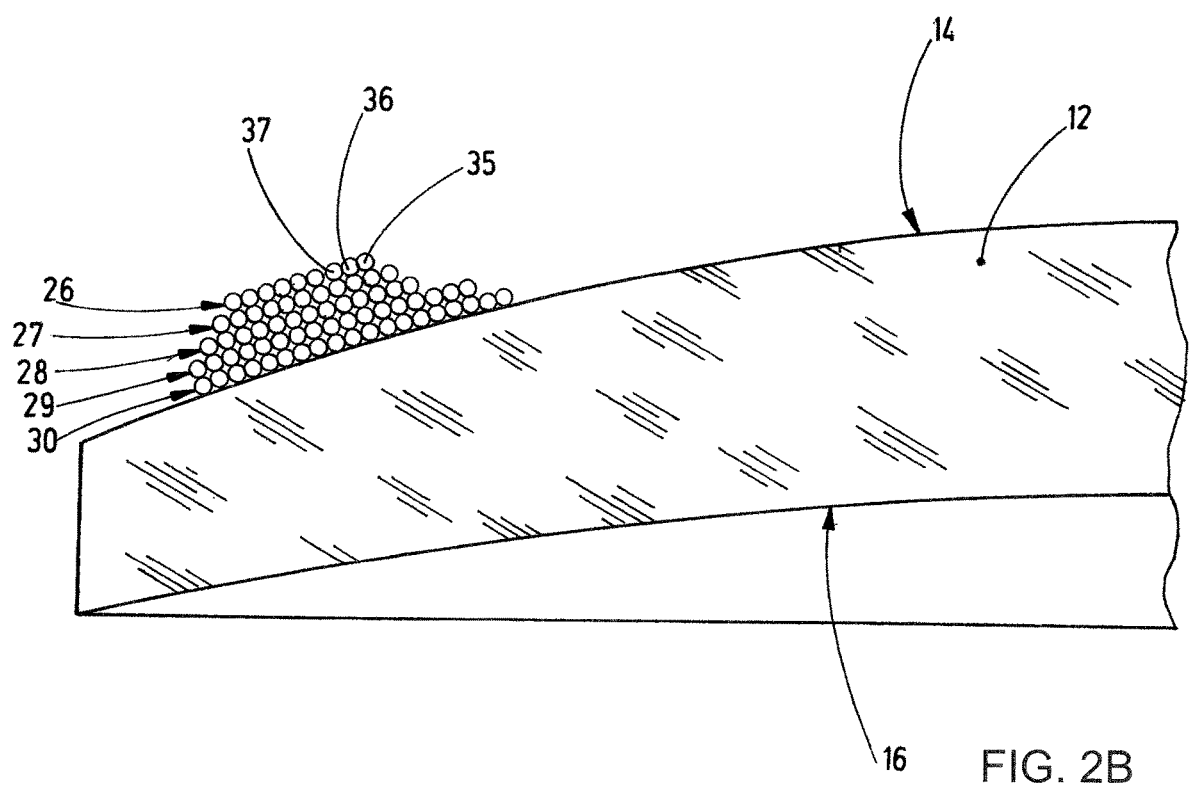
FIG. 2B shows a magnified detailed portion of a further example of the spectacle lens in FIG. 1.

FIG. 2A shows a close up of the structure of the additional lens element 22 applied to the front surface 14 of the integral main lens 12.

The integral main lens 12 comprises merely of one single piece. This means the unitary structure of a single material. To the contrary, the additional lens element 22, as it is particularly applied via a three-dimensional printing device, has a layerwise structure. In the embodiment shown in FIGS. 2A to 2F the additional lens element 22 comprises eight layers in total numbered from 26 to 33. These layers can each be applied via commonly known three-dimensional printing techniques element by element. For example, via a three-dimensional ink jet printer, droplets can be applied wherein each droplet may form a single layer element. As an example, in layer 26, such individual layer elements are identified by reference numerals 35, 36 and 37. Of course, the arrangement shown in FIGS. 2A to 2F is merely of an exemplary nature. It could also be the case that in the plane shown in FIGS. 2A to 2F, a three-dimensional printing device applies a continuous row forming a single element with adjacent rows in a plane perpendicular to FIGS. 2A to 2F. Then, each continuous row of material could, for example, form a layer element 35.

In the example shown in FIG. 2A, the layers are oriented "flat". Such an arrangement could be the result of a three-dimensional printing device moving the respective printing head merely two-dimensionally. However, it could also be the case that a three-dimensional printing device would be able to follow, for example, the curvature of the front surface 14 so that each layer 26, 32 as well follows the curvature of the front surface 14. An example for such an embodiment is provided in FIG. 2B. The same would apply, of course, if an additional lens element 22 would be applied to the back surface 16.

Figure 2C:
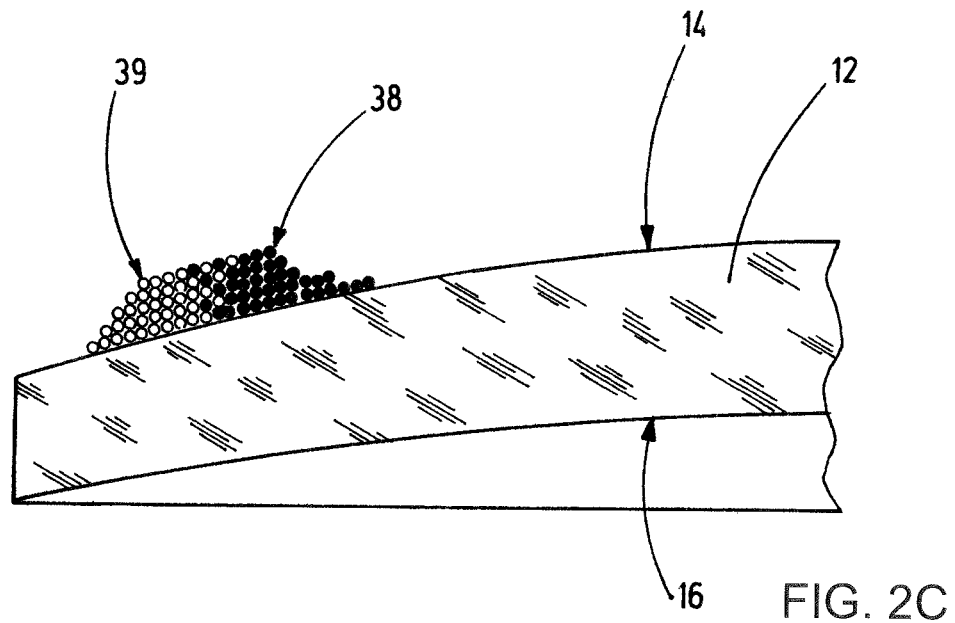
FIG. 2C shows a magnified detailed portion of a further example of the spectacle lens in FIG. 1.

In particular, the additional lens element 22 is applied with a translucent material. Further, the additional lens element 22 may comprise layer elements 34 to 37 made of at least two different materials, as shown in the example of FIG. 2C. Elements made of a first material are drawn in black and designated by reference numeral 38. Elements made of a second material are drawn in white and designated by reference numeral 39. Hence, the overall refractive index and/or Abbe number of the additional lens element 22 can be designed taken into account the refractive index and the Abbe number of the integral main lens 12 so as to provide for proper optical powers while requiring less material printed to apply the additional lens element 22. In particular, a buckle on the front surface 14 could be reduced. Further, by properly mixing at least two different materials for providing the individual layer elements, a gradient in the refractive index can be applied to the additional lens element 22, in particular in a radial direction.

Hence, for example a near portion fitting the individual needs of a spectacle wearer can be formed by convenient use of a three-dimensional printing device without the need for shipping from and to large scale spectacle shops. Further, such a spectacle can be manufactured in a small time frame of only a couple of hours. Depending on the "resolution" of the three-dimensional printing device, that is, the size of individual layer elements which influences a distance between ending edges of adjacent layers, a sufficient optical quality can be achieved. The higher the resolution or the smaller each individual layer element, the longer a three-dimensional printing process would take. However, by already providing an integral main lens 12 merely the additional lens element 22 needs to be printed to suit the needs of an individual spectacle wearer. While printing a whole spectacle lens would consume an amount of time that makes the application of a three-dimensional printing process completely unacceptable, it is currently suggested a spectacle lens can be provided within hours in sufficient optical quality enabling the provision of the individually adapted spectacle lens at an ophthalmologist or, in other words, at a site where the end user or spectacle wearer buys spectacles.

Thus, the integral main lens of standard prescription can be made at a first location and have the required optical powers. The integral main lens has a front surface and a back surface and the integral main lens is a lens having a main curvature of the front surface in a first meridian and a main curvature of the back surface in the first meridian which are different from each other so as to provide for a spherical power different from zero. The integral main lens includes at least one recess or flattened section in at least one of the front surface and the back surface with the recess or flattened sections defining a surface having a curvature different from the curvature of the surface of the main lens in which the recess or flattened section is formed.

At a second location remote from the first location, at least one additional lens is applied to at least a part of at least one of the front surface and the back surface to adapt the optical powers to the individual needs of the person.

The at least one additional lens is made up of at least one layer having a multitude of printed layer elements as required to accommodate the needs of the person. The at least one additional lens is applied to the at least one recess or flattened section and the step of applying the at least one additional lens includes applying the at least one additional lens directly onto the at least one part of at least one of the front surface and the back surface of the integral main lens.

Figure 2F:
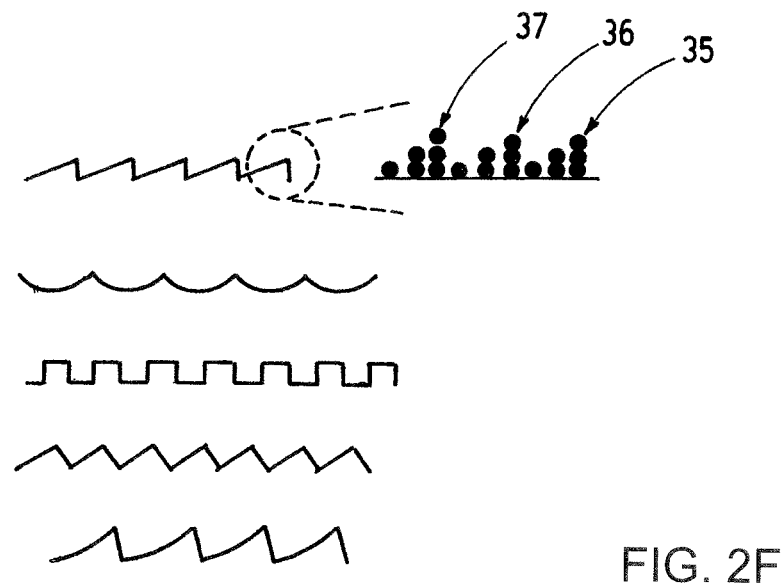
FIG. 2F shows examples of surface structures of an additional lens element.
Figure 2D:
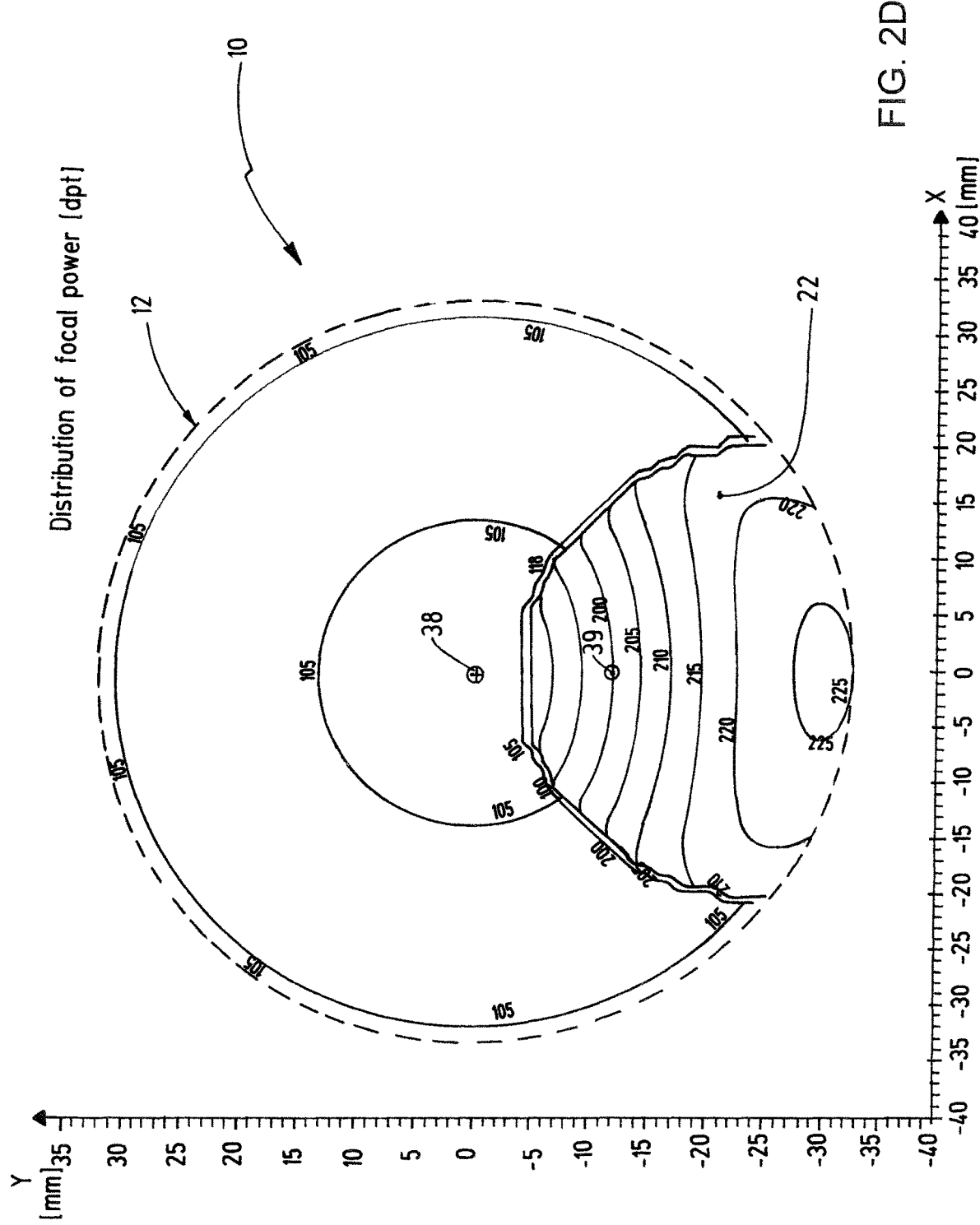
FIG. 2D shows a distribution of the focal powers in diopters of an embodiment of a spectacle lens.
Figure 2E:
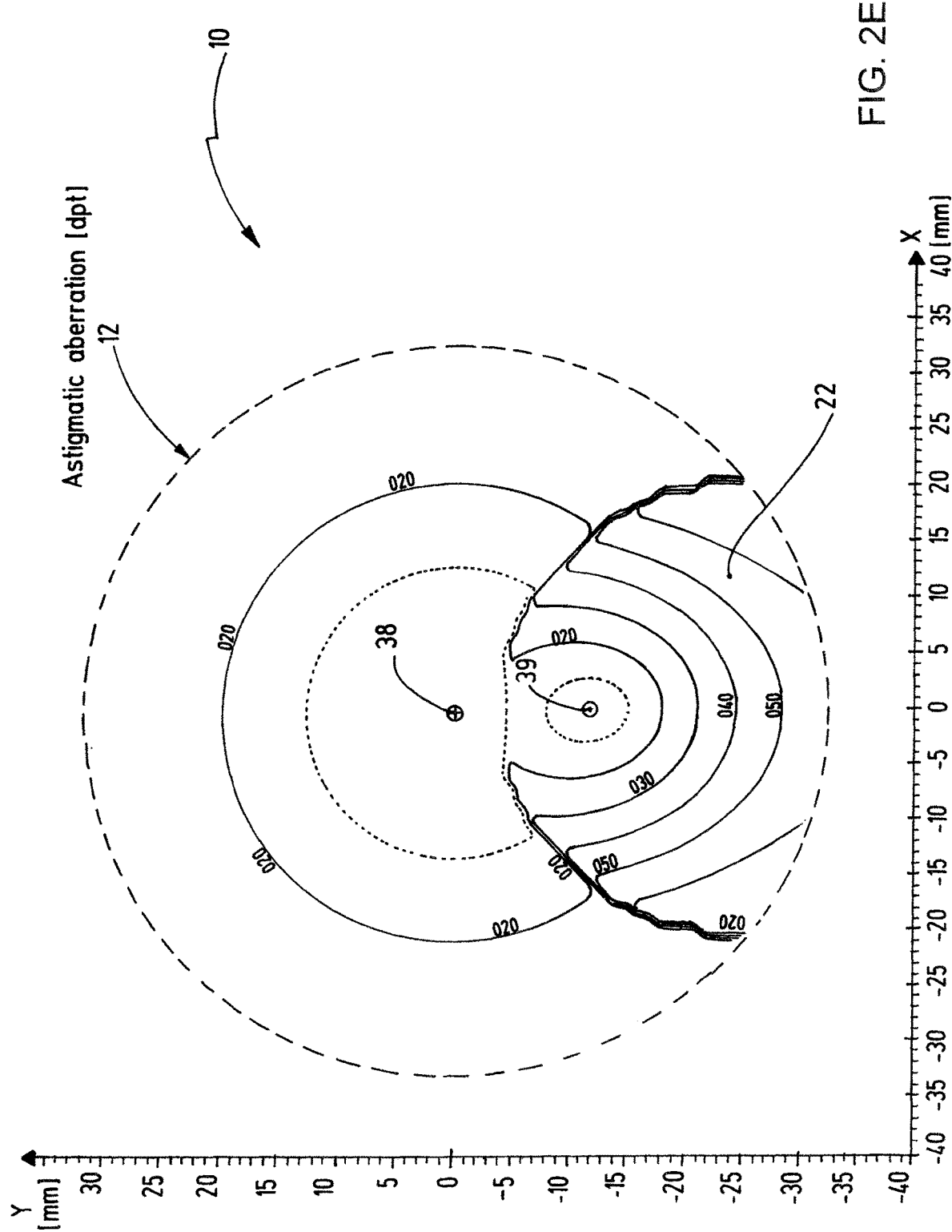
FIG. 2E shows a distribution of the astigmatic aberration in diopters of the embodiment of a spectacle lens in FIG. 2D.

FIGS. 2D and 2E show distributions of total focal power and astigmatic aberration of an embodiment of a spectacle lens 10 according to the current invention. The embodiment is a bifocal spectacle comprising an integral main lens 12 which is a single vision lens being rotationally symmetric about its optical axis. One additional lens element 22 is applied to the front surface of the integral main lens. The additional lens element is a printed element which may be printed via a three-dimensional printer device. The additional lens element is intended to provide a near part providing an addition of +1.0 dpt and having a near reference point 39.

Further, while the surfaces of the additional lens elements have been shown flush in the described examples, other surface forms or cross-sections like continuous shark teeth, waves, digital, i.e. rectangular, triangle or parable shaped surfaces can be formed via the layer elements, c.f. FIG. 2F. By this, so-called Fresnel-structures could be provided to provide desired optical properties with reduced thickness further increasing manufacturing speed due to reduced material needs.

In the following, a table of the sagittas shows the distances from a reference plane for the grid points of an equidistant grid. The grid center is on the optical axis of the integral main lens having coordinates x=0 and y=0. The table shows the distances of the front surface 14 from a reference plane whose origin in the X-, Y-direction is the geometrical center of the progressive lens. All dimensions in X, Y and Z (sagitta) are in millimeters. For the person skilled in the art, the position of the reference plane in space results from the specified values for the forward tilt and the frame lens angle of the lens elements. The Z-direction points towards the eye in this case, that is to say a positive sagitta value describes a surface point closer to the eye, or a negative sagitta value describes a surface point farther removed from the eye.

The integral main lens has a diameter of 65.0 mm, a front surface curvature radius of 120 mm, a back surface curvature radius of 148,892 mm, a thickness (middle, optical axis) of 1,895 mm and a refractive index $n_e$ of 1,600 and a spherical power of 1 dpt. The additional lens element applied to the lower front surface of the integral main lens is toric having a front surface curvature of 103,038 mm in the vertical section (parallel to y-axis) and of 98.553 in the horizontal section (parallel to x-axis). Further, the refractive index of the additional lens element is a refractive index $n_e$ of 1,500. The additional lens element starts 4 mm below the optical axis of the integral main lens, i.e. at coordinates x=0 and y=−4. The sagittas of the front surface of the spectacle lens 10 according to the embodiment are as provided in the following Table 2:

TABLE 2

(sagitta in mm)

| Y (down) | X (right) | | | | | |
|---|---|---|---|---|---|---|
| | −32 | −30 | −28 | −26 | −24 | −22 |
| 32 | | | | | | |
| 30 | | | | | | |
| 28 | | | | | | |
| 26 | | | | | | |
| 24 | | | | | | 4.43438 |
| 22 | | | | | 4.43438 | 4.03679 |
| 20 | | | | 4.50367 | 4.07131 | 3.67497 |
| 18 | | | | 4.17493 | 3.7438 | 3.34857 |
| 16 | | | 4.34783 | 3.88159 | 3.45154 | 3.0573 |
| 14 | | | 4.08858 | 3.62337 | 3.19427 | 2.8009 |
| 12 | | 4.36514 | 3.86435 | 3.40004 | 2.97177 | 2.57914 |
| 10 | | 4.17493 | 3.67497 | 3.21141 | 2.78382 | 2.39182 |
| 8 | 4.55566 | 4.01954 | 3.52024 | 3.0573 | 2.63027 | 2.23878 |
| 6 | 4.43438 | 3.89882 | 3.40004 | 2.93757 | 2.51099 | 2.11989 |
| 4 | 4.34783 | 3.81267 | 3.31426 | 2.85213 | 2.42585 | 2.03504 |
| 2 | 4.29594 | 3.76101 | 3.26282 | 2.8009 | 2.3748 | 1.98416 |
| 0 | 4.27864 | 3.7438 | 3.24568 | 2.78382 | 2.35779 | 1.9672 |
| −2 | 4.29594 | 3.76101 | 3.26282 | 2.8009 | 2.3748 | 1.98416 |
| −4 | 4.34783 | 3.81267 | 3.31426 | 2.85213 | 2.42585 | 2.03504 |
| −6 | 4.43438 | 3.89882 | 3.40004 | 2.93757 | 2.51099 | 2.11989 |
| −8 | 4.55566 | 4.01954 | 3.52024 | 3.0573 | 2.63027 | 2.23878 |
| −10 | | 4.17493 | 3.67497 | 3.21141 | 2.78382 | 2.39182 |
| −12 | | 4.36514 | 3.86435 | 3.40004 | 2.97177 | 2.57914 |
| −14 | | | 4.08858 | 3.62337 | 3.19427 | 2.8009 |
| −16 | | | 4.34783 | 3.88159 | 3.45154 | 3.0573 |
| −18 | | | | 4.17493 | 3.7438 | 3.34857 |
| −20 | | | | 4.50367 | 4.07131 | 3.67497 |
| −22 | | | | | 4.43438 | 4.03679 |
| −24 | | | | | | 4.43438 |
| −26 | | | | | | |
| −28 | | | | | | |
| −30 | | | | | | |
| −32 | | | | | | |

| Y (down) | X (right) | | | | | |
|---|---|---|---|---|---|---|
| | −20 | −18 | −16 | −14 | −12 | −10 |
| 32 | | | | | | |
| 30 | | | | | 4.36514 | 4.17493 |
| 28 | | | 4.34783 | 4.08858 | 3.86435 | 3.67497 |
| 26 | 4.50367 | 4.17493 | 3.88159 | 3.62337 | 3.40004 | 3.21141 |
| 24 | 4.07131 | 3.7438 | 3.45154 | 3.19427 | 2.97177 | 2.78382 |
| 22 | 3.67497 | 3.34857 | 3.0573 | 2.8009 | 2.57914 | 2.39182 |
| 20 | 3.31426 | 2.98887 | 2.69849 | 2.44287 | 2.22179 | 2.03504 |
| 18 | 2.98887 | 2.66438 | 2.3748 | 2.11989 | 1.89941 | 1.71317 |
| 16 | 2.69849 | 2.3748 | 2.08594 | 1.83165 | 1.6117 | 1.42592 |
| 14 | 2.44287 | 2.11989 | 1.83165 | 1.5779 | 1.35843 | 1.17304 |
| 12 | 2.22179 | 1.89941 | 1.6117 | 1.35843 | 1.13936 | 0.95431 |
| 10 | 2.03504 | 1.71317 | 1.42592 | 1.17304 | 0.95431 | 0.76955 |
| 8 | 1.88246 | 1.56101 | 1.27412 | 1.02157 | 0.80312 | 0.61859 |
| 6 | 1.76393 | 1.44279 | 1.1562 | 0.90389 | 0.68566 | 0.50131 |
| 4 | 1.67934 | 1.35843 | 1.07204 | 0.81991 | 0.60183 | 0.41761 |
| 2 | 1.62861 | 1.30784 | 1.02157 | 0.76955 | 0.55156 | 0.36742 |
| 0 | 1.6117 | 1.29098 | 1.00475 | 0.75276 | 0.53481 | 0.35069 |
| −2 | 1.62861 | 1.30784 | 1.02157 | 0.76955 | 0.55156 | 0.36742 |
| −4 | 1.67934 | 1.35843 | 1.07204 | 0.81991 | 0.60183 | 0.41761 |
| −6 | 1.76393 | 1.44279 | 1.1562 | 0.90389 | 0.68566 | 0.50131 |
| −8 | 1.88246 | 1.56101 | 1.27412 | 1.02157 | 0.80312 | 0.58671 |
| −10 | 2.03504 | 1.71317 | 1.42592 | 1.17304 | 0.9094 | 0.68436 |
| −12 | 2.22179 | 1.89941 | 1.6117 | 1.31355 | 1.04657 | 0.82124 |
| −14 | 2.44287 | 2.11989 | 1.80015 | 1.49065 | 1.22321 | 0.99748 |
| −16 | 2.69849 | 2.37043 | 2.0177 | 1.70753 | 1.43952 | 1.21331 |
| −18 | 2.98887 | 2.62904 | 2.2754 | 1.96444 | 1.69575 | 1.46898 |
| −20 | 3.31426 | 2.92826 | 2.57357 | 2.26169 | 1.99221 | 1.76477 |
| −22 | 3.66781 | 3.26847 | 2.91257 | 2.59964 | 2.32925 | 2.10106 |
| −24 | 4.05096 | 3.65008 | 3.29282 | 2.9787 | 2.70729 | 2.47823 |
| −26 | 4.47617 | 4.07356 | 3.71478 | 3.39933 | 3.12678 | 2.89677 |
| −28 | | | 4.179 | 3.86207 | 3.58826 | 3.35718 |
| −30 | | | | | 4.0923 | 3.86004 |
| −32 | | | | | | |

TABLE 2-continued (sagitta in mm)

| | X (right) | | | | | |
|---|---|---|---|---|---|---|
| Y (down) | −8 | −6 | −4 | −2 | 0 | 2 |
| 32 | 4.55566 | 4.43438 | 4.34783 | 4.29594 | 4.27864 | 4.29594 |
| 30 | 4.01954 | 3.89882 | 3.81267 | 3.76101 | 3.7438 | 3.76101 |
| 28 | 3.52024 | 3.40004 | 3.31426 | 3.26282 | 3.24568 | 3.26282 |
| 26 | 3.0573 | 2.93757 | 2.85213 | 2.8009 | 2.78382 | 2.8009 |
| 24 | 2.63027 | 2.51099 | 2.42585 | 2.3748 | 2.35779 | 2.3748 |
| 22 | 2.23878 | 2.11989 | 2.03504 | 1.98416 | 1.9672 | 1.98416 |
| 20 | 1.88246 | 1.76393 | 1.67934 | 1.62861 | 1.6117 | 1.62861 |
| 18 | 1.56101 | 1.44279 | 1.35843 | 1.30784 | 1.29098 | 1.30784 |
| 16 | 1.27412 | 1.1562 | 1.07204 | 1.02157 | 1.00475 | 1.02157 |
| 14 | 1.02157 | 0.90389 | 0.81991 | 0.76955 | 0.75276 | 0.76955 |
| 12 | 0.80312 | 0.68566 | 0.60183 | 0.55156 | 0.53481 | 0.55156 |
| 10 | 0.61859 | 0.50131 | 0.41761 | 0.36742 | 0.35069 | 0.36742 |
| 8 | 0.46782 | 0.35069 | 0.2671 | 0.21697 | 0.20026 | 0.21697 |
| 6 | 0.35069 | 0.23368 | 0.15016 | 0.10008 | 0.08339 | 0.10008 |
| 4 | 0.2671 | 0.15016 | 0.06671 | 0.01666 | −0.00001 | 0.01666 |
| 2 | 0.21697 | 0.10008 | 0.01666 | −0.03336 | −0.05003 | −0.03336 |
| 0 | 0.20026 | 0.08339 | −0.00001 | −0.05003 | −0.0667 | −0.05003 |
| −2 | 0.21697 | 0.10008 | 0.01666 | −0.03336 | −0.05003 | −0.03336 |
| −4 | 0.2671 | 0.15016 | 0.06671 | 0.01666 | −0.00001 | 0.01666 |
| −6 | 0.34471 | 0.20226 | 0.10064 | 0.03971 | 0.01941 | 0.03971 |
| −8 | 0.40315 | 0.26062 | 0.15894 | 0.09798 | 0.07767 | 0.09798 |
| −10 | 0.50063 | 0.35796 | 0.25619 | 0.19517 | 0.17484 | 0.19517 |
| −12 | 0.63726 | 0.4944 | 0.39249 | 0.33139 | 0.31103 | 0.33139 |
| −14 | 0.81319 | 0.67009 | 0.568 | 0.5068 | 0.48641 | 0.5068 |
| −16 | 1.02863 | 0.88522 | 0.78292 | 0.72159 | 0.70116 | 0.72159 |
| −18 | 1.28383 | 1.14006 | 1.0375 | 0.97602 | 0.95554 | 0.97602 |
| −20 | 1.57908 | 1.4349 | 1.33205 | 1.27039 | 1.24984 | 1.27039 |
| −22 | 1.91475 | 1.77009 | 1.66689 | 1.60503 | 1.58442 | 1.60503 |
| −24 | 2.29123 | 2.14603 | 2.04245 | 1.98036 | 1.95967 | 1.98036 |
| −26 | 2.70898 | 2.56318 | 2.45917 | 2.39682 | 2.37604 | 2.39682 |
| −28 | 3.16852 | 3.02205 | 2.91757 | 2.85493 | 2.83406 | 2.85493 |
| −30 | 3.67044 | 3.52323 | 3.41822 | 3.35527 | 3.33429 | 3.35527 |
| −32 | 4.21537 | 4.06735 | 3.96176 | 3.89847 | 3.87738 | 3.89847 |

| | X (right) | | | | | |
|---|---|---|---|---|---|---|
| Y (down) | 4 | 6 | 8 | 10 | 12 | 14 |
| 32 | 4.34783 | 4.43438 | 4.55566 | | | |
| 30 | 3.81267 | 3.89882 | 4.01954 | 4.17493 | 4.36514 | |
| 28 | 3.31426 | 3.40004 | 3.52024 | 3.67497 | 3.86435 | 4.08858 |
| 26 | 2.85213 | 2.93757 | 3.0573 | 3.21141 | 3.40004 | 3.62337 |
| 24 | 2.42585 | 2.51099 | 2.63027 | 2.78382 | 2.97177 | 3.19427 |
| 22 | 2.03504 | 2.11989 | 2.23878 | 2.39182 | 2.57914 | 2.8009 |
| 20 | 1.67934 | 1.76393 | 1.88246 | 2.03504 | 2.22179 | 2.44287 |
| 18 | 1.35843 | 1.44279 | 1.56101 | 1.71317 | 1.89941 | 2.11989 |
| 16 | 1.07204 | 1.1562 | 1.27412 | 1.42592 | 1.6117 | 1.83165 |
| 14 | 0.81991 | 0.90389 | 1.02157 | 1.17304 | 1.35843 | 1.5779 |
| 12 | 0.60183 | 0.68566 | 0.80312 | 0.95431 | 1.13936 | 1.35843 |
| 10 | 0.41761 | 0.50131 | 0.61859 | 0.76955 | 0.95431 | 1.17304 |
| 8 | 0.2671 | 0.35069 | 0.46782 | 0.61859 | 0.80312 | 1.02157 |
| 6 | 0.15016 | 0.23368 | 0.35069 | 0.50131 | 0.68566 | 0.90389 |
| 4 | 0.06671 | 0.15016 | 0.2671 | 0.41761 | 0.60183 | 0.81991 |
| 2 | 0.01666 | 0.10008 | 0.21697 | 0.36742 | 0.55156 | 0.76955 |
| 0 | −0.00001 | 0.08339 | 0.20026 | 0.35069 | 0.53481 | 0.75276 |
| −2 | 0.01666 | 0.10008 | 0.21697 | 0.36742 | 0.55156 | 0.76955 |
| −4 | 0.06671 | 0.15016 | 0.2671 | 0.41761 | 0.60183 | 0.81991 |
| −6 | 0.10064 | 0.20226 | 0.34471 | 0.50131 | 0.68566 | 0.90389 |
| −8 | 0.15894 | 0.26062 | 0.40315 | 0.58671 | 0.80312 | 1.02157 |
| −10 | 0.25619 | 0.35796 | 0.50063 | 0.68436 | 0.9094 | 1.17304 |
| −12 | 0.39249 | 0.4944 | 0.63726 | 0.82124 | 1.04657 | 1.31355 |
| −14 | 0.568 | 0.67009 | 0.81319 | 0.99748 | 1.22321 | 1.49065 |
| −16 | 0.78292 | 0.88522 | 1.02863 | 1.21331 | 1.43952 | 1.70753 |
| −18 | 1.0375 | 1.14006 | 1.28383 | 1.46898 | 1.69575 | 1.96444 |
| −20 | 1.33205 | 1.4349 | 1.57908 | 1.76477 | 1.99221 | 2.26169 |
| −22 | 1.66689 | 1.77009 | 1.91475 | 2.10106 | 2.32925 | 2.59964 |
| −24 | 2.04245 | 2.14603 | 2.29123 | 2.47823 | 2.70729 | 2.9787 |
| −26 | 2.45917 | 2.56318 | 2.70898 | 2.89677 | 3.12678 | 3.39933 |
| −28 | 2.91757 | 3.02205 | 3.16852 | 3.35718 | 3.58826 | 3.86207 |
| −30 | 3.41822 | 3.52323 | 3.67044 | 3.86004 | 4.0923 | |
| −32 | 3.96176 | 4.06735 | 4.21537 | | | |

TABLE 2-continued (sagitta in mm)

| | X (right) | | | | | |
|---|---|---|---|---|---|---|
| Y (down) | 16 | 18 | 20 | 22 | 24 | 26 |
| 32 | | | | | | |
| 30 | | | | | | |
| 28 | 4.34783 | | | | | |
| 26 | 3.88159 | 4.17493 | 4.50367 | | | |
| 24 | 3.45154 | 3.7438 | 4.07131 | 4.43438 | | |
| 22 | 3.0573 | 3.34857 | 3.67497 | 4.03679 | 4.43438 | |
| 20 | 2.69849 | 2.98887 | 3.31426 | 3.67497 | 4.07131 | 4.50367 |
| 18 | 2.3748 | 2.66438 | 2.98887 | 3.34857 | 3.7438 | 4.17493 |
| 16 | 2.08594 | 2.3748 | 2.69849 | 3.0573 | 3.45154 | 3.88159 |
| 14 | 1.83165 | 2.11989 | 2.44287 | 2.8009 | 3.19427 | 3.62337 |
| 12 | 1.6117 | 1.89941 | 2.22179 | 2.57914 | 2.97177 | 3.40004 |
| 10 | 1.42592 | 1.71317 | 2.03504 | 2.39182 | 2.78382 | 3.21141 |
| 8 | 1.27412 | 1.56101 | 1.88246 | 2.23878 | 2.63027 | 3.0573 |
| 6 | 1.1562 | 1.44279 | 1.76393 | 2.11989 | 2.51099 | 2.93757 |
| 4 | 1.07204 | 1.35843 | 1.67934 | 2.03504 | 2.42585 | 2.85213 |
| 2 | 1.02157 | 1.30784 | 1.62861 | 1.98416 | 2.3748 | 2.8009 |
| 0 | 1.00475 | 1.29098 | 1.6117 | 1.9672 | 2.35779 | 2.78382 |
| −2 | 1.02157 | 1.30784 | 1.62861 | 1.98416 | 2.3748 | 2.8009 |
| −4 | 1.07204 | 1.35843 | 1.67934 | 2.03504 | 2.42585 | 2.85213 |
| −6 | 1.1562 | 1.44279 | 1.76393 | 2.11989 | 2.51099 | 2.93757 |
| −8 | 1.27412 | 1.56101 | 1.88246 | 2.23878 | 2.63027 | 3.0573 |
| −10 | 1.42592 | 1.71317 | 2.03504 | 2.39182 | 2.78382 | 3.21141 |
| −12 | 1.6117 | 1.89941 | 2.22179 | 2.57914 | 2.97177 | 3.40004 |
| −14 | 1.80015 | 2.11989 | 2.44287 | 2.8009 | 3.19427 | 3.62337 |
| −16 | 2.0177 | 2.37043 | 2.69849 | 3.0573 | 3.45154 | 3.88159 |
| −18 | 2.2754 | 2.62904 | 2.98887 | 3.34857 | 3.7438 | 4.17493 |
| −20 | 2.57357 | 2.92826 | 3.31426 | 3.67497 | 4.07131 | 4.50367 |
| −22 | 2.91257 | 3.26847 | 3.66781 | 4.03679 | 4.43438 | |
| −24 | 3.29282 | 3.65008 | 4.05096 | 4.43438 | | |
| −26 | 3.71478 | 4.07356 | 4.47617 | | | |
| −28 | 4.179 | | | | | |
| −30 | | | | | | |
| −32 | | | | | | |

| | X (right) | | |
|---|---|---|---|
| Y (down) | 28 | 30 | 32 |
| 32 | | | |
| 30 | | | |
| 28 | | | |
| 26 | | | |
| 24 | | | |
| 22 | | | |
| 20 | | | |
| 18 | | | |
| 16 | 4.34783 | | |
| 14 | 4.08858 | | |
| 12 | 3.86435 | 4.36514 | |
| 10 | 3.67497 | 4.17493 | |
| 8 | 3.52024 | 4.01954 | 4.55566 |
| 6 | 3.40004 | 3.89882 | 4.43438 |
| 4 | 3.31426 | 3.81267 | 4.34783 |
| 2 | 3.26282 | 3.76101 | 4.29594 |
| 0 | 3.24568 | 3.7438 | 4.27864 |
| −2 | 3.26282 | 3.76101 | 4.29594 |
| −4 | 3.31426 | 3.81267 | 4.34783 |
| −6 | 3.40004 | 3.89882 | 4.43438 |
| −8 | 3.52024 | 4.01954 | 4.55566 |
| −10 | 3.67497 | 4.17493 | |
| −12 | 3.86435 | 4.36514 | |
| −14 | 4.08858 | | |
| −16 | 4.34783 | | |
| −18 | | | |
| −20 | | | |
| −22 | | | |
| −24 | | | |
| −26 | | | |
| −28 | | | |
| −30 | | | |
| −32 | | | |

As derivable from the table, the additional lens element extends up to the edge of the spectacle lens in the lower half (coordinates x=0, y=−32). As the additional lens element is applied in the lower half of the front surface only (negative y-values), the isolated sagittas of the additional lens element may be found by subtracting the sagitta values of the lower half from the respective sagitta values of the upper half, e.g. value for [x=0, y=+32] minus value for [x=0, y=−32].

As derivable from FIGS. 2D and 2E, the spectacle lens according to this embodiment has focal power of exactly 2.0 dpt in the near reference point at coordinates x=0 and y=−12. Hence, the addition is +1.0 dpt, as desired. The distribution of the focal powers in diopters and of the astigmatic aberration in diopters is shown in FIGS. 2D and 2E. The aberrations are provided for an infinite object distance.

Figure 3:
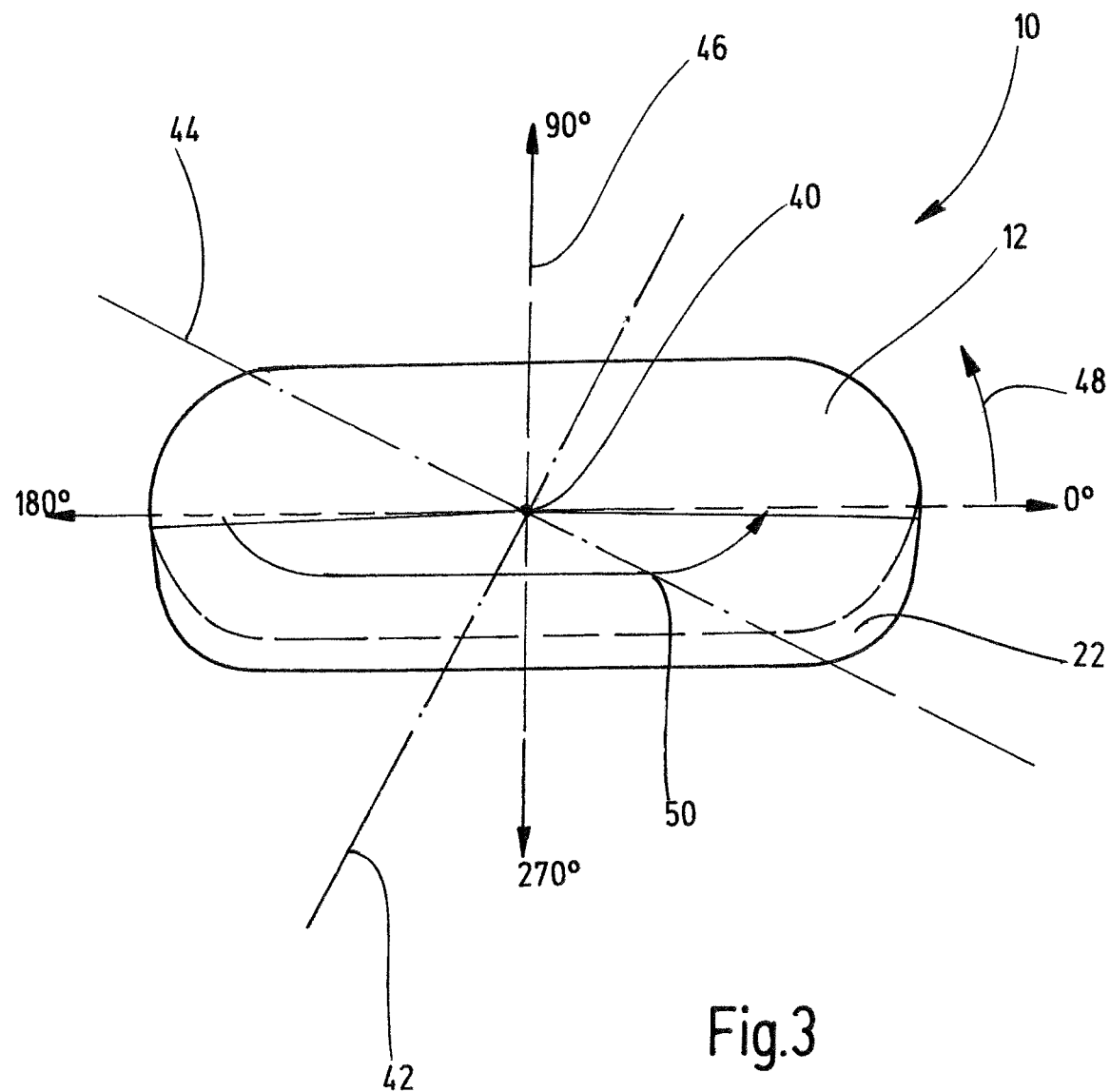
FIG. 3 shows a top view of the spectacle lens shown in FIGS. 1 and 2.

FIG. 3 represents a spectacle lens 10. The spectacle lens 10 in FIG. 3 is edged, formed from an essentially circular spectacle lens product or uncut spectacle lens, then might have an essentially rectangular shape with rounded edges.

The representation in FIG. 3 is for explaining how the terms "axial position angle" or "axial position range" are to be interpreted in the context of the application. In a box frame of the spectacle lens 10 in FIG. 3, a geometrical center of the spectacle lens 10 can be found. The geometrical center axis 40 then extends through the spectacle lens 10 through geometric centers on the front and back surfaces. Possible cross-sectional planes 42, 44 then contain this geometrical center axis 40 which cross-sectional planes are the planes in which the main curvatures 18, 20 of the front and back surfaces 14, 16 lie. In case of a rotationally symmetric spectacle lens, the geometrical could be the optical axis, making the planes 42, 44 meridians. However, in general the optical axis may be offset from the geometrical center.

Starting from the geometrical center 40 as the origin, in a similar way to the so-called TABO scheme for determining the base position of a prismatic power, a plurality of axes 46 can then be defined and a corresponding axial position angle 48 can be specified. A so-called "axial position range" is then a range of axial position angles 48. An example of an axial position range 50 is denoted by an arrow and comprises an extent of about 170°. In this way, it is possible to describe an extent of the additional lens element 22 over the circumference of the spectacle lens. In particular, the additional lens element 22 may therefore extend over an axial position range of less than 175°, in particular less than 120°, in particular less than 90°.

Figure 4:
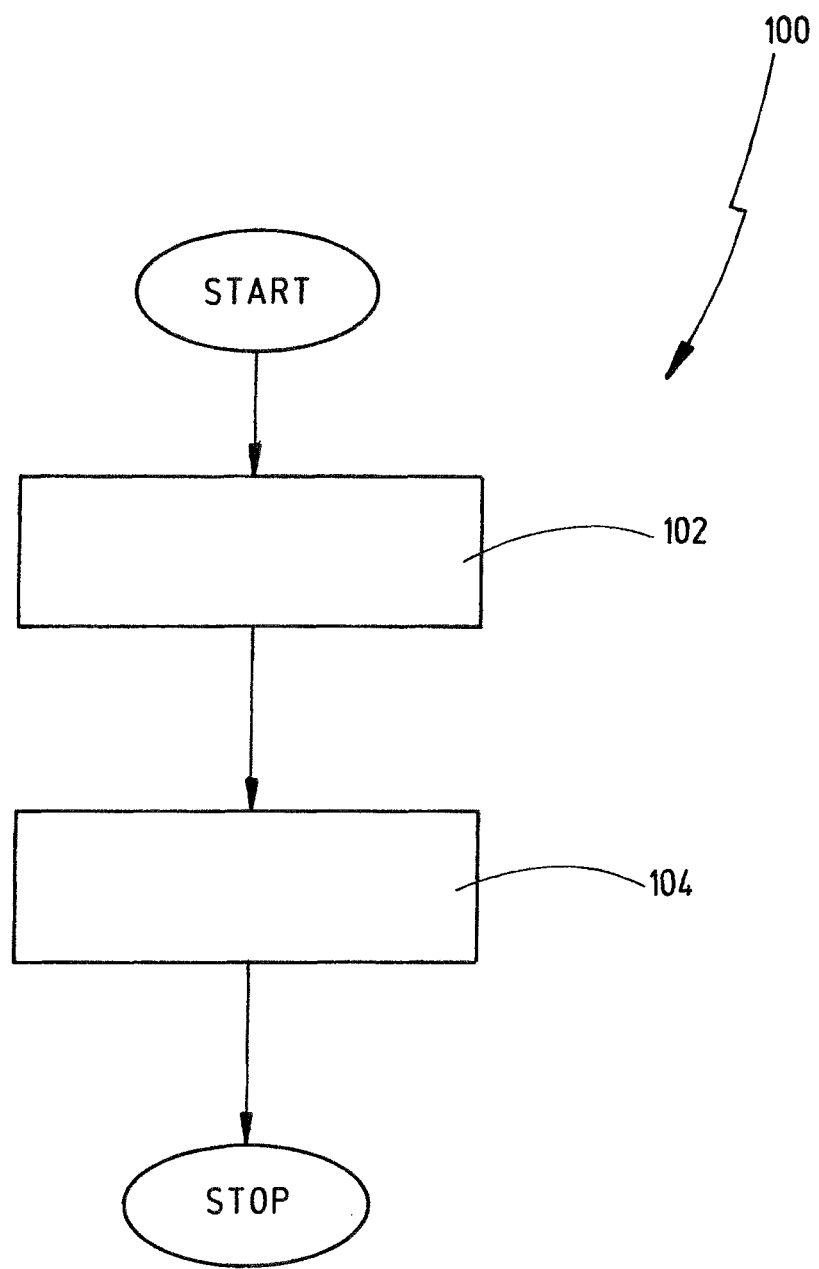
FIG. 4 shows an embodiment of a method.

FIG. 4 shows an embodiment of a method 100. After the method 100 has started, a first step 102 of providing an integral main lens 12, wherein the integral main lens 12 has a front surface 14 and a back surface 16, and wherein the integral main lens 12 is a spherical power lens or astigmatic power lens and/or has a main curvature 18 of the front surface 14 and a main curvature 20 of the back surface 16 which are different from each other so as to provide for a single spherical power different from 0.

Hence, an integral main lens as, for example, described in connection with FIGS. 1, 2A to 2F and 3 is provided.

The provision of the integral main lens may, for example, be conducted by placing the integral main lens 12 into a three-dimensional printing device. In particular, such provision could also be conducted automatically by choosing a proper integral main lens 12 based on the user data out of a stock, delivering it towards the three-dimensional printing device and placing it so that the additional lens element 22 may be applied to it. Of course, the step of providing could also be conducted by manual placement. Further, the step of providing the integral main lens comprises providing the integral main lens 12 together with a frame (not depicted), wherein the integral main lens 12 is already edged to fit into the frame. Further, the integral main lens 12 may be provided fitted into the frame and the method 100 may comprise the further step of removing the integral main lens 12 from the frame before the step of applying 104 the integral main lens 12 is conducted.

Subsequently, a step 104 of applying at least one additional lens element 22 to at least a part of the front surface and/or at least a part of the back surface is conducted, wherein the at least one additional lens element is comprised of at least one layer having a multitude of layer elements, in particular, wherein the layer elements are printed layer elements. Hence, preferably, the step of applying is conducted as a step of three-dimensionally printing.

Figure 5:
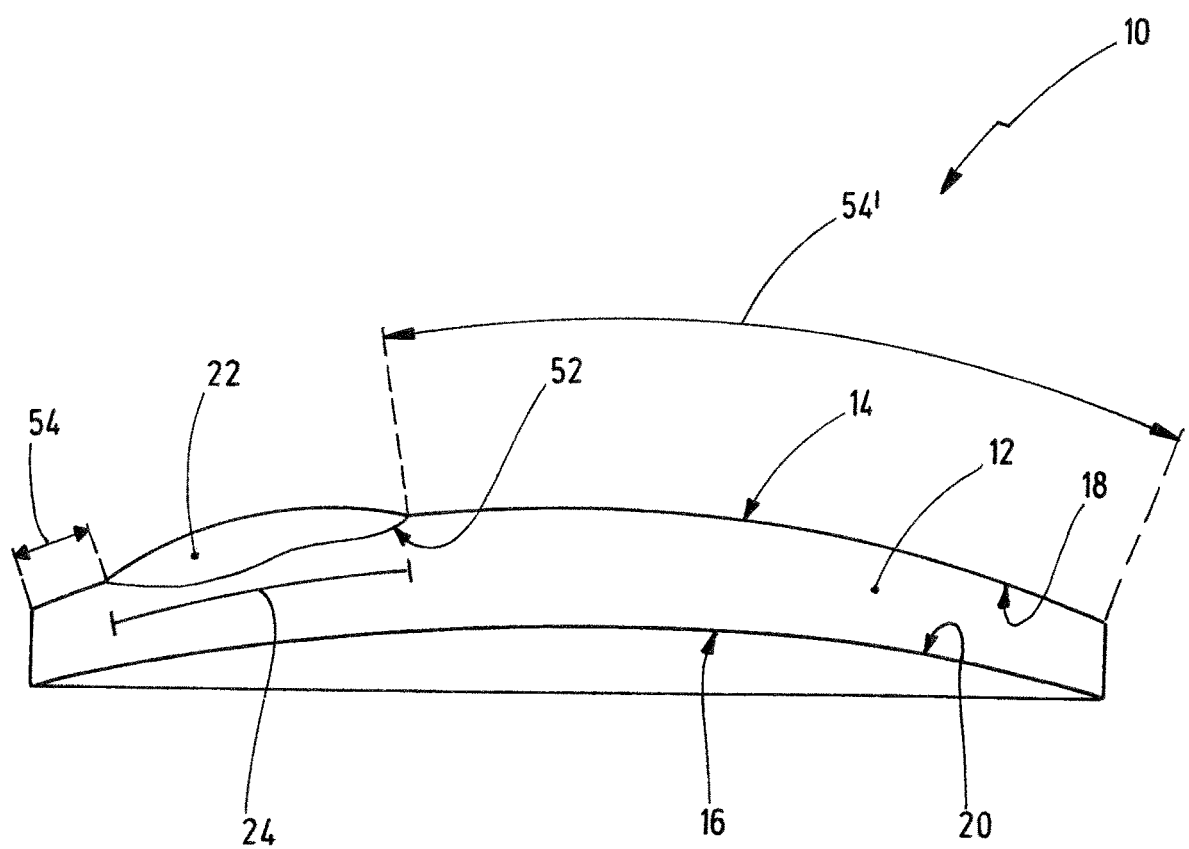
FIG. 5 shows a further embodiment of a spectacle lens 10.

FIG. 5 shows another embodiment of a spectacle lens 10. Like elements are designated with like reference numerals and will not be repeated again.

The embodiment depicted in FIG. 5 has an integral main lens 12 with a front surface 14 that comprises a recess 52. Still, the front surface 14 has a main curvature in the cross-sectional plane depicted in FIG. 5. Sections of the front surface having the main curvature are designated by reference numerals 54 and 54'. Hence, the recess 52 and the surface in the recess 52 is not to be considered as part of the main curvature. In general, a recessed portion or flattened portion does not have the main curvature. Still, the main curvature in portions 54 and 54' is different from the main curvature 20 of the back surface 16. As the main curvature 18 in portions 54 and 54' of the front surface 14 and the main curvature 20 of the back surface 16 are different from each other, they provide for a spherical power different from 0. In particular, this spherical power shall correspond to that of a prescription of a spectacle wearer to which the spectacle lens 10 shall apply.

The additional lens element 22 is then applied to the recess 52. By this, better individually adapted near portions may be provided in the part 24 of the front surface 14 of the integral main lens 12. Again, the additional lens element 22 may comprise layer elements 34 to 37 made of at least two different materials. Hence, the overall refractive index and/or Abbe number of the additional lens element 22 can be designed taking into account the refractive index and the Abbe number of the integral main lens 12 so as to provide for proper optical powers in a near portion while requiring less material printed to apply the additional lens element 22. In particular, a buckle on the front surface 14 could be reduced. Further, by properly mixing at least two different materials for providing the individual layer elements, a gradient in the refractive index can be applied to the additional lens element 22, in particular in a radial direction.

Figure 6:
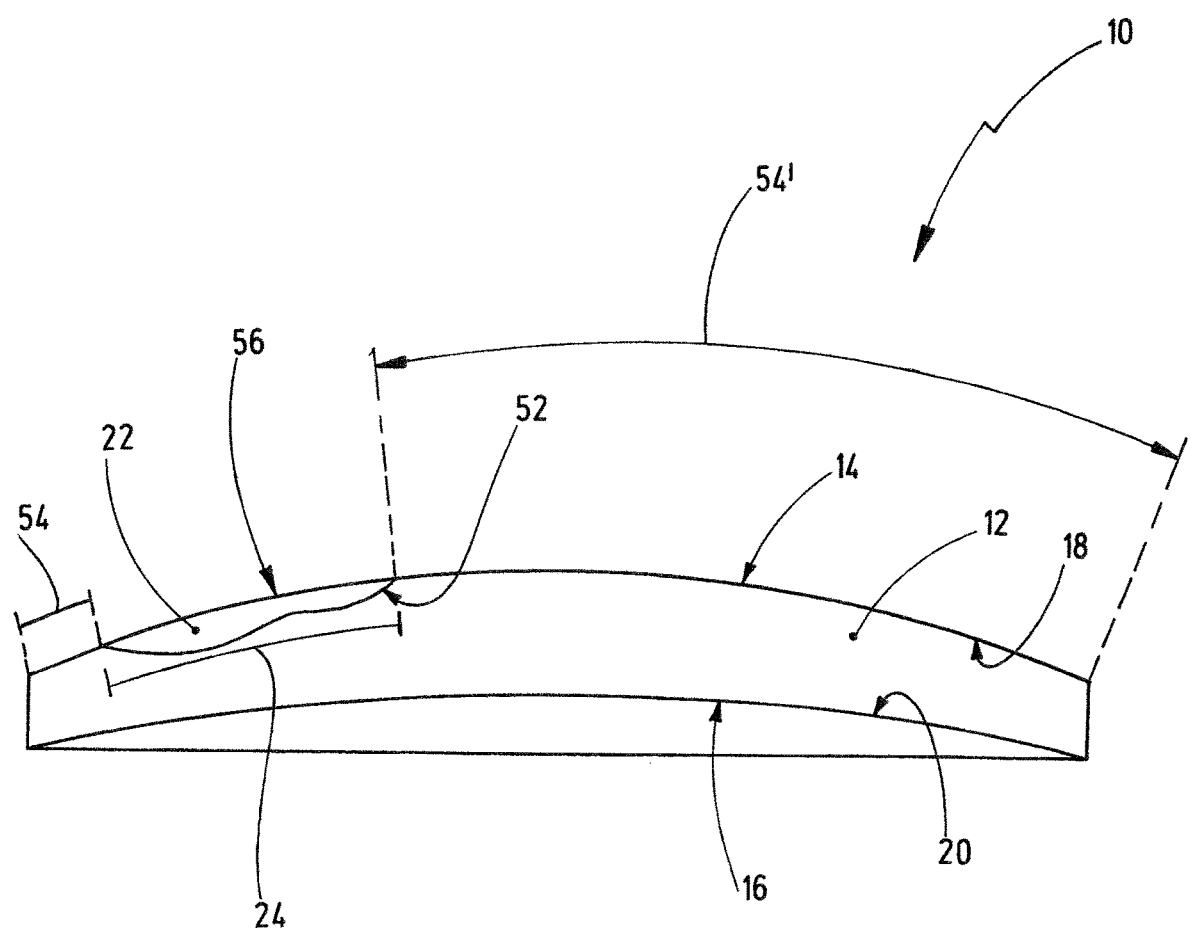
FIG. 6 shows another further embodiment of a spectacle lens 10.

In FIG. 6 there is shown a further embodiment of a spectacle lens 10 similar to that shown in FIG. 5. Like elements are designated with like reference numerals and are therefore not explained again.

In the embodiment shown in FIG. 6, a surface 56 of the additional lens element 22 is flush with the front surface 14 of the integral main lens 12 and, hence, the main curvature 18 of the integral main lens 14 is the same as of the surface 56. By this, a progressive power lens can be provided. In such embodiments, the materials of the layer elements 35 to 37 of the additional lens element 22 need to be different in refractive index from the integral main lens 12 so as to provide for sufficient focal powers, i.e. spherical and astigmatic powers, in the part 24 the additional lens element 22 is applied to provide a near portion individually adapted to the wearer of the spectacle lens 10.

FIGS. 7, 8, 9A and 9B show further embodiments of a spectacle lens 10. Like elements are designated with like reference numerals and will not be explained again.

Figure 7:
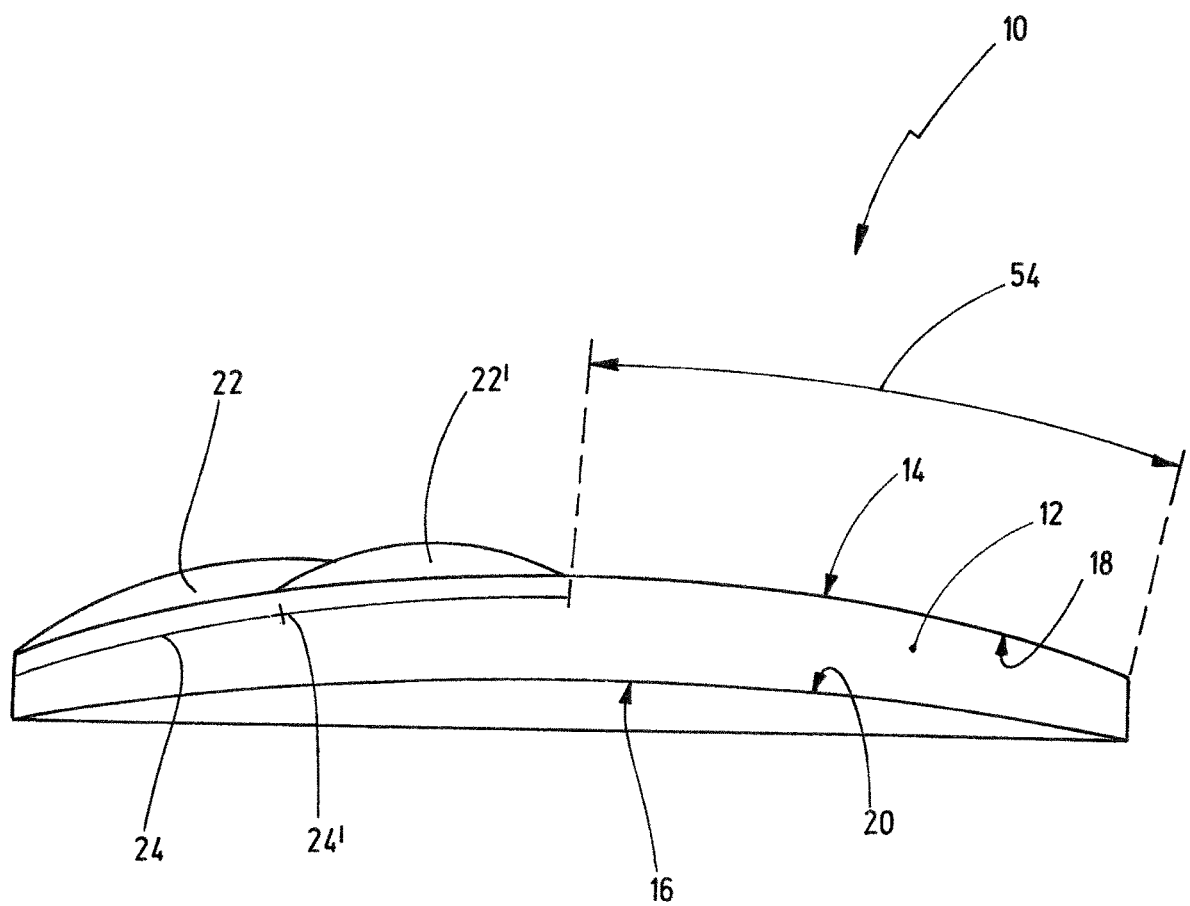
FIG. 7 shows yet another embodiment of a spectacle lens 10.
Figure 8:
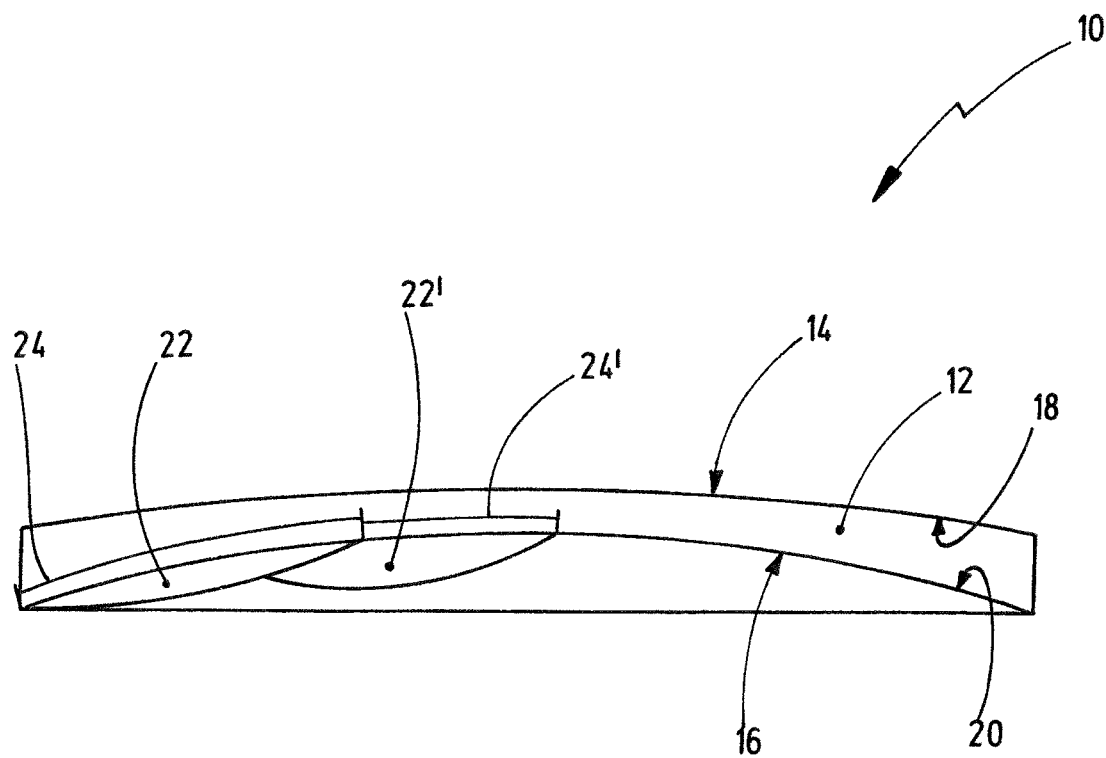
FIG. 8 shows yet another embodiment of a spectacle lens 10.

In the embodiment in FIG. 7, two additional lens elements 22 and 22' are applied to the front surface 14 of the spectacle lens. Hence, the first additional lens element 22 covers a part 24 of the front surface 14. A second additional lens element 22' covers a further part 24' of the front surface 14. As the additional lens elements 22 and 22' are added to the integral main lens 12, the main curvature 18 of the front surface 14 extends over the whole front surface in the portion uncovered by additional lens elements 22 and 22' designated with the reference numeral 54 and underneath the additional lens elements 22 and 22'. By this, a so-called trifocal lens can be provided in a cost-effective and quick manner.

In the embodiment in FIG. 8, again a trifocal lens is provided. In that embodiment, the two additional lens elements 22 and 22' are provided on the back surface 16. Therefore, no bucklings on the front surface 14 would occur.

The embodiment of FIG. 9A shows, again, two additional lens elements 22 and 22'. Both additional elements 22 and 22' are provided in corresponding recesses 52 and 52' one of which is provided in the front surface 14 and one of which is provided in the back surface 16. By choosing proper materials for the layer elements of the additional lens elements 22 and 22', a surface 56 of the first additional lens element 22 and surface 56' of a second additional lens element 22' can be provided flush or smooth with corresponding front surface 14 and back surface 16 of the integral main lens 12. This may help to provide a progressive power lens having a near portion with a better gradient in addition and extending over a larger viewing area.

Figure 9A:
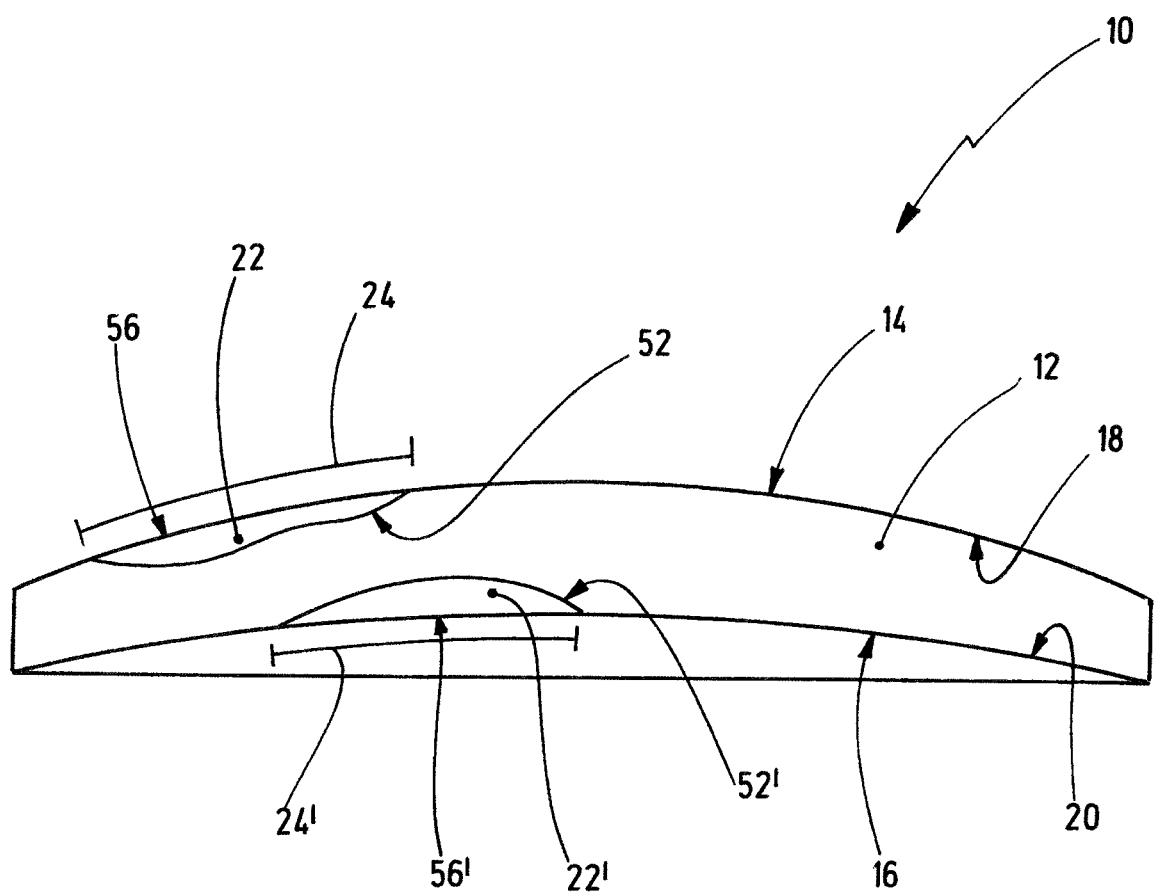
FIG. 9A shows yet another embodiment of a spectacle lens 10 having additional lens elements applied in recesses to the front and back surfaces.
Figure 9B:
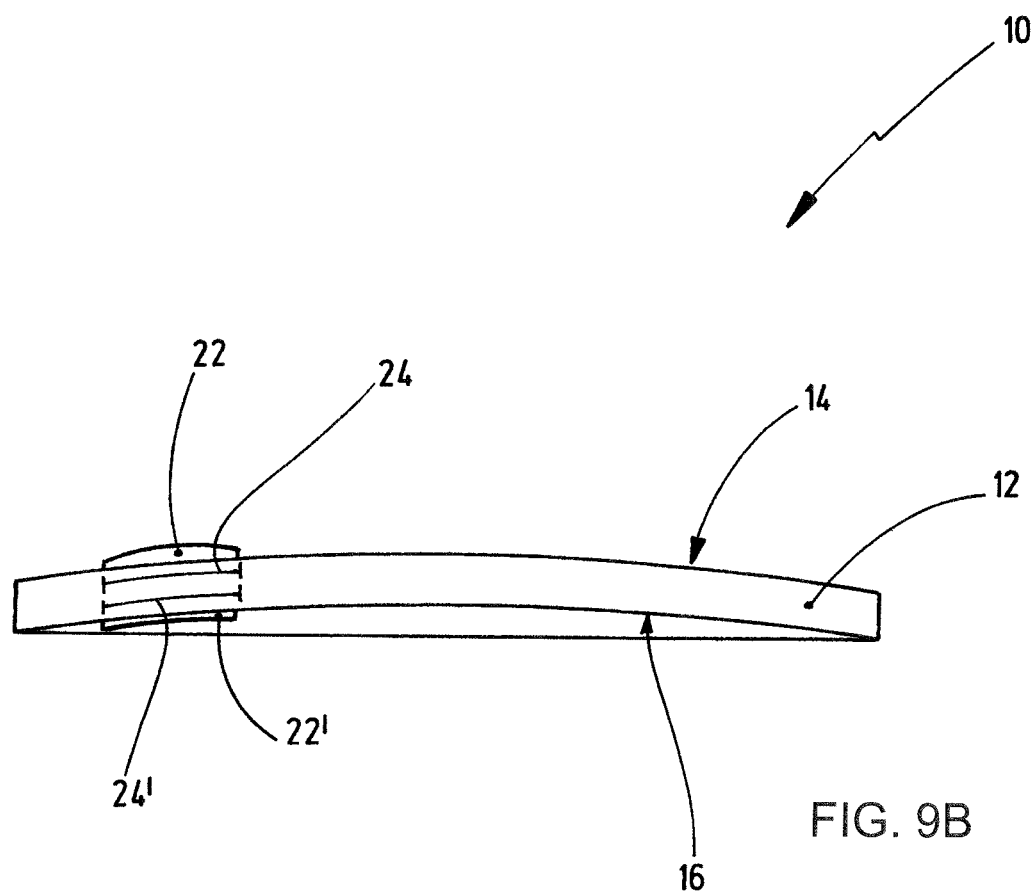
FIG. 9B shows yet another embodiment of a spectacle lens 10 having additional lens elements applied to the front and back surfaces to provide for a magnifying lens.

The embodiment in FIG. 9B shows an additional lens element 22 applied to the front surface 14 and an additional lens element 22' applied to the back surface. Both additional lens elements 22, 22' are applied to corresponding parts 24, 24' of the front and back surfaces 14, 16 so as to provide for strong magnification in area of the spectacle lens 10. Hence, a magnifying spectacle lens may be formed.

FIGS. 10 to 13 show different embodiments of a spectacle lens 10 having more than one additional lens element 22. However, in every embodiment in FIGS. 10 to 13, at least one of the additional lens elements is provided covering a complete surface that is either the front surface 14 or the back surface 16 of the spectacle lens 10. Like elements are designated with like reference numerals and will not be explained again.

Figure 10:
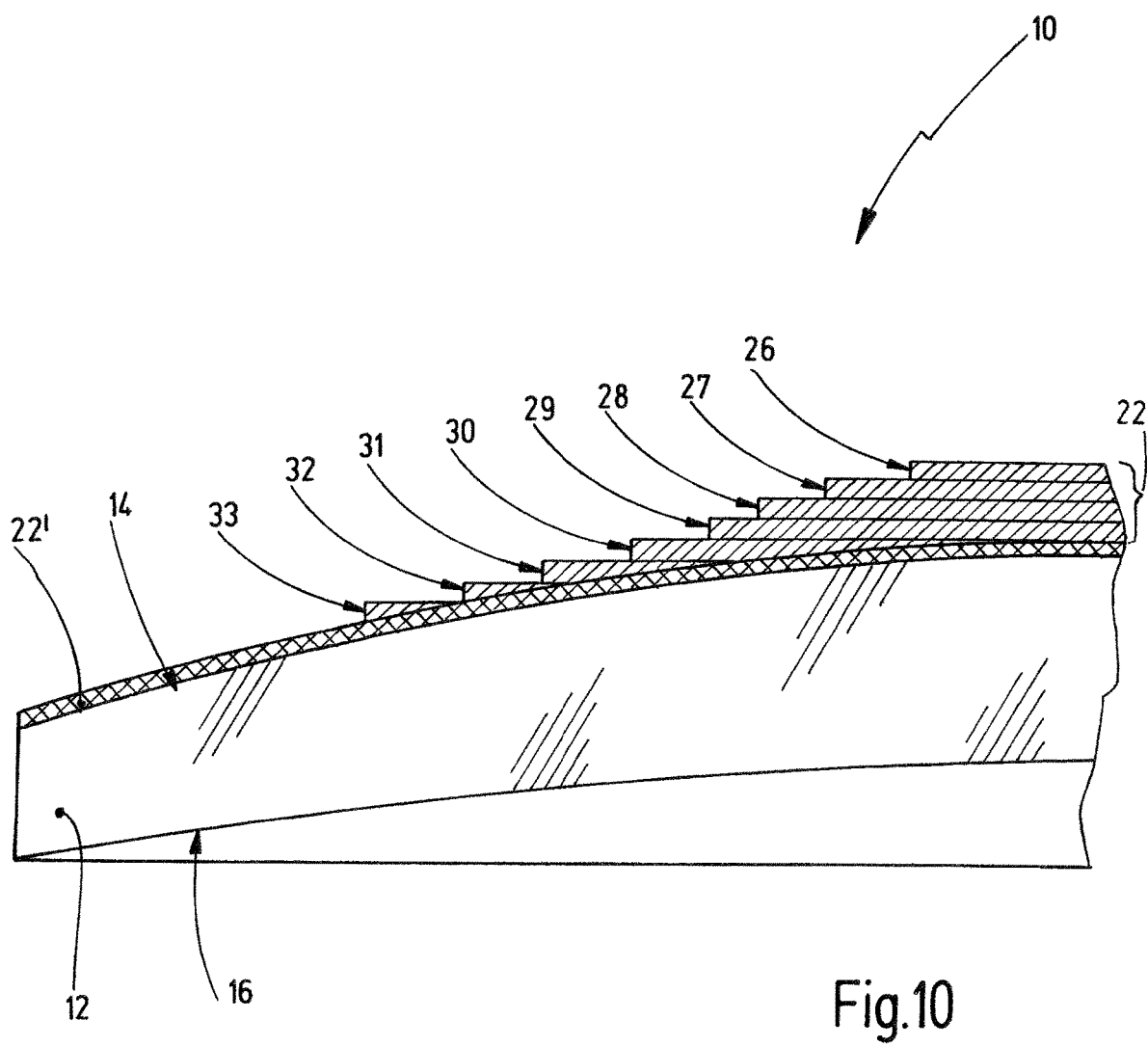
FIG. 10 shows a close-up and magnified detailed portion of yet another embodiment of a spectacle lens 10.

In FIG. 10, an additional lens element 22 is provided over the complete surface of the integral main lens 12. This additional lens element 22' may comprise only one layer. Such an additional lens element provided over the complete surface of the integral main lens 12 may comprise properties similar to that of a layer of coating well known in the art. For example, such an additional lens 22' may be applied of a material so as to form a hard coat or a primer coating to support adherence of a further additional lens element 22 applied then onto the additional lens element 22'. Further, such an additional lens element 22' applied over the complete surface may take properties which are usually applied via foils. In particular, such an additional lens element may have polarizing properties, photochromic properties or provide certain colors. Further, switchable functions may be possible, i.e. properties of the additional lens element changing whether a current is applied to it or not. Of course, additional lens elements covering complete surfaces may be provided as shown below, not only on the front surface 14 but also on the back surface 16.

Figure 11:
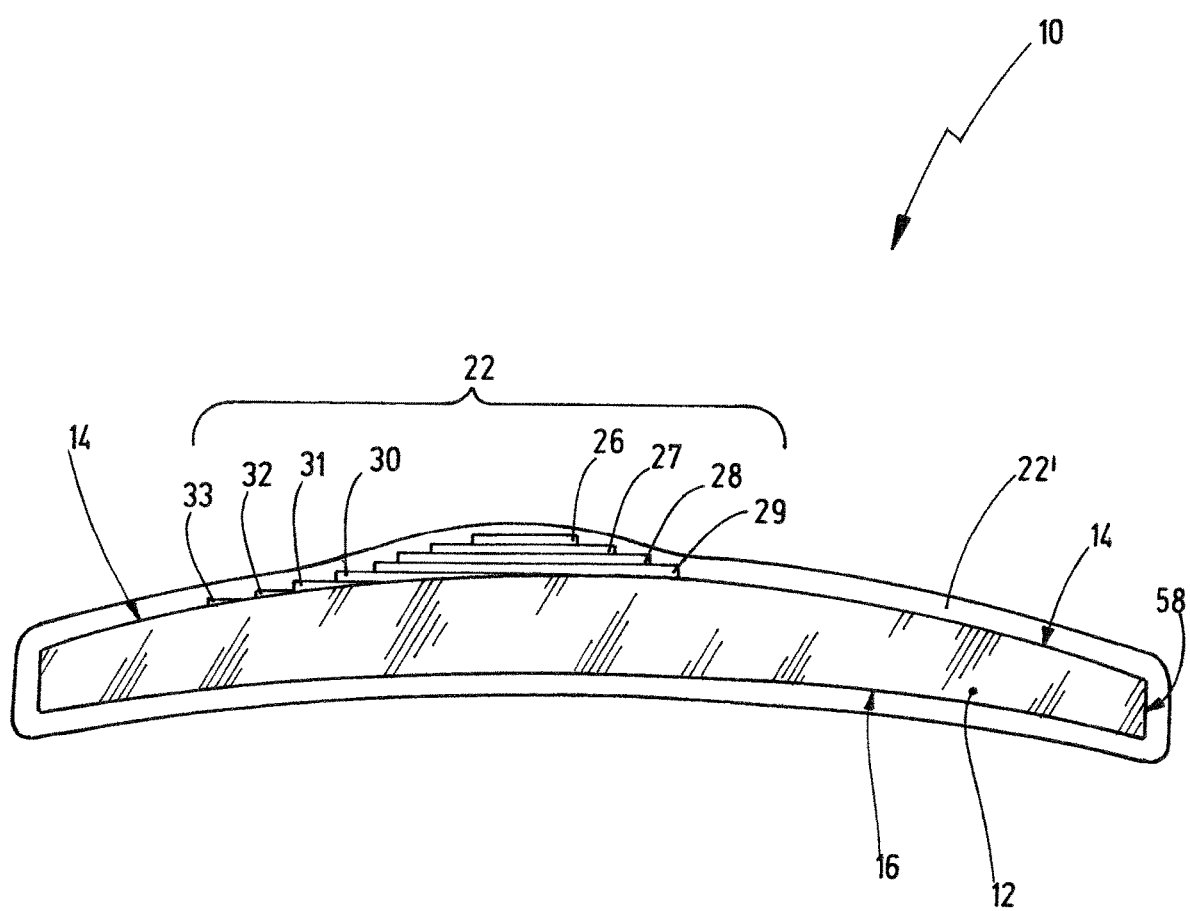
FIG. 11 shows yet another embodiment of a spectacle lens 10.

FIG. 11 shows a further embodiment of a spectacle lens 10. In that embodiment, a layerwise applied additional lens element 22 is applied to the integral main lens to provide for a near portion. Then, a further additional lens element 22' may be, in particular printed, applied to the whole spectacle lens 10 covering the complete integral main lens 16 and its front and back surface and the additional lens element 22 applied, for example in the illustrative embodiment shown in FIG. 11 in the front surface 14. In certain applications, also an edge 58 of the integral main lens may be covered. The additional lens element 22' in FIG. 11 may be made of certain resin to provide proper hard coating to the complete spectacle lens 10.

Further, a chemical polish may be applied to that additional lens elements 22' to provide proper surfacing and optical properties. In particular, the step-like edge structures of the layers elements may adversely affect the optical properties of the spectacle lens. However, these effects may be reduced via chemical polishing, etching, providing a finishing lacquer and/or thermally smoothing the layer edges.

Figure 12:
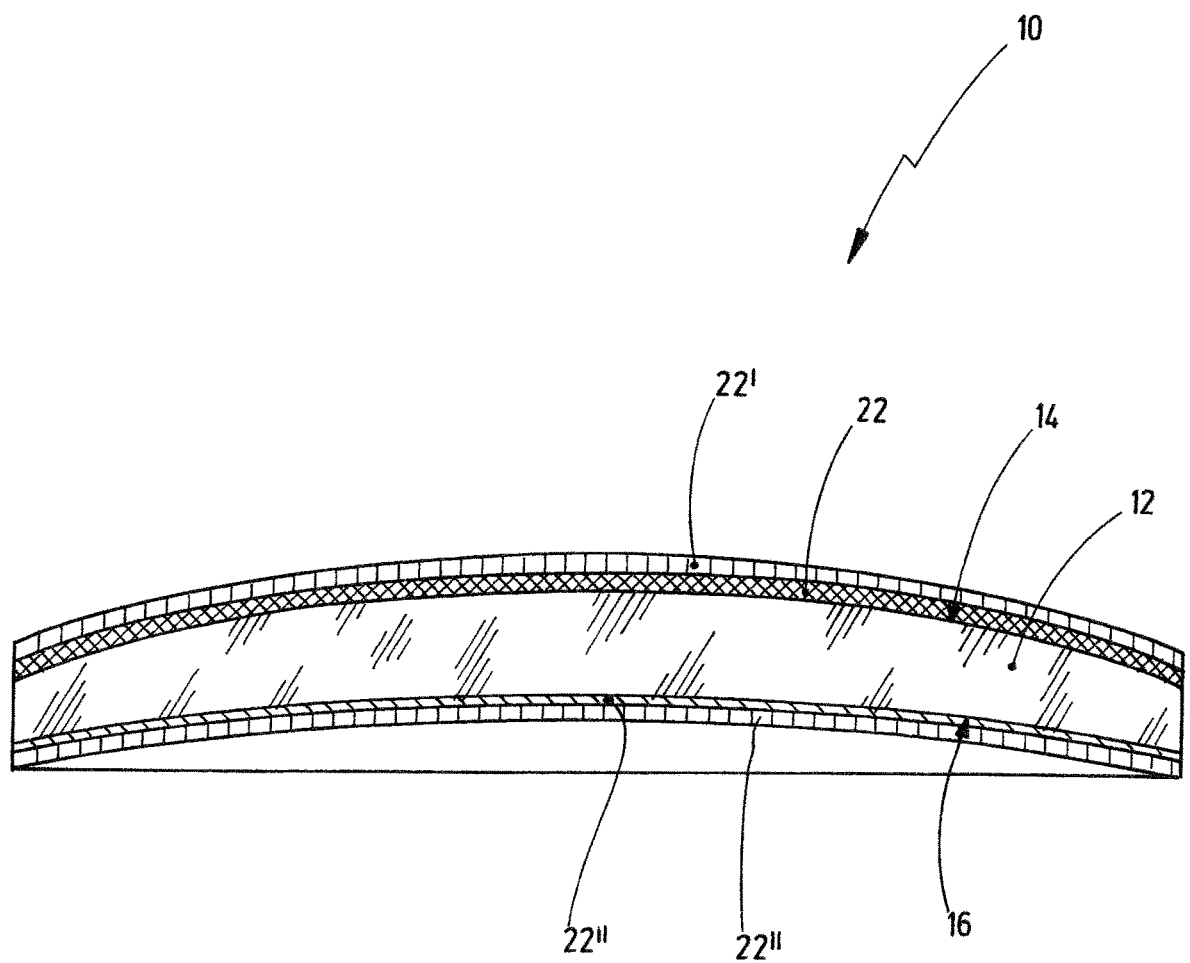
FIG. 12 shows yet another embodiment of a spectacle lens.

FIG. 12 shows another embodiment of the spectacle lens 10. In that embodiment, two additional lens elements are applied to each of the front surface 14 and the back surface 16. To the front surface 14 two additional lens elements 22 and 22' are applied to. The lens element 22 is applied directly onto the integral main lens 12. Further, the additional lens element 22' is then applied onto the additional lens element 22. The same applies to the back surface 16 and the additional lens elements 22" and 22''' applied thereto.

Of course, even more additional lens elements could be applied. By this, for example not only hard coats or primer coating could be applied but also stacks of layers providing, for example, antireflective properties.

Figure 13:
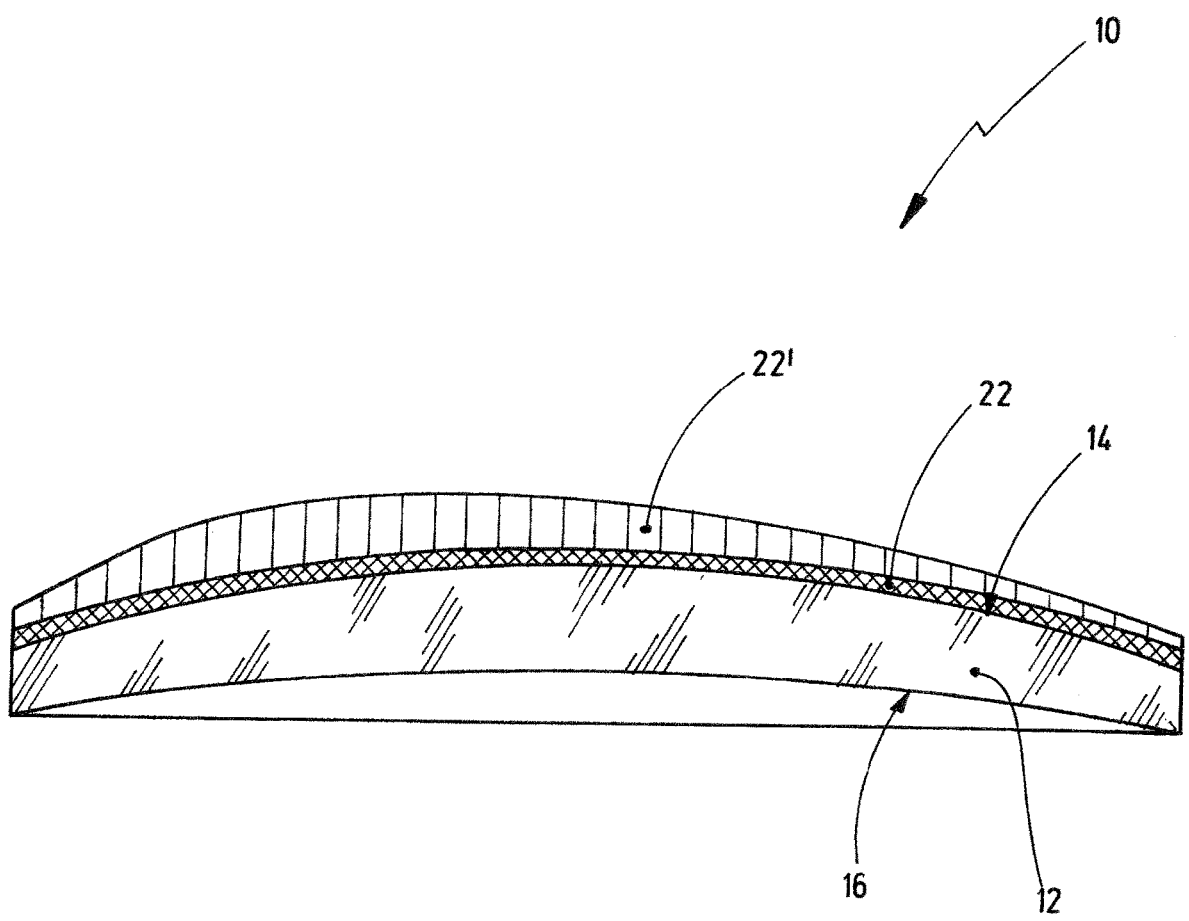
FIG. 13 shows yet another embodiment of a spectacle lens.
Figure 14A:
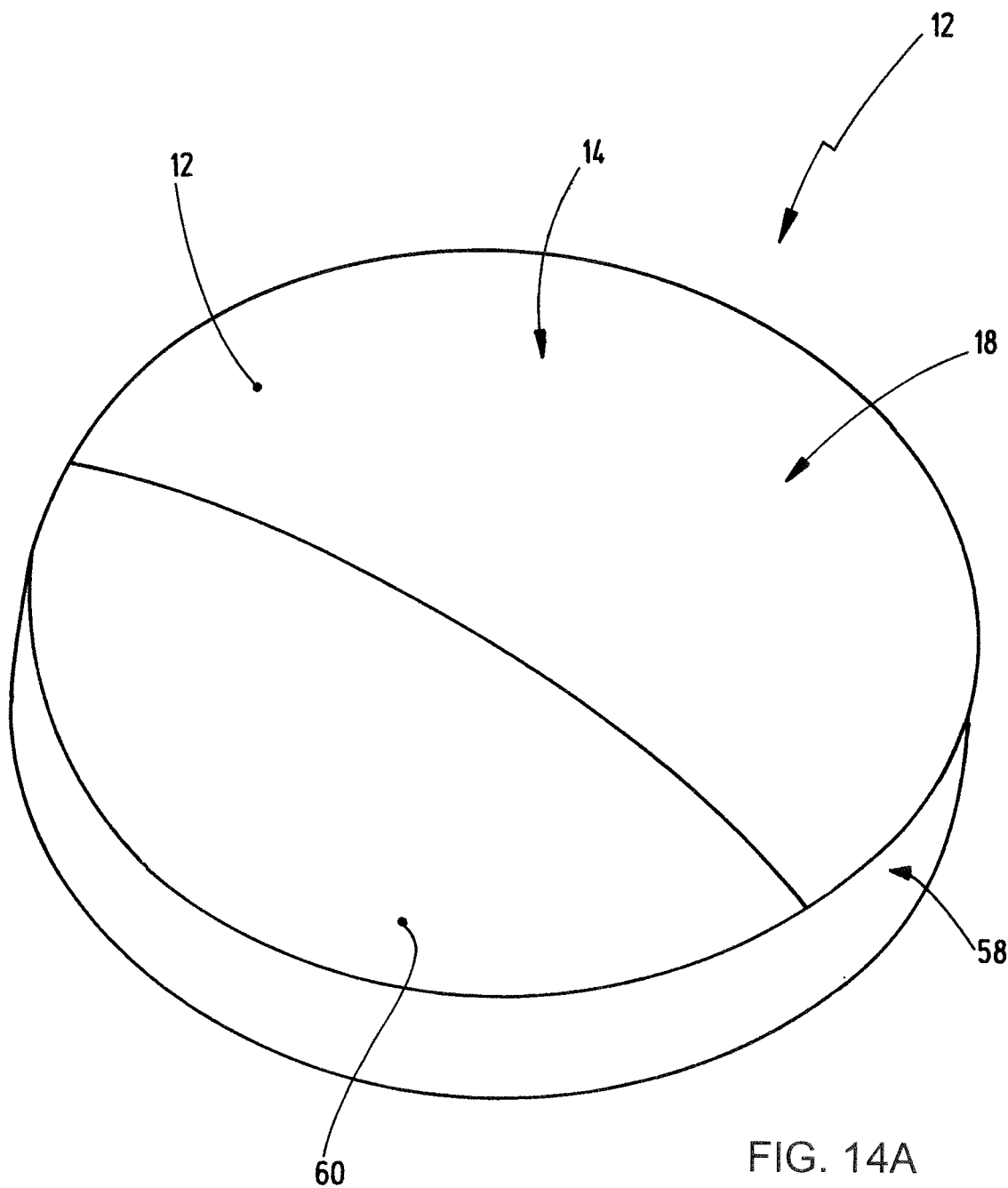
FIG. 14A shows another embodiment of an integral main lens.
Figure 14B:
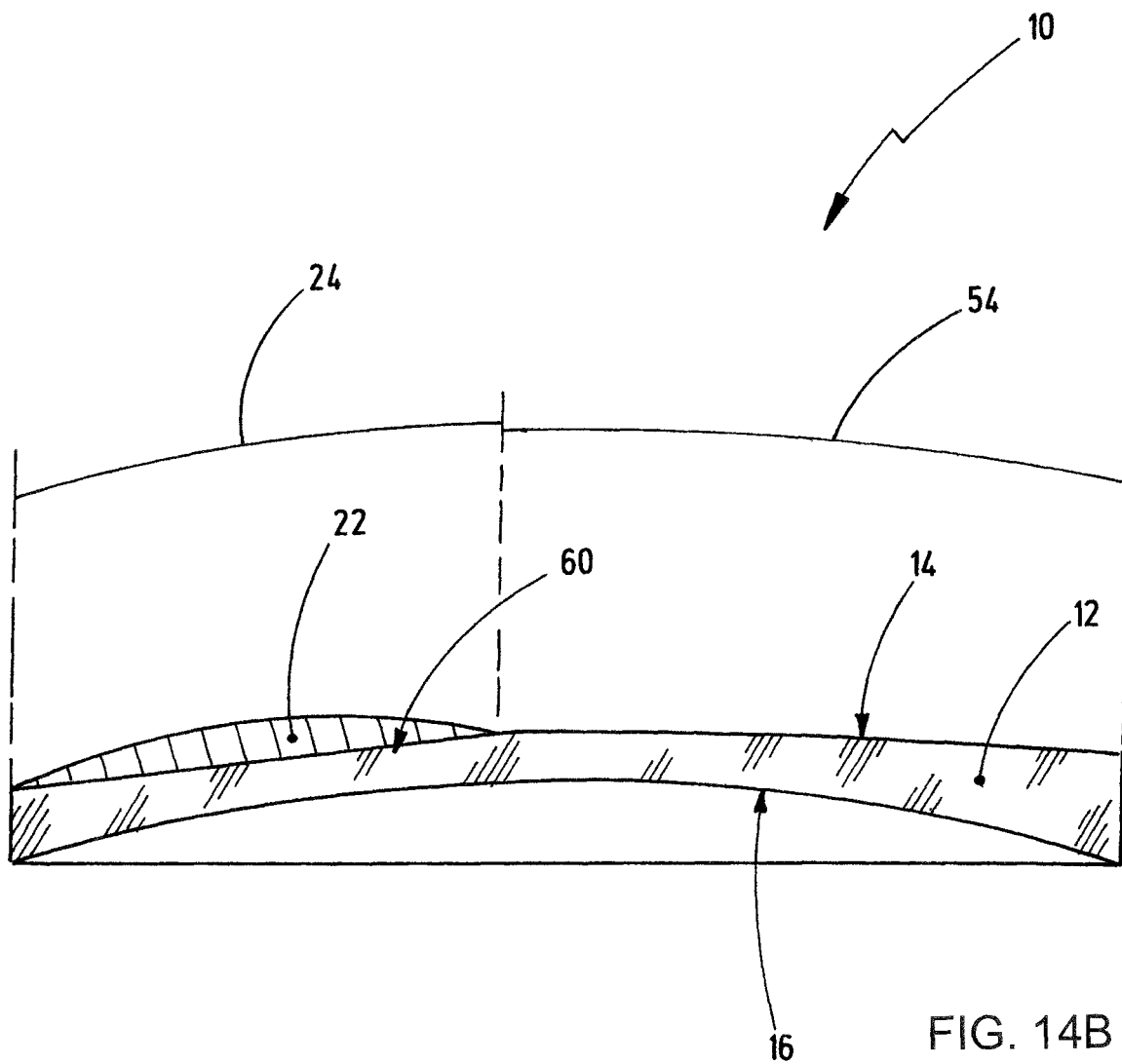
FIG. 14B shows a cross-sectional view of the integral main lens having an additional lens element applied.

In FIG. 13, even another example of a spectacle lens 10 is shown. In that embodiment, two additional lens elements 22 and 22' are applied to the front surface 14. The additional lens element 22 serves as a primer coating and the additional lens element 22' has a variant thickness to provide proper progressive power gradiation.

In general, in all embodiments of the current invention, additional lens elements 22 can be applied directly onto the integral main lens 12 that is directly onto the front and/or the back surface 14, 16 and/or stacked upon one another.

Further, it may be possible to print one or more of the additional lens elements separate from the integral main lens 12 and to adhere the additional lens element later on via an adhesive. For example, an UV-curable adhesive could be used. Such adhesives are not only easy to use but do not influence the optical properties of the integral main lens to an extent significantly recognizable by a spectacle wearer.

FIGS. 14A, 14B, 15A and 15B show embodiments of the integral main lens 12 having a flattened section 60. In the embodiment shown in FIGS. 14A and 14B, the flattened section 60 is provided on the front surface 14a. Hence, only the remaining part of the front surface 14 not flattened can comprise the main curvature 18, in particular a single spherical main curvature 18. Onto the flattened section 60, then an additional lens element 22 can be applied to form, for example, a near section, an example of which is given in FIG. 14B.

Figure 15A:
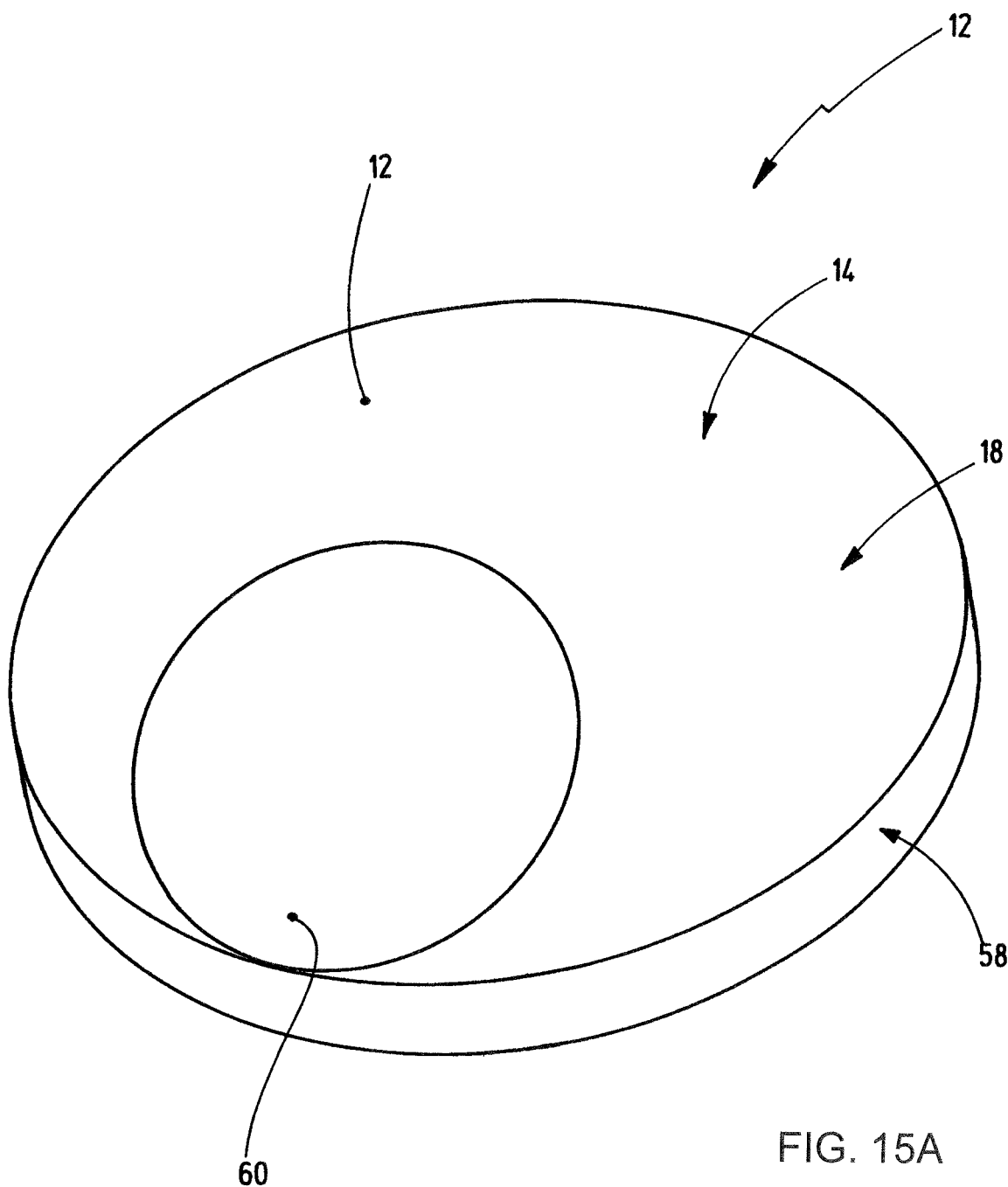
FIG. 15A shows yet another embodiment of an integral main lens.
Figure 15B:
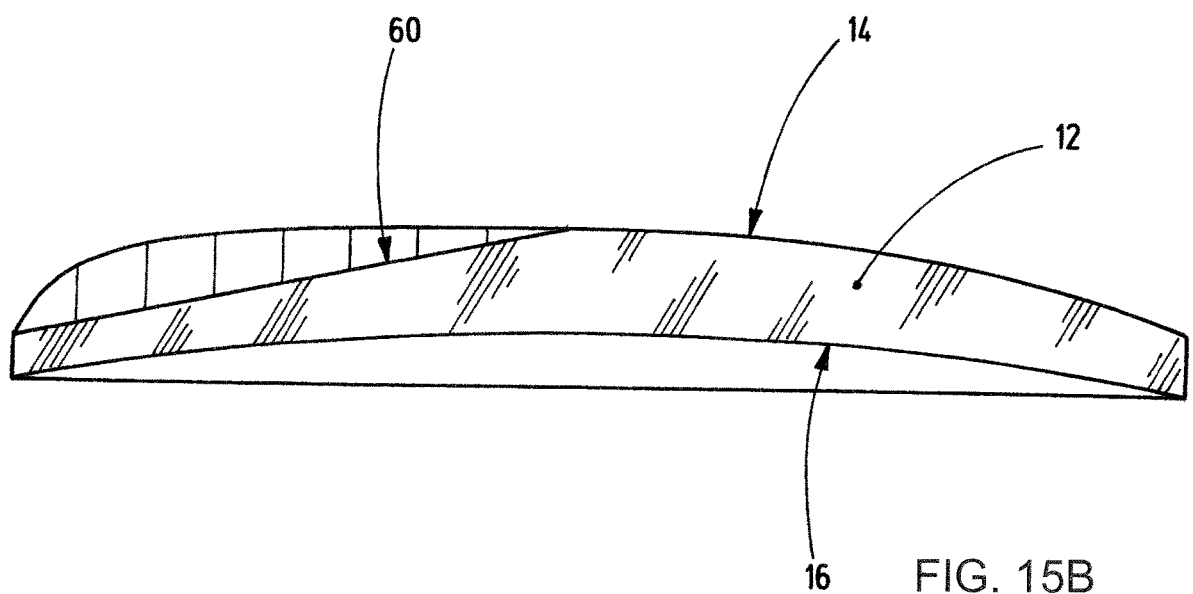
FIG. 15B shows a cross-sectional view of the integral main lens having an additional lens element applied.

The same applies to the embodiment shown in FIG. 15A. The flattened section 60 there has a circular shape and is also formed in the front surface 14 of the integral main lens 12. Hence, outside the circular shape of the flattened section 60, such front surface 14 can have its main curvature 18. Again, the additional lens element 22 can be applied to the flattened section 60, an example of which is given in FIG. 15B.

Providing such flattened sections 60 may help not only designing the complete spectacle lens 10, but also the application of the additional lens element 22, in particular via three-dimensional printing, as the additional lens element may be built up onto a flat surface.

FIGS. 16, 17A, 17B, 18A, 18B, 19, 20A and 20B show different top views onto a spectacle lens 10 illustrating the terms of schematic height-lines 62 the surface formal error covered by an additional lens element on a surface of a spectacle lens 10. In the current example shall be the front surface 14.

Figure 16:
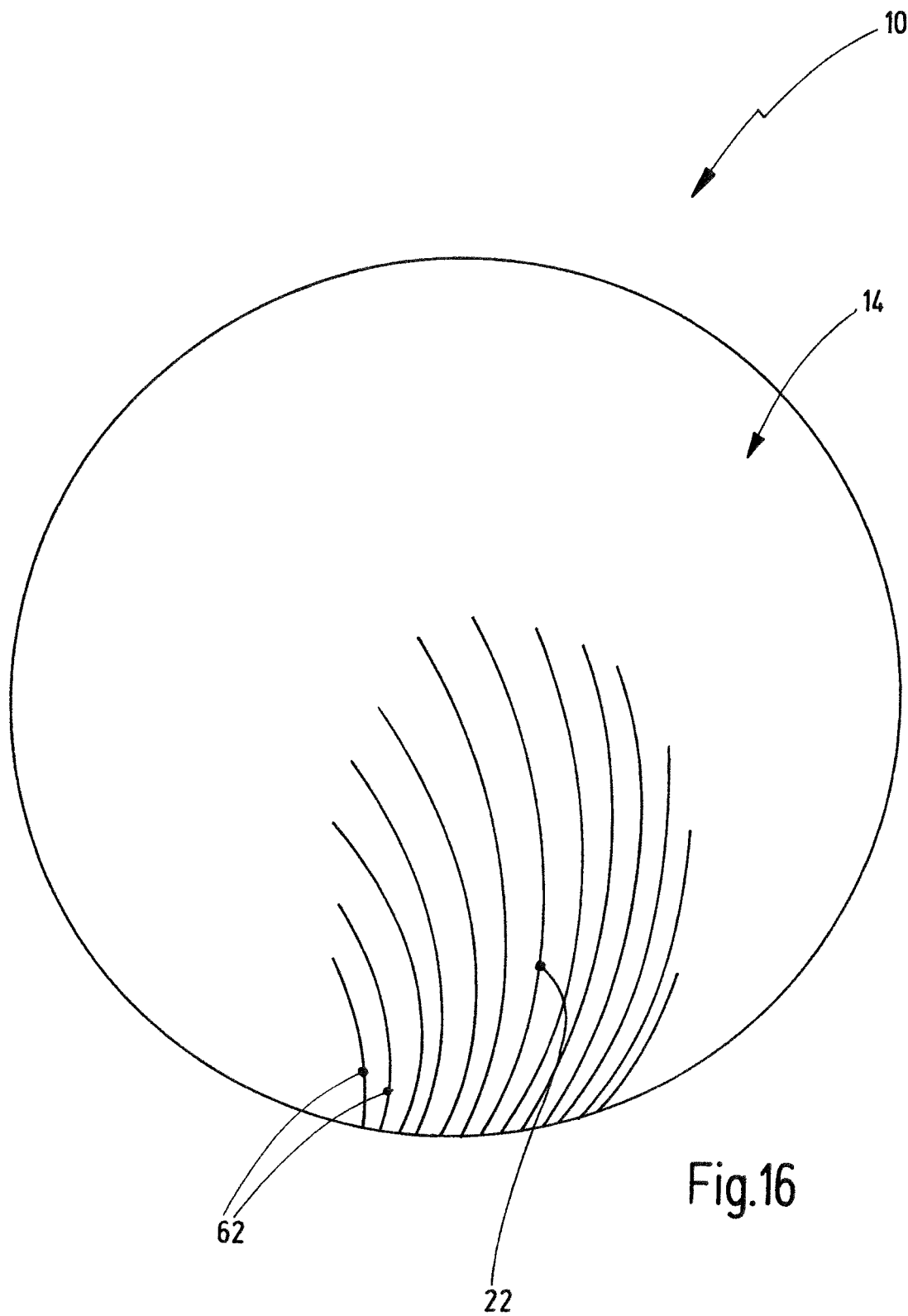
FIG. 16 shows another embodiment of a spectacle lens in a top view.
Figure 17A:
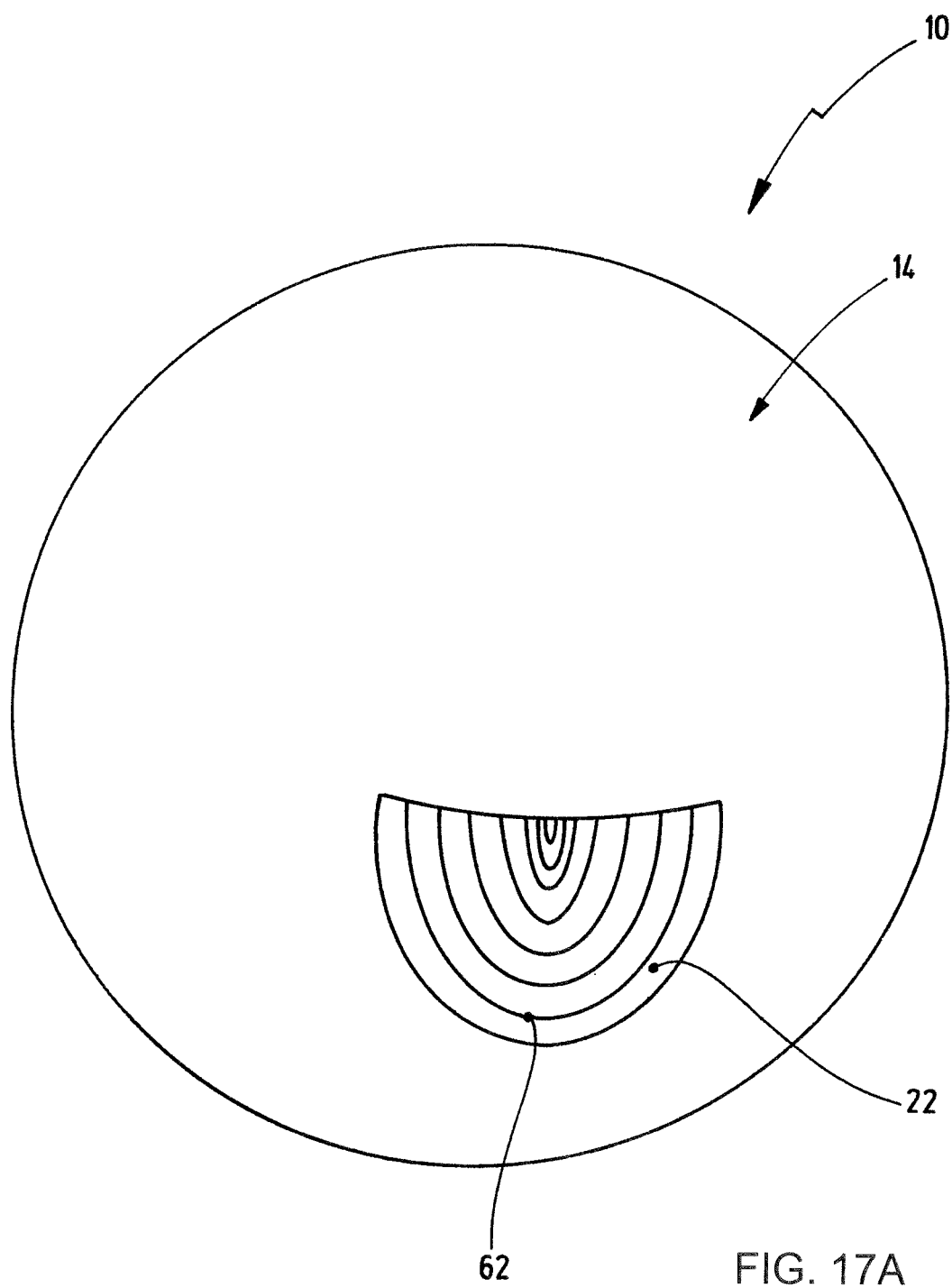
FIG. 17A shows a top view of yet another embodiment of a spectacle lens, in particular providing a bifocal spectacle lens.
Figure 17B:
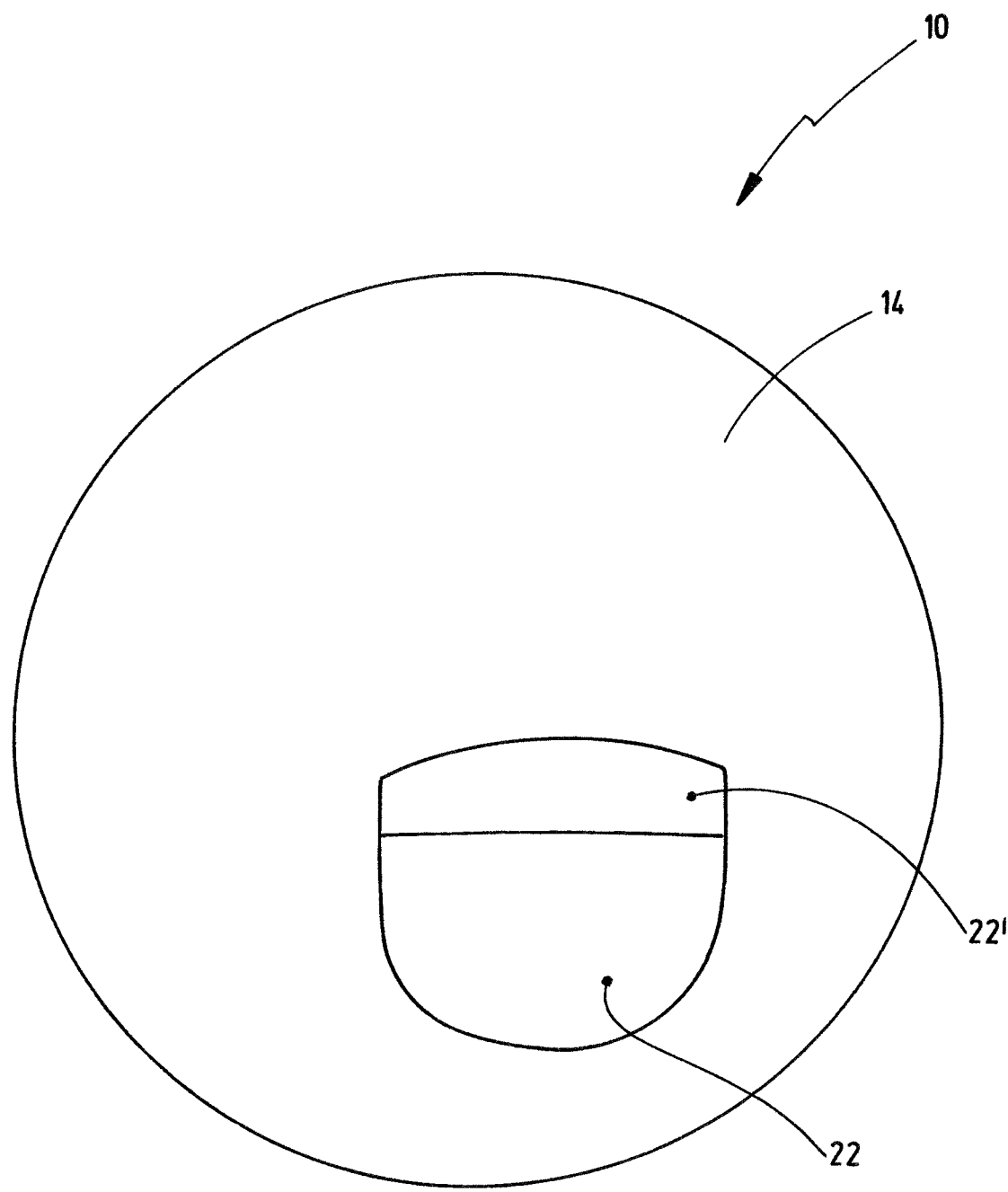
FIG. 17B shows a top view of yet another embodiment of a spectacle lens, in particular providing a trifocal spectacle lens.
Figure 18A:
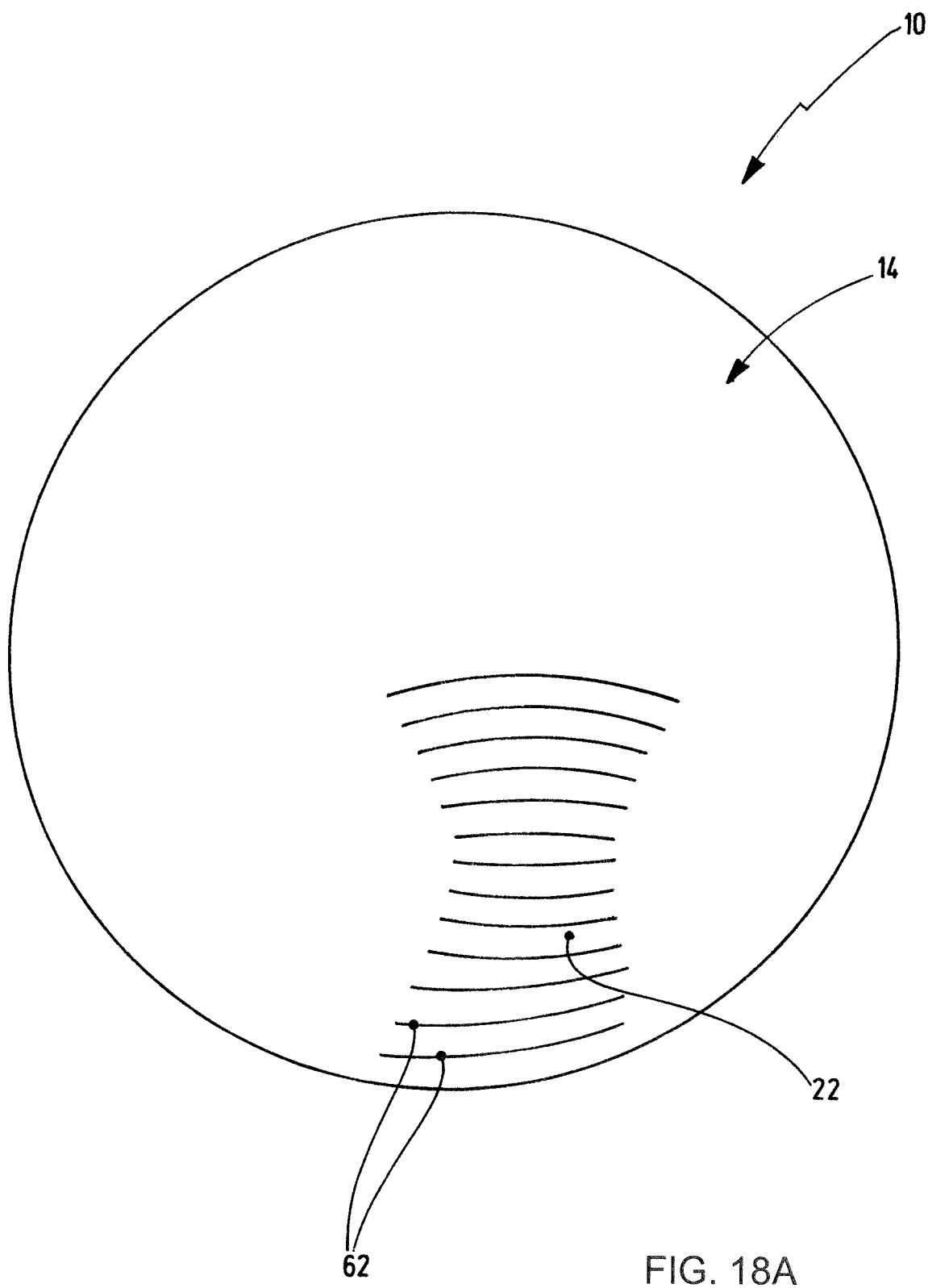
FIG. 18A shows a top view of yet another embodiment of spectacle lens, in particular for providing progressive power.
Figure 18B:
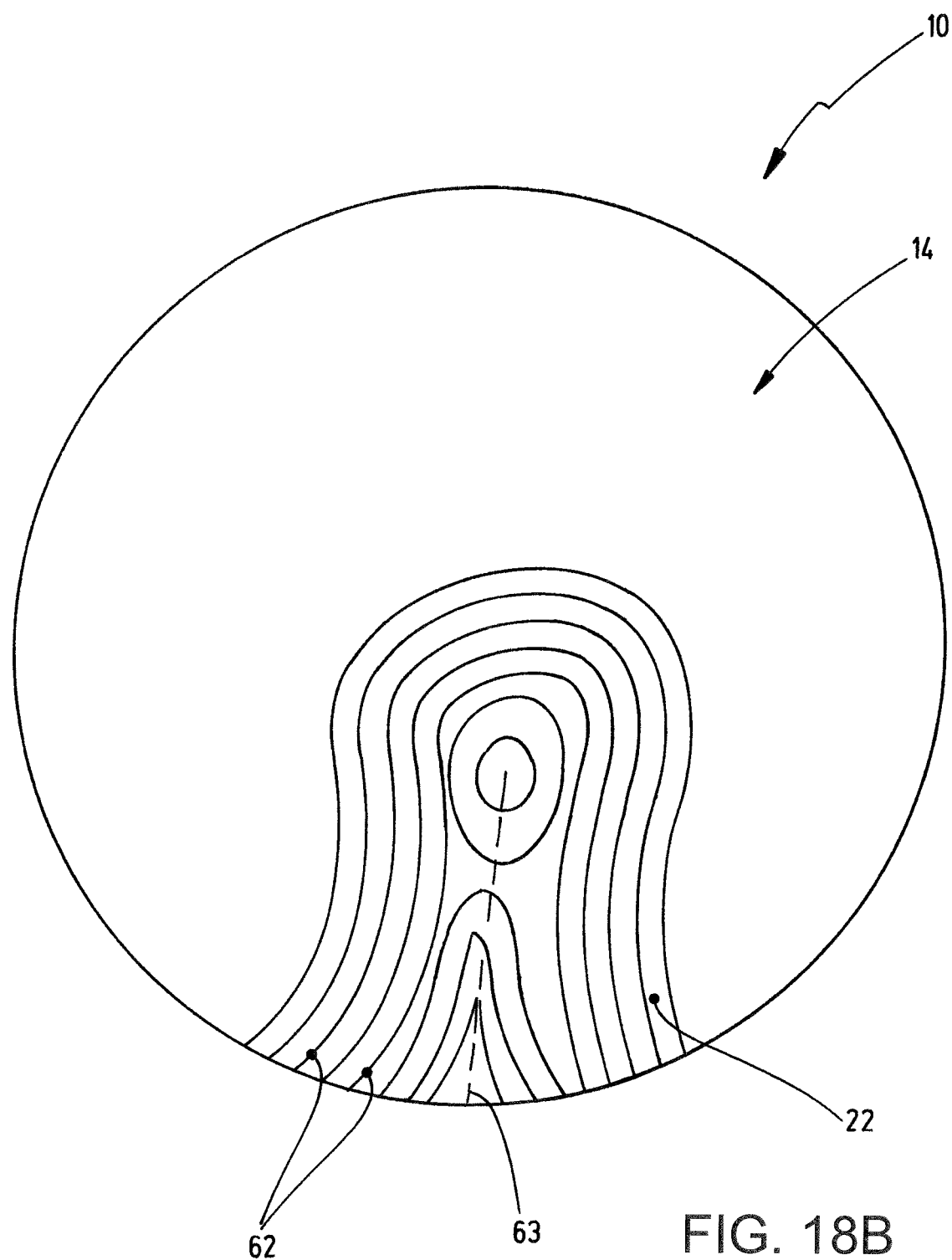
FIG. 18B shows a top view of a further embodiment of spectacle lens, in particular for providing progressive power.
Figure 18C:
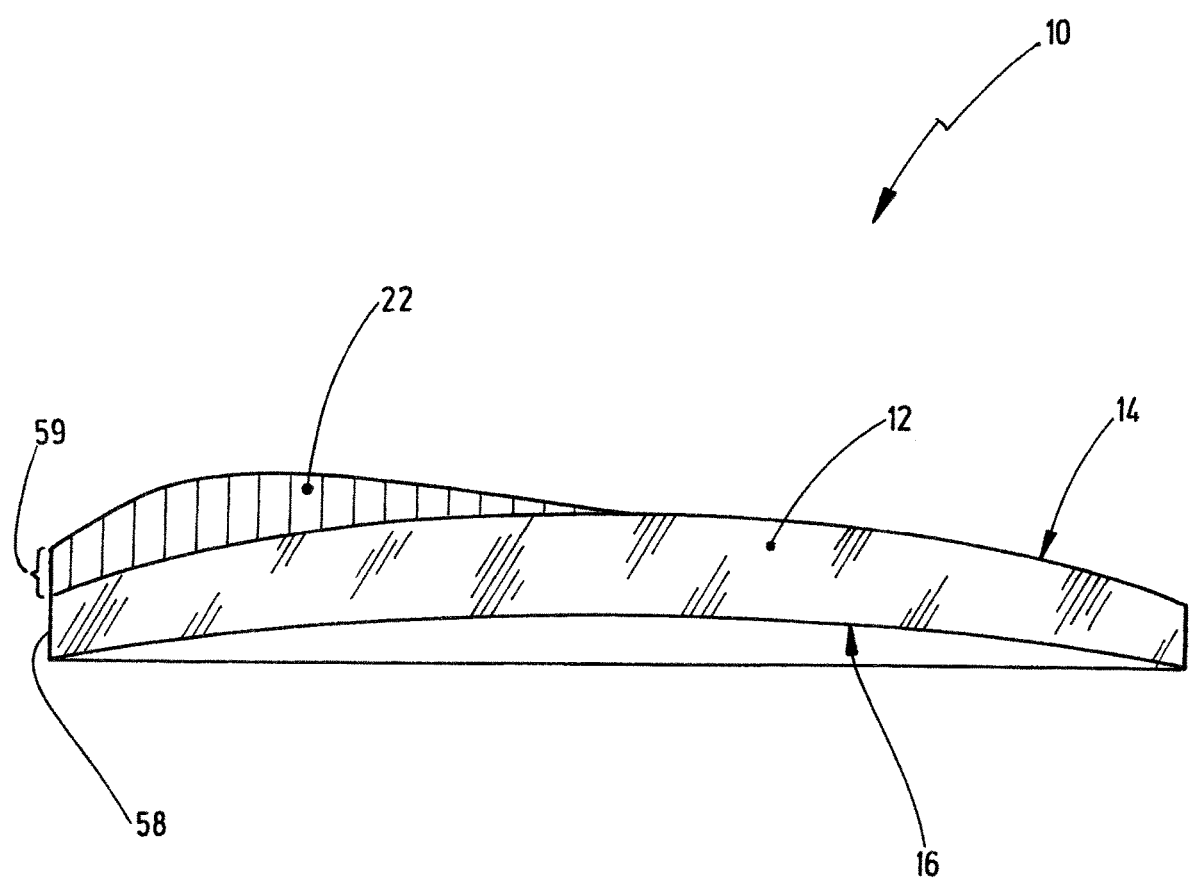
FIG. 18C shows a cross-sectional view of the embodiment shown in FIG. 18B.
Figure 19:
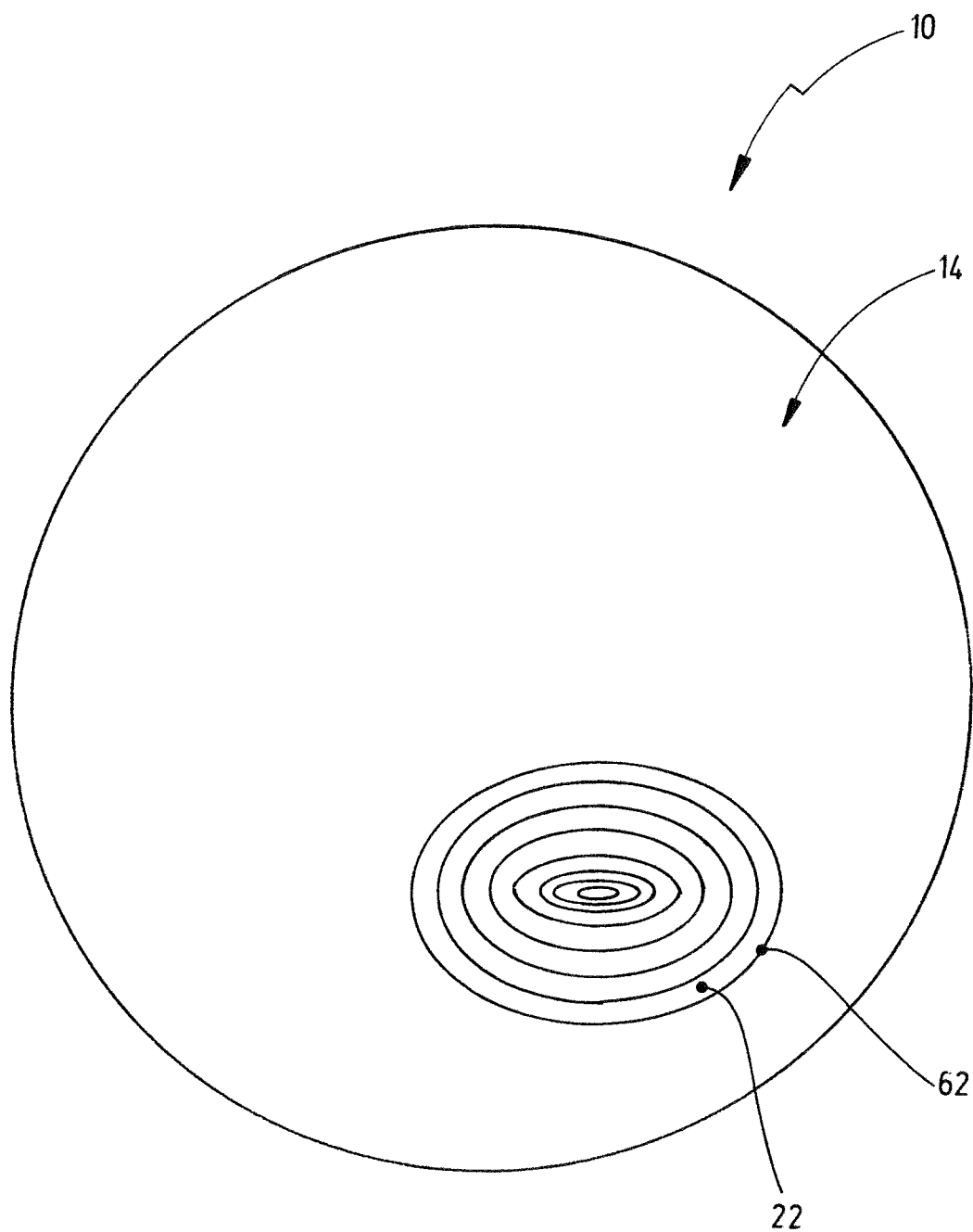
FIG. 19 shows yet another top view of another embodiment of a spectacle lens 10.

By this, FIG. 16, for example, shows a soft design for a near portion. To the contrary, FIG. 17A shows a bifocal embodiment with strict cutting ends towards the front surface 14 towards the additional lens element 22. FIG. 17B shows a corresponding trifocal embodiment comparable to that shown in FIG. 7 and having two additional lens elements 22 and 22' applied to the front surface 14. FIG. 18A shows a proper shaped provider gradient in optical power towards the near portion. FIG. 18B shows a near portion having a gradient in progressive power and designed with a so-called plateau line 63 leading radially outwards. FIG. 18C shows a cross-sectional view of the embodiment shown in FIG. 18B. In particular, it is apparent that the additional lens element 22 does not need to end or have a height of zero above the front or back surface 14, 16 of the integral main lens. Instead, the additional lens element 22 may still have a certain height 59 and, thus, forming part of the edge additionally to the edge 58 of the integral main lens. FIG. 19 shows a classic additional lens element 22 of circular shape to provide a simple addition in a certain error of the front surface 14.

Figure 20A:
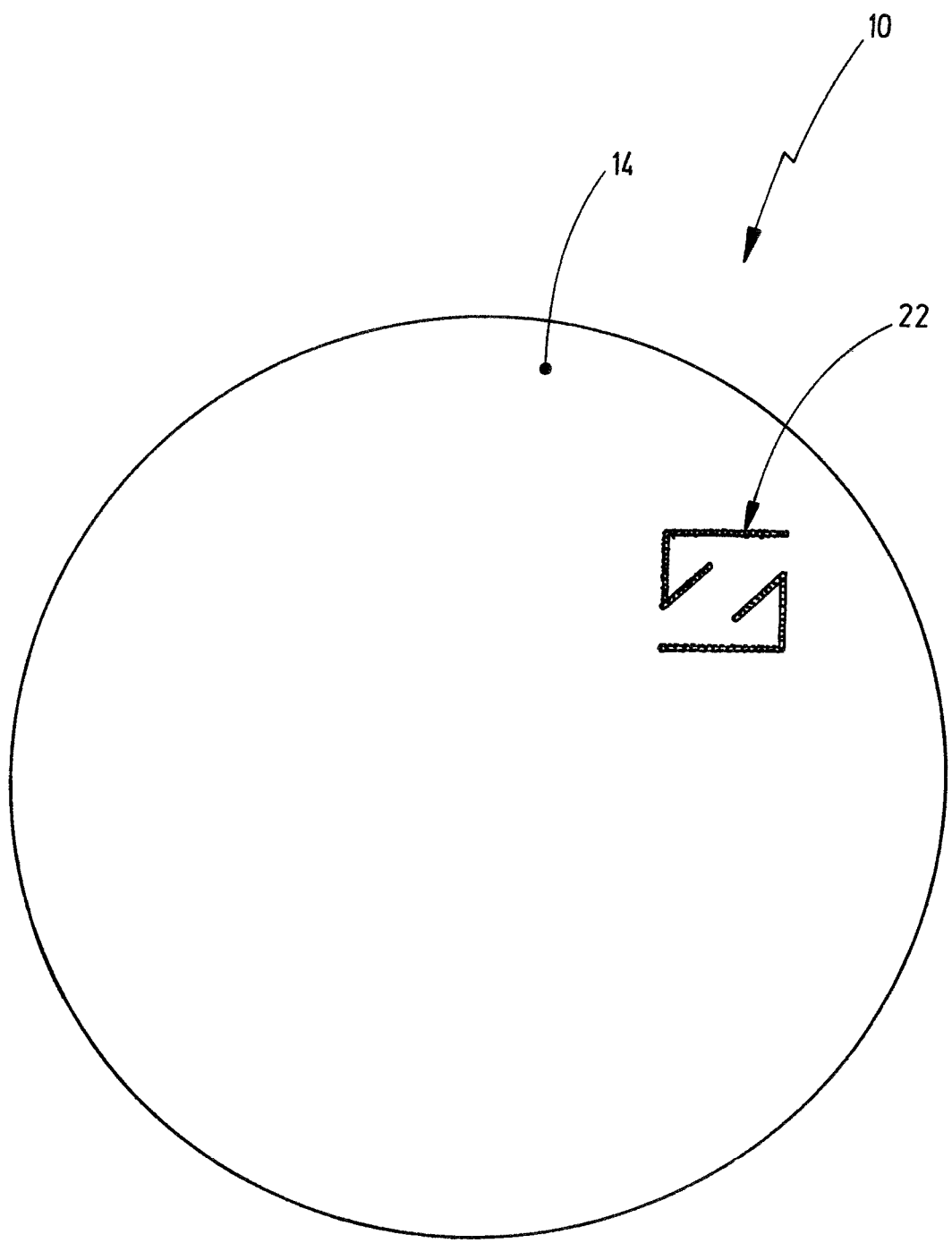
FIG. 20A shows yet another top view of yet another embodiment of a spectacle lens, in particular for providing a marking.
Figure 20B:
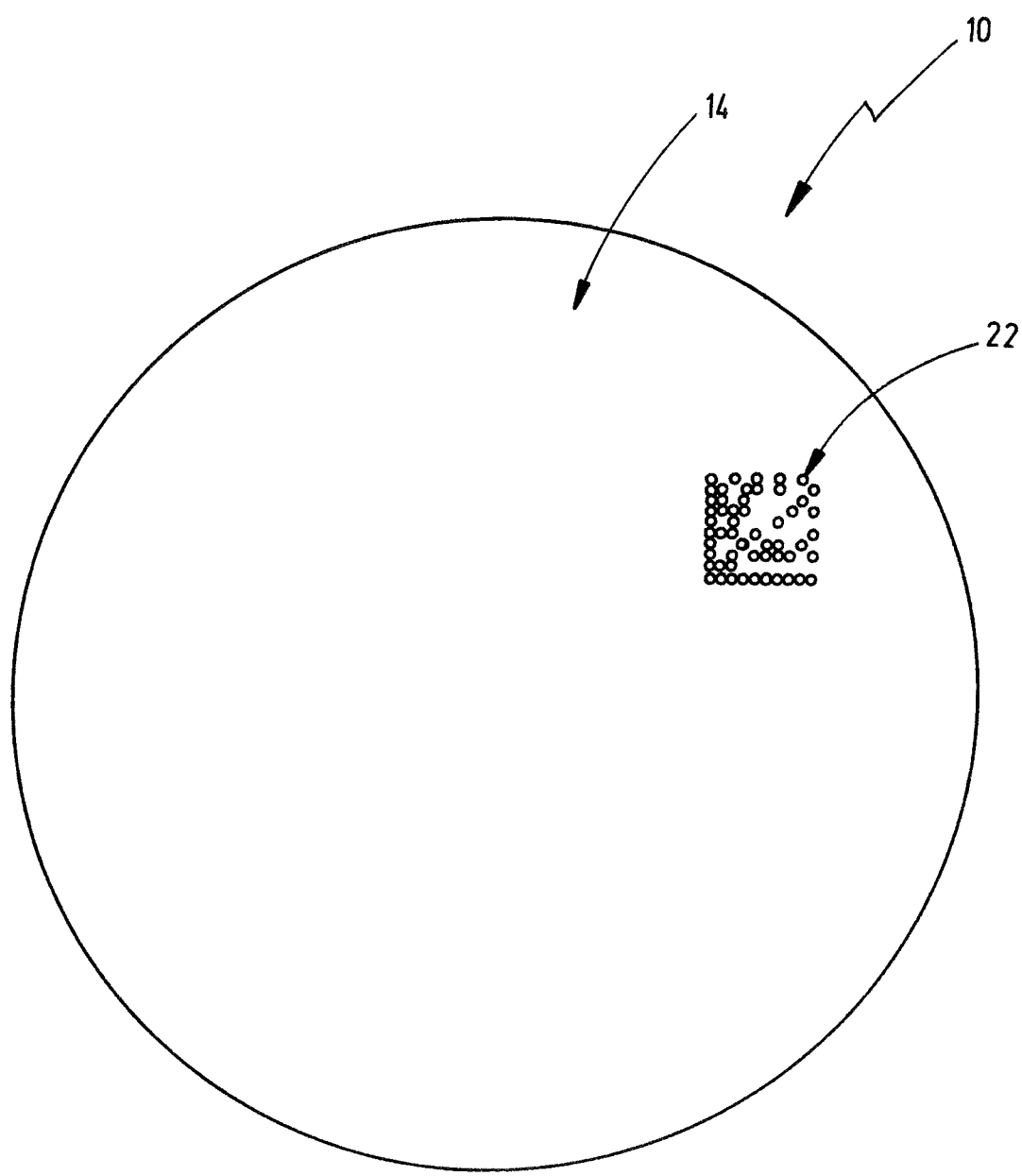
FIG. 20B shows yet another top view of yet another embodiment of a spectacle lens, in particular for providing a code.

FIG. 20A shows another example of a purpose of an additional lens element 22. The additional lens element 22 may be added to the front surface 14 or back surface 16 and comprise of one layer of a multitude of elements providing a digital label identifying the manufacturer. Further, as shown in FIG. 20B, there may also be applied a code, in particular a two-dimensional code via the additional lens element 22 to identify the individual spectacle lens 10. Of course, a marking may not only serve as a label but also as a code, therefore combining the embodiment shown in FIGS. 20A and 20B.

FIGS. 21 to 24 show different applications of spectacle lenses according to the current context. In general, spectacles according to the current invention may be particularly advantageous in applications like ski goggles, diving goggles, helmet visors, gas masks, etc. In such applications, provision of multifocal or progressive power lenses has always been a challenging task which may be significantly facilitated via the proposed methods and spectacle lenses.

Figure 21:
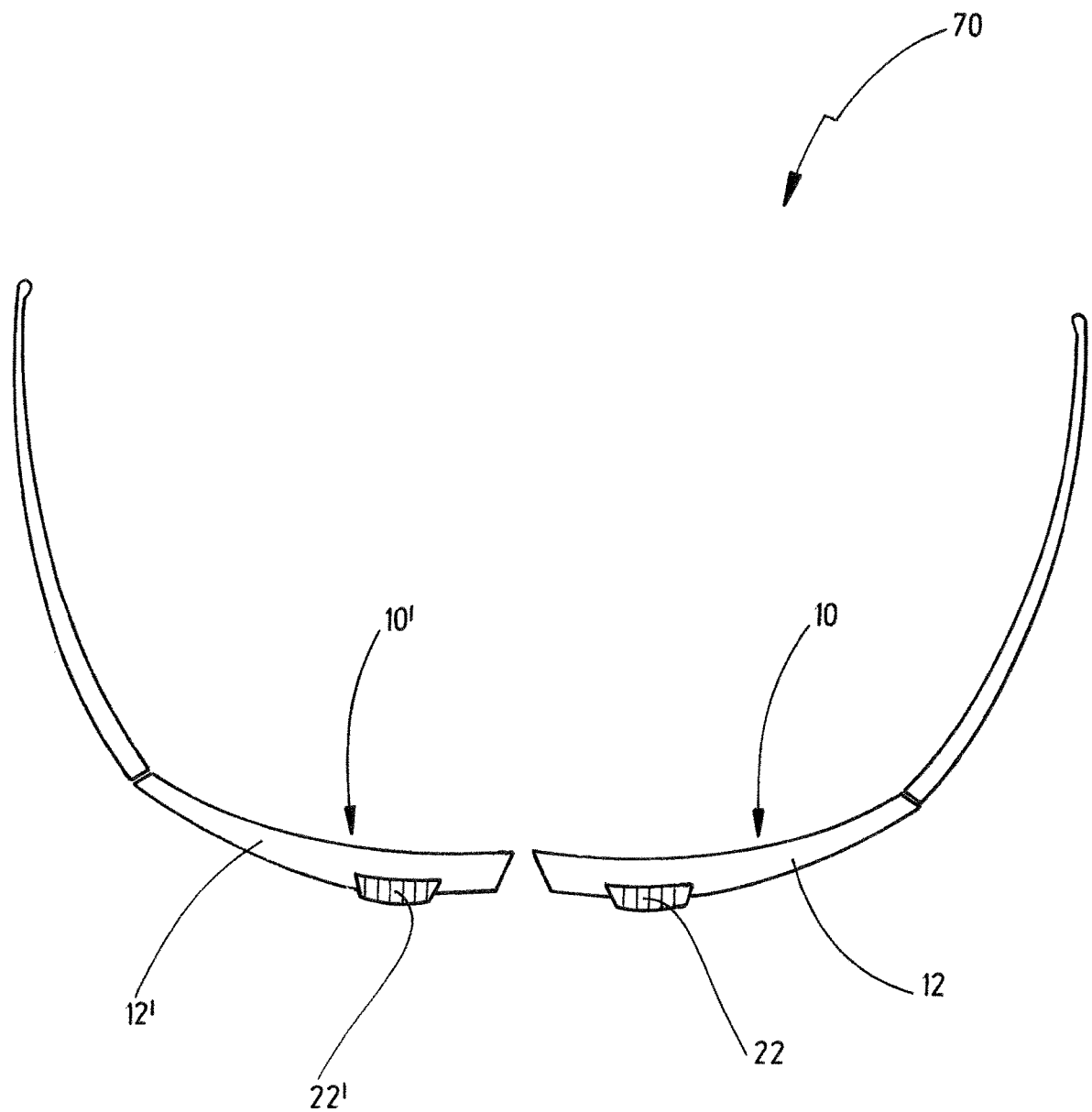
FIG. 21 shows an embodiment of spectacles.

FIG. 21 shows a spectacle 70 for sports purposes. For example, a usual sports wear spectacle could be used having two integral main lenses 10 and 10'. To that sports spectacle, new portions could be applied via additional lens elements 22 and 22' to provide proper new vision even for persons varying the sports spectacles.

Figure 22:
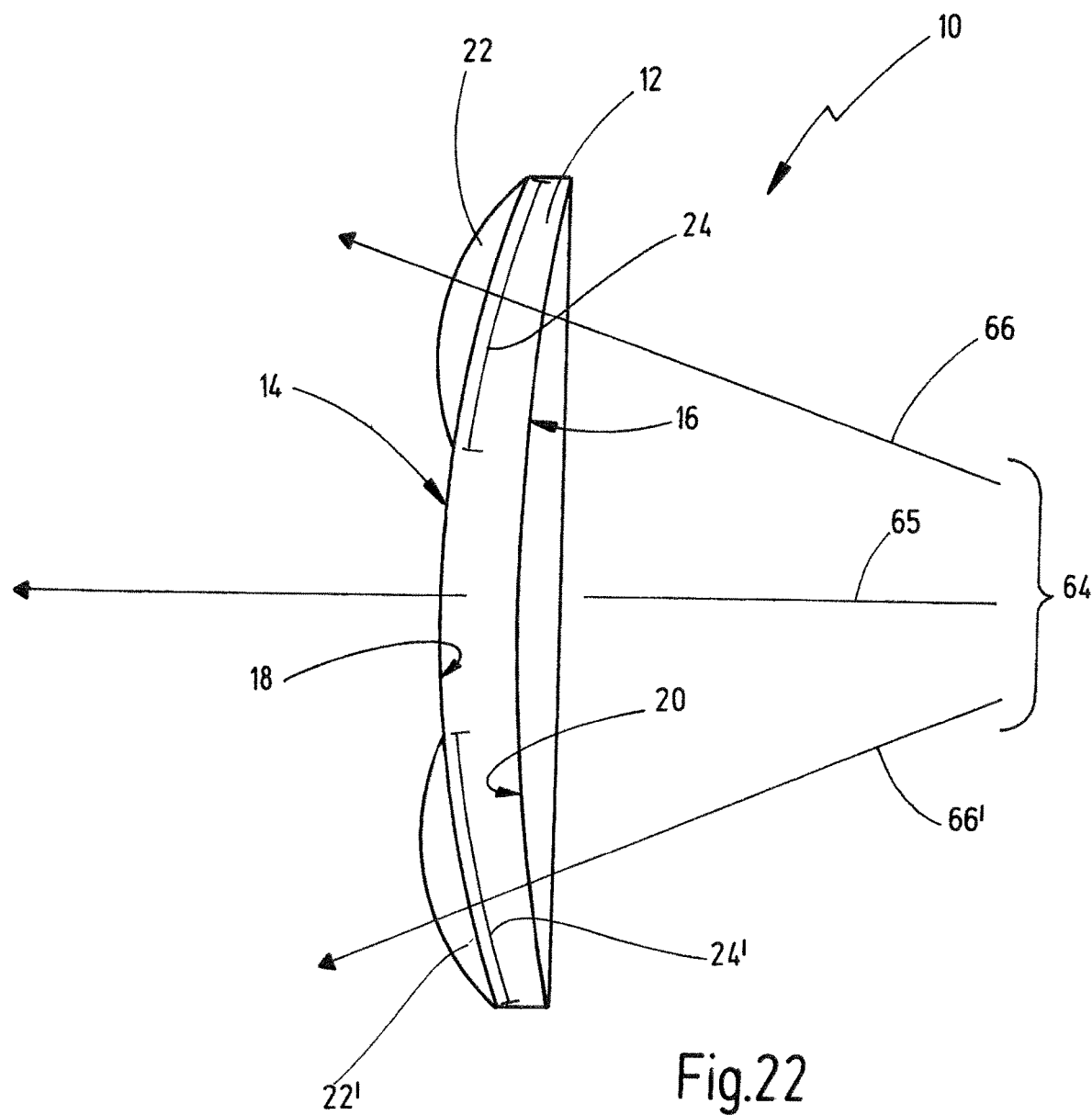
FIG. 22 shows another embodiment of a spectacle lens.

In FIG. 22, an example for a spectacle lens 10 having two new portions is shown. The front surface 14 of that spectacle lens 10 has two additional lens elements 22 and 22' applied thereto, so that additional lens elements are provided to two parts 24, 24' of the front surface. By this, hence, in a central zone 64 light rays 65 may pass through the usual integral main lens 12. In peripheral vision errors, the corresponding light rays 66 may pass not only through the integral main lens 12 but also through respective additional lenses 22, 22' providing for proper near vision and only one looking down but also one looking up. For example, such applications may be particularly useful for airplane pilots who have to watch instruments below and above.

Figure 23:
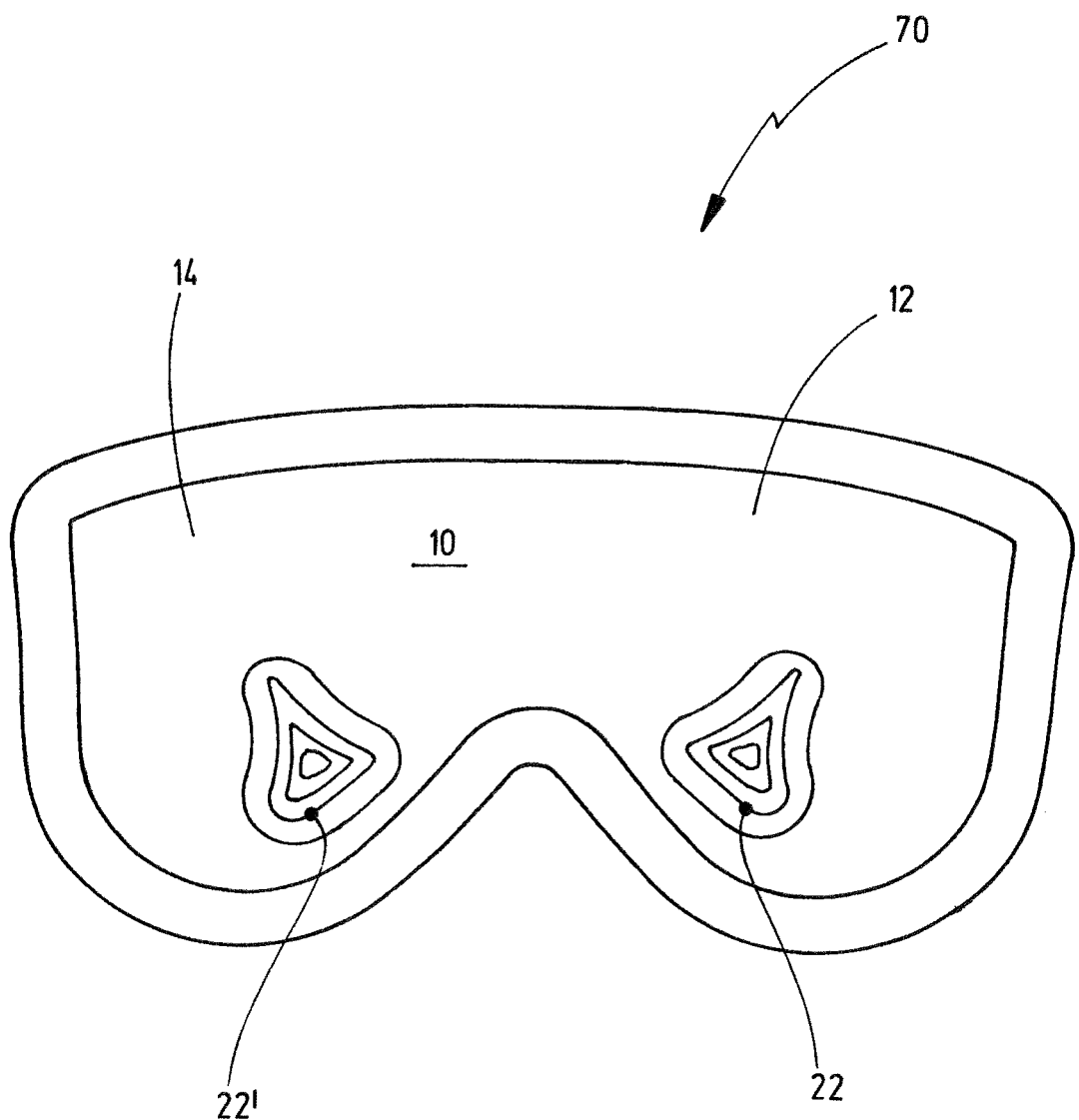
FIG. 23 shows yet another embodiment of spectacles.

In FIG. 23, a further example for an application in a spectacle 70 is shown. For example, ski goggles having a single integral main lens 12 may be applied with two additional lens elements 22, 22' on distinct parts of a front surface of that integral main lens 12. By this, proper near vision can be provided for a person only wearing its ski goggles.

Figure 24:
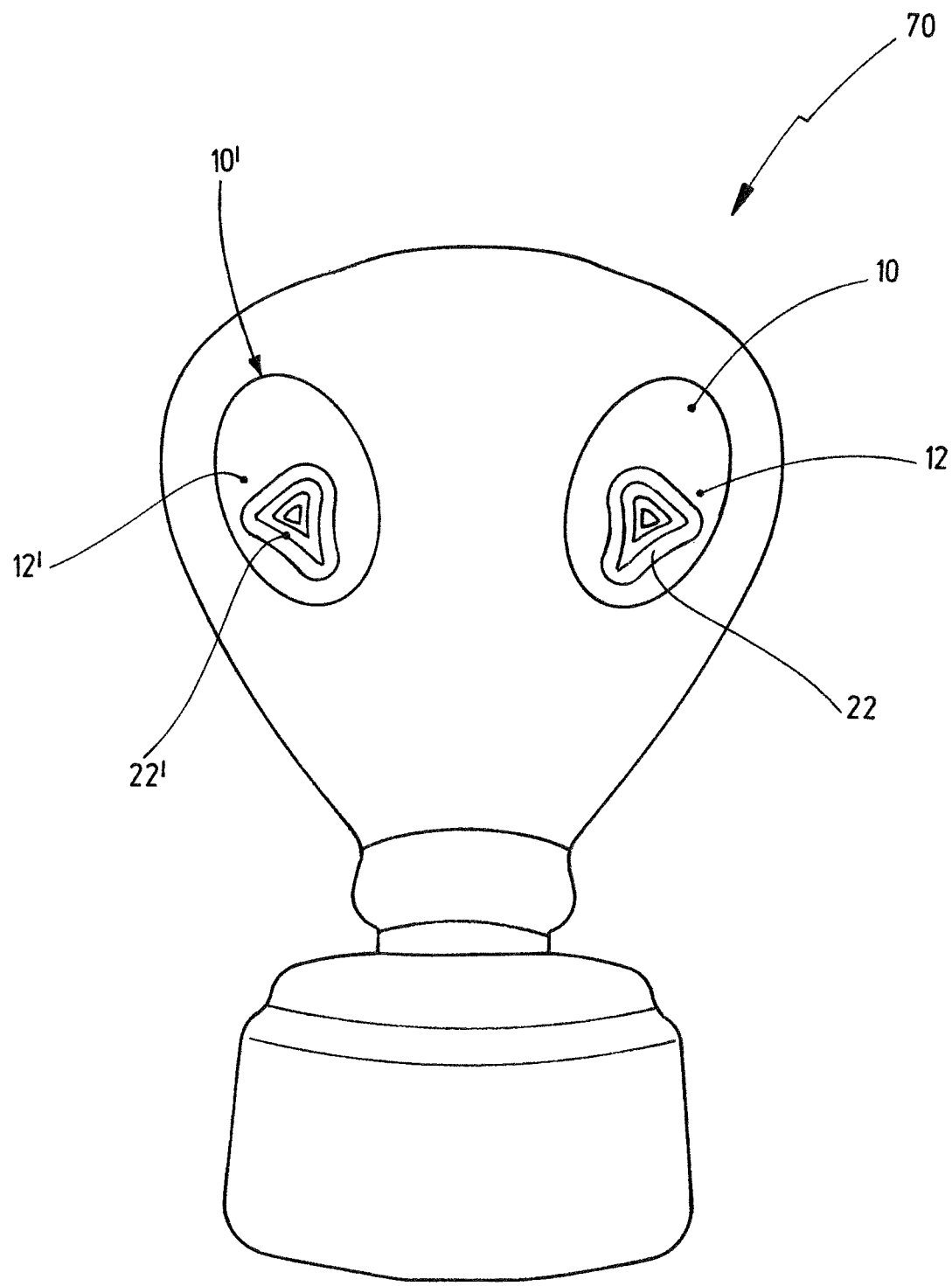
FIG. 24 shows yet another embodiment of spectacles.

Similar advantages may apply to the embodiment shown in FIG. 24 that shows a gas mask having two integral main lenses applied thereto. On each integral main lens, a proper additional lens element 22, 22' is provided for proper near vision for a person wearing a gas mask. Hence, by the embodiments shown in FIGS. 23 and 24 by wearing such spectacles 70, there would be no use anymore for wearing usual spectacles beneath the ski goggles or the gas mask.

Figure 25:
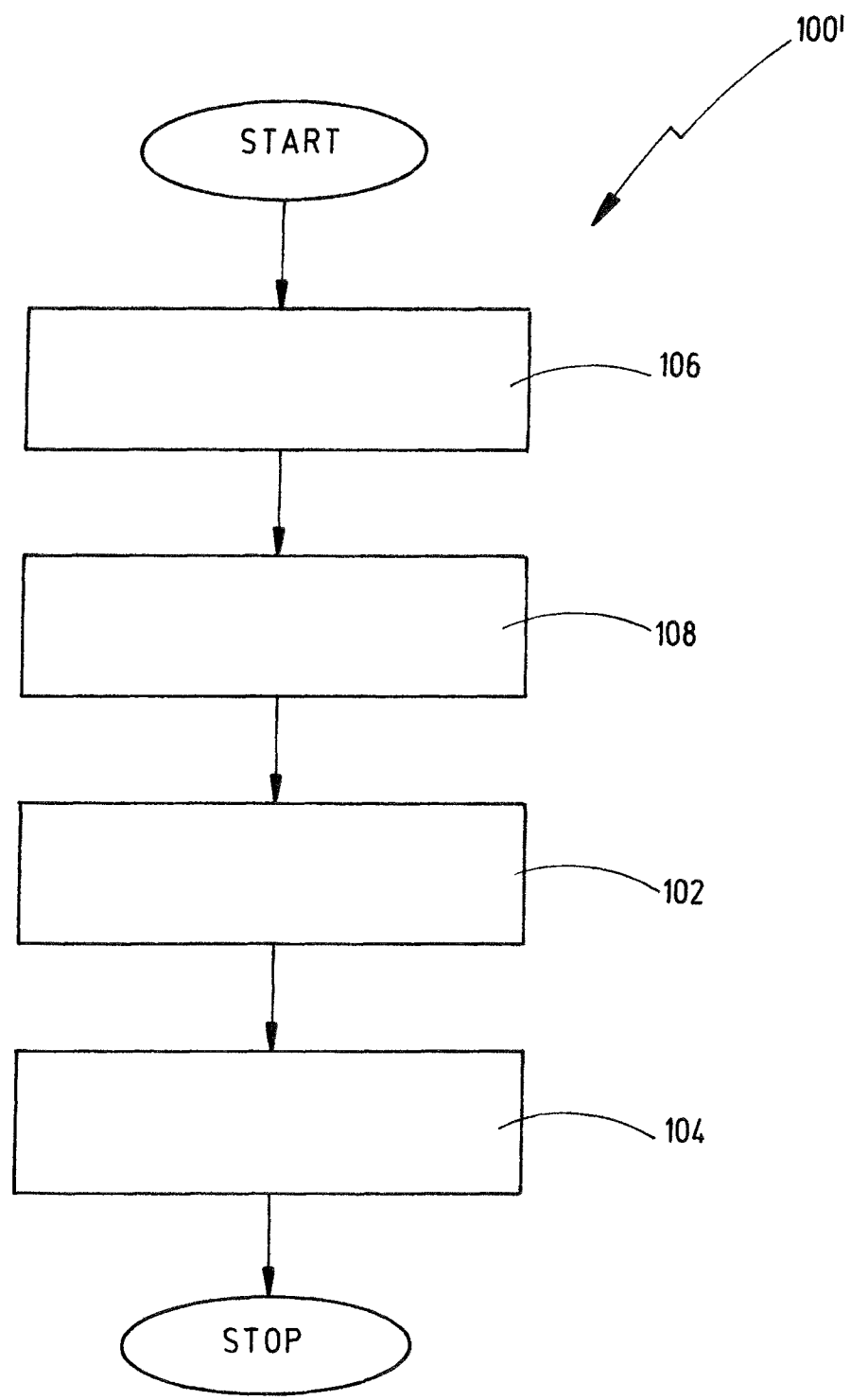
FIG. 25 shows yet another embodiment of a method.

FIG. 25 shows a further embodiment of a method 100'. Like reference numerals depict like method steps. Method steps 102 and 104 have already been explained in connection with FIG. 4. In general, for manufacturing a spectacle lens, in particular a multifocal lens or a progressive power lens, such a method could comprise an initial step of providing a measurement indicative of the refractive properties of the eye of a spectacle wearer. Then, in step 108, an eyeglass prescription, in particular to correct vibrations of the corresponding eye could be determined. Based on that in particular, that step of determining an eyeglass prescription may comprise establishing an optimization space corresponding to a plurality of possible eyeglass prescriptions for the eye, determining a merit function wherein a value of the merit function corresponds to a visual function of the eye when corrected using one of the plurality of possible eyeglass prescriptions within the optimization space and determining the eyeglass prescription by optimizing the value of the merit function. This whole procedure is commonly known to a person skilled in the art.

Then, based on the determined eyeglass prescription, a corresponding integral main lens may be chosen and provided. As already laid out above, the provision may be conducted automatically or in a manual fashion. For example, in an automatic fashion, a proper integral main lens blank may be chosen out of a stack having usual prescription parameters, in particular the usual magnitudes of spherical power, for example −0.125, −0.5, −0.75 etc. in steps of 0.125 or 0.5 diopters. Then, after provision of the integral main lens, the step of 104 of applying the at least one additional lens element may be conducted.

Subsequently to step 104, a further step of smoothing the edges of the layers may be conducted. In particular, such step could be conducted chemical polishing, etching, providing a finishing lacquer and/or thermally smoothing the layer edges.

Figure 26:
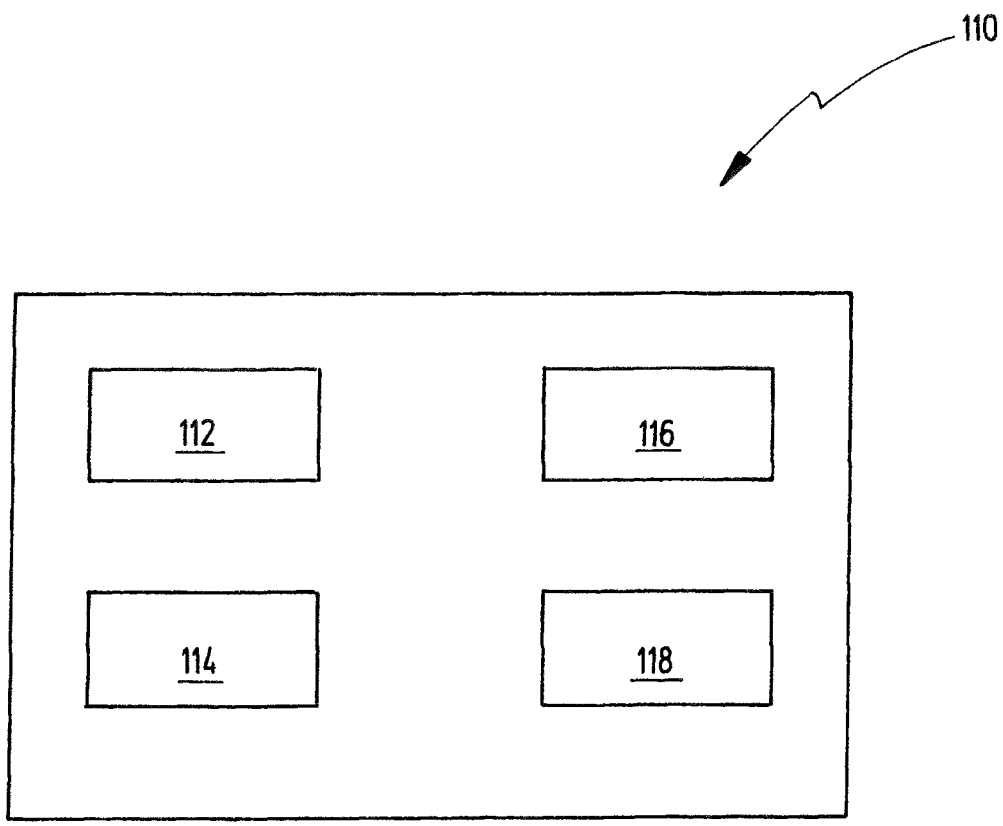
FIG. 26 shows a system for conducting a method.

FIG. 26 shows a schematic view of a system 110 for conducting such method. Such system may comprise a measurement unit, in particular a wavefront measurement unit 112 for determining and providing a measurement indicative of the refractive properties of the eye. A further calculation unit 114 may then determine the prescription for that eye. Then, a selection unit 160 may provide a proper integral main lens 12. Then, a three-dimensional printer unit 118 may provide the at least one additional lens element to that integral main lens.

Figure 27:
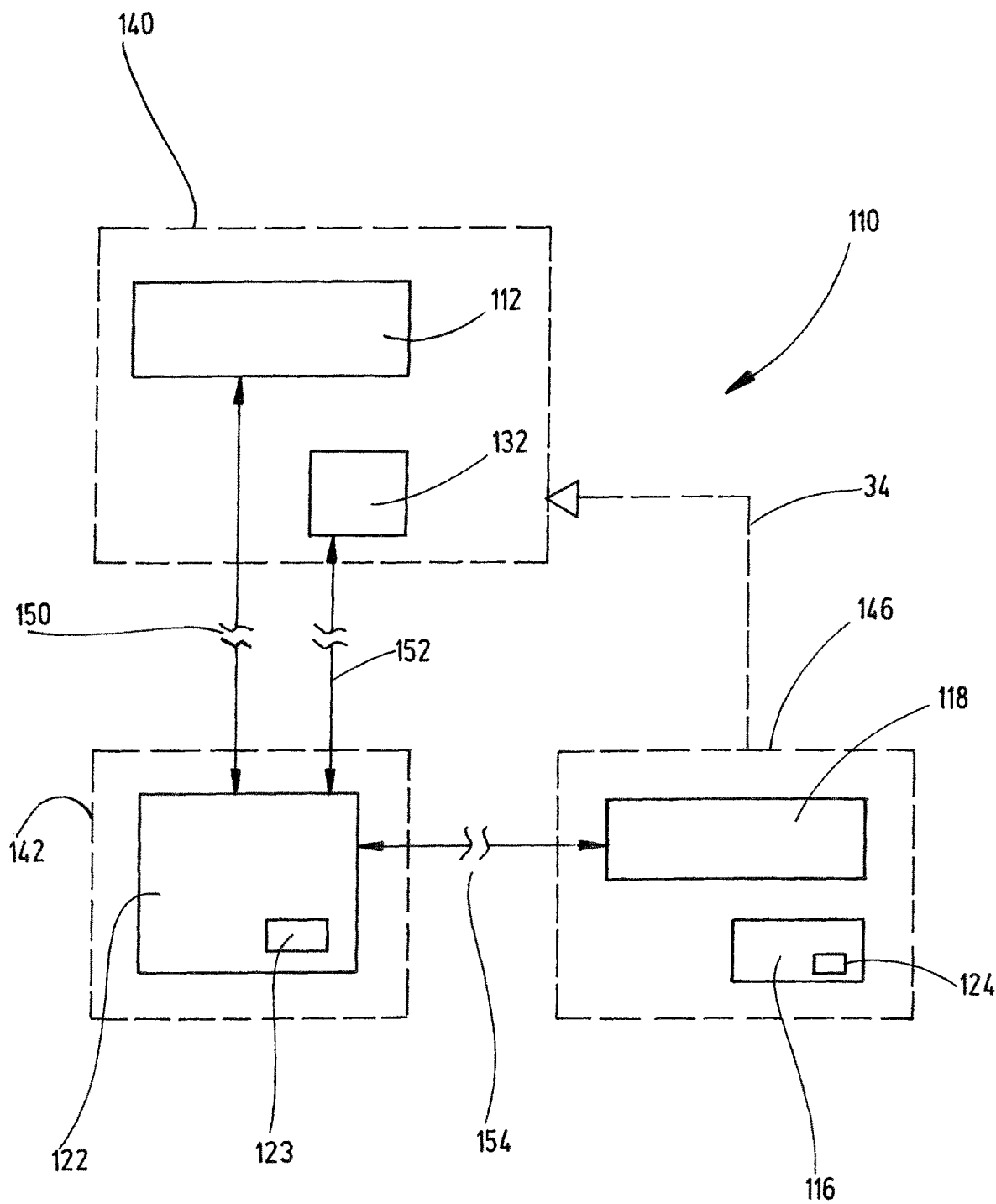
FIG. 27 shows another system for conducting the method.

FIG. 27 shows an embodiment of a system 110. A processing unit 122 for determining an eyeglass prescription for an eye comprises a processing unit 122 configured to receive information about a measurement indicative of the refractive properties of the eye, to establish an optimization space corresponding to a plurality of eyeglass prescriptions for the eye, to determine a merit function, wherein a value of the merit function corresponds to a visual function of the eye when corrected using one of the plurality of possible eyeglass prescriptions within the optimization space, wherein the merit function comprises a term depending on a magnitude of a corrective astigmatism of the possible eyeglass prescription and causing a less optimal value of the merit function the higher the magnitude of the corrective astigmatism, and to determine the eyeglass prescription by optimizing the value of the merit function. The optical wavefront aberration of a patient's eye of the wavefront aberration can be determined via an aberrometer 112. Further, a subjective refraction may also be determinable. The calculation of the eyeglass prescription is then conducted on the processing unit 122. The processing unit 122 may comprise a computer program product 123 that stores executable program code to execute the methods explained above. Then, the system 110 may further comprise an output device 132 that may be a display, a printer or a storing device to output the determined eyeglass prescription to the output device 132. The measuring unit 112 is connected to the processing unit 122 via a line 150. The processing unit 122 is connected to the output device 132 via a line 152. Both lines 150 and 152 may each be a wired connection or a wireless connection for data transfer between the processing unit 122 from and to the aberrometer 112 and the output device 132.

By this, the system 110 is able to automatically determine an eyeglass prescription based on data provided via an aberrometer. However, instead of an aberrometer 112, the data underlying the optimization process may also be acquired via the line 150 from a storing device that stores a multitude of patients' data acquired previously.

The aberrometer 112 may be located at a first site 140. The processing unit 122 is located at a second site 142. The output device 132 may be located at a third site or may be also located at the first site 140. Further, a unit for manufacturing the spectacle lens 10, in particular a three-dimensional printer unit, may be present at either the third site 144 or the first site 140. The selection unit 116 may also be present at the third site 144. The selection unit 116 may comprise a stack of integral main lenses 116. Of course, all components 112, 132, 122, 118, 116, 124 and 123 may also be present at a single site.

The first site 140, the second site 142 and the third site 144 may be remote from each other. The first site 140 is connected with the second site 142 via a data network 150, 152. The second site 142 and the third site 144 are connected via a data network 154. By this, it may be possible that refraction data provided via the aberrometer 112 can be sent to the processing unit 122. Further, for example, the determined eyeglass prescription may then be sent back to the first site, for example a spectacle shop, to be recognized by an ophthalmologist and provided to, for example, the possible wearer. Further, the eyeglass prescription determined can also be forwarded to a remote manufacturing unit to manufacture the respective visual aid.

The manufacturing unit can also be located at the first site 140; or—else—the first and third sites may be the same. In this case, the data of the aberrometer is transmitted via connection 150 to the processing unit 122 at the second site 142 and then, the calculated eyeglass prescription is transferred back to the first site 140 and its possible manufacturing unit 118. Alternatively, from the second site 142, the determined eyeglass prescription can be transferred to a third site 144 with a possible manufacturing unit 118 to manufacture the visual aid. Last, it is possible that from this third site 144, the manufactured visual aid is then shipped to the first site 140 as indicated by the arrow 146.

In particular, the current invention may comprise embodiments according to the following clauses:

Clause 1: A method for manufacturing a spectacle lens (10), the method being characterized by the following steps:
  Providing an integral main lens, wherein the integral main lens has a front surface and a back surface, and wherein the integral main lens is at least one selected from a group consisting of a spherical power lens, an astigmatic power lens, and a lens having a main curvature of the front surface in a first meridian and a main curvature of the back surface in the first meridian which are different from each other so as to provide for a spherical power different from zero; and
  Applying at least one additional lens element to at least a part of the front surface and/or at least a part of the back surface, wherein the at least one additional lens element is comprised of at least one layer having a multitude of layer elements, in particular printed layer elements.

Clause 2: The method according to clause 1, characterized in that the step of providing an integral main lens comprises the step of casting or injection molding the integral main lens, and/or in that the step of providing an integral main lens comprises the step of surfacing the front surface and/or the back surface of the integral main lens, in particular wherein the step of surfacing includes grinding and/or polishing.

Clause 3: The method according to clause 1 or 2, characterized in that the step of providing the integral main lens comprises providing the integral main lens as a fully-finished lens blank, wherein the front surface and the back surface are surfaced according to a prescription, in particular wherein the spherical power has a magnitude of at least 0.125 diopters.

Clause 4: The method according to any of clauses 1 to 3, characterized in that the step of applying the at least one additional lens element comprises applying the multitude of layer elements via an additive process, in particular wherein the additive process is a three-dimensional printing process.

Clause 5: The method according to any of clauses 1 to 4, characterized in that the step of applying the at least one additional lens element comprises applying the at least one additional lens element directly onto the at least one part of the front surface and/or the at least one part of the back surface of the integral main lens.

Clause 6: The method according to any of clauses 1 to 4, characterized in that the method further comprises the step of generating the additional lens element separately from the integral main lens, and wherein the step of applying the at least one additional lens element comprises adhering via an adhesive the at least one additional lens element on the at least one part of the front surface and/or the at least one part of the back surface of the integral main lens.

Clause 7: The method according to any of clauses 1 to 6, characterized in that the integral main lens is comprised of at least one selected from a group consisting of crown glass, flint glass, polymer plastics, polycarbonate based plastics, polyamide based plastics, acrylate base plastics, polythiourethane based plastics, allyl diglycol carbonate (ADC) and any combination of these materials.

Clause 8: The method according to any of clauses 1 to 7, characterized in that the additional lens element is comprised of at least one selected from a group consisting of a polypropylene based polymer, an acrylonitrile butadiene styrene (ABS) based polymer, a polyethylene terephthalate glycol (PET-G) based polymer, a polycarbonate (PC) based polymer, a poly methyl methacrylate (PMMA) based polymer and any combination of these materials.

Clause 9: The method according to any of clauses 6 to 8, characterized in that the adhesive is at least one selected from a group consisting of photo initiated curing adhesives, for example epoxy based adhesives or acrylate based adhesives, and cyanoacrylate based adhesives and any combination of these materials.

Clause 10: The method according to any of clauses 1 to 9, characterized in that the at least one additional lens element is applied to form a near portion of the spectacle lens.

Clause 11: The method according to any of clauses 1 to 9, characterized in that the step of applying the at least one additional lens element comprises applying more than one additional lens element to form a multi-focal spectacle lens.

Clause 12: The method according to any of clauses 1 to 11, characterized in that the multitude of layer elements are formed of at least two different materials, wherein the at least two different materials have different refractive index and/or Abbe numbers.

Clause 13: The method according to any of clauses 1 to 12, characterized in that the step of applying the at least one additional lens element comprises applying at least a first additional lens element and at least a second additional lens element, wherein the first additional lens element is applied to a part of the back surface or the front surface, and wherein the second additional lens element completely covers a respective one of the front and the back surface of the integral main lens and the first additional lens element.

Clause 13b: The method according to any of clauses 1 to 13, characterized in that the integral main lens comprises at least one recess or flattened section in the front surface and/or in the back surface, and wherein one of the at least one additional lens element is applied to each recess or flattened section.

Clause 14: A spectacle lens comprising an integral main lens, wherein the integral main lens has a front surface and a back surface, and wherein the integral main lens is at least one selected from a group consisting of a spherical power lens, an astigmatic power lens, and a lens having a main curvature of the front surface in a first meridian and a main curvature of the back surface in the first meridian which are different from each other so as to provide for a spherical power different from zero, and characterized by at least one additional lens element applied to at least a part of the front surface and/or at least a part of the back surface, wherein the at least one lens element is comprised of at least one layer having a multitude of layer elements, in particular printed layer elements.

Clause 15: The spectacle lens of clause 14, characterized in that the integral main lens is a lens having a main curvature of the front surface in a first meridian and a main curvature of the back surface in the first meridian which are different from each other so as to provide for a spherical power different from zero, wherein the integral main lens comprises at least one recess or flattened section in the front surface and/or in the back surface, and wherein one of the at least one additional lens element is applied to each recess or flattened section, in particular wherein each of the at least one additional lens element has a refractive index and/or an Abbe number which is different from that of the integral main lens.

It is understood that the foregoing description is that of the preferred embodiments of the invention and that various changes and modifications may be made thereto without departing from the spirit and scope of the invention as defined in the appended claims.

What is claimed is:

1. A method for making a spectacle lens having a near portion, the method comprising the steps of:
providing an integral main lens, wherein the integral main lens has a front surface and a back surface, and wherein the integral main lens is a lens having a main curvature of the front surface in a first meridian and a main curvature of the back surface in the first meridian with said curvatures being mutually different so as to provide for a spherical power different from zero, wherein the integral main lens further includes a first flattened or recessed section in the front surface thereof and a second flattened or recessed section in the back surface thereof with said first and second sections formed in the integral main lens so as to partially overlap when viewed in section, wherein only the remaining part of the front surface not flattened or recessed has the main curvature of the front surface and only the remaining part of the back surface not flattened or recessed has a main curvature of the back surface; wherein the step of providing the integral main lens includes providing the integral main lens as a fully-finished single vision lens blank, wherein the front surface and the back surface are surfaced according to a prescription, wherein the step of providing the integral main lens includes the step of casting or injection molding the integral main lens; and,
applying a first additional lens element to the first flattened or recessed section of the front surface and a second additional lens element to the second flattened or recessed section of the back surface, wherein the first and second additional lens elements are comprised of a layer having a multitude of printed layer elements, wherein the step of applying the first and second additional lens elements comprises applying the multitude of layer elements via a three-dimensional printing process, wherein the step of applying the first and second additional lens elements comprises applying the additional lens elements directly onto the corresponding first and second flattened or recessed sections, wherein the first and second additional lens elements are applied to partially overlap in correspondence to the partial overlapment of the first and second flattened or recessed sections to so conjointly form the near portion of the spectacle lens, wherein the near portion provides for progressive power for near vision with an improved gradient.

* * * * *

UNITED STATES PATENT AND TRADEMARK OFFICE
CERTIFICATE OF CORRECTION

PATENT NO. : 10,663,764 B2
APPLICATION NO. : 14/557252
DATED : May 26, 2020
INVENTOR(S) : R. Meschenmoser et al.

It is certified that error appears in the above-identified patent and that said Letters Patent is hereby corrected as shown below:

On the Title Page

Page 2 Column 2, Line 7:
Under FOREIGN PATENT DOCUMENTS: delete "JP 58-120" and substitute -- JP 58-120217 -- therefor.

Signed and Sealed this
Twenty-ninth Day of September, 2020

Andrei Iancu
*Director of the United States Patent and Trademark Office*